US012102097B2

(12) United States Patent
Zecher et al.

(10) Patent No.: US 12,102,097 B2
(45) Date of Patent: Oct. 1, 2024

(54) PRESSING DEVICE

(71) Applicant: Textor Maschinenbau GmbH, Wolfertschwenden (DE)

(72) Inventors: Steffen Zecher, Staufenberg (DE); Patrick Schneider, Lollar (DE); Ingo Rother, Breidenbach (DE); Joachim Schaub, Hatzfeld-Reddinghausen (DE); Thomas Nispel, Dautphetal (DE); Jörg Schmeiser, Wiggensbach (DE); Pedro Ruedin, St. Gallen (CH); Josef Mayer, Memmingerberg (DE); Fabian Müller, Betzigau (DE); Matthias Hehle, Waltenhofen (DE); Markus Seidel, Egg an der Günz (DE)

(73) Assignee: Textor Maschinenbau GmbH, Wolfertschwenden (DE)

( * ) Notice: Subject to any disclaimer, the term of this patent is extended or adjusted under 35 U.S.C. 154(b) by 1123 days.

(21) Appl. No.: 16/919,851

(22) Filed: Jul. 2, 2020

(65) Prior Publication Data

US 2021/0000125 A1    Jan. 7, 2021

(30) Foreign Application Priority Data

Jul. 4, 2019   (DE) .......................... 102019118048.1
Sep. 2, 2019   (DE) .......................... 102019123487.5
Jun. 15, 2020  (DE) .......................... 102020115748.7

(51) Int. Cl.
*A22C 7/00*    (2006.01)
*B30B 1/26*    (2006.01)
(Continued)

(52) U.S. Cl.
CPC ............ *A22C 7/0023* (2013.01); *B30B 1/266* (2013.01); *B30B 1/42* (2013.01); *B30B 15/0094* (2013.01);
(Continued)

(58) Field of Classification Search
CPC ..... A22C 7/0023; A22C 7/003; A22C 7/0046; A22C 7/0061; B30B 1/266; B30B 1/42;
(Continued)

(56) References Cited

U.S. PATENT DOCUMENTS 2,043,366 A    6/1936 Bech
2,250,649 A    7/1941 Pierson
(Continued)

FOREIGN PATENT DOCUMENTS

CN    105599029 B    8/2017
DE    1507976 A1     1/1970
(Continued)

OTHER PUBLICATIONS

Examination Report regarding corresponding EP App. No. 20182716.9; issued Jun. 22, 2022.
(Continued)

*Primary Examiner* — Richard T Price, Jr.
(74) *Attorney, Agent, or Firm* — Erise IP, P.A.

(57) ABSTRACT

A pressing device for pressing meat products, in particular frozen and/or partly frozen meat products, preferably fresh meat products and/or bacon, comprises a pressing chamber which extends along a longitudinal axis and into which a product to be pressed can be inserted, wherein the pressing chamber comprises at least one counter-element and at least one contact element, which is movable in the direction of the counter-element, that cooperate such that the product inserted into the pressing chamber can be compressed between the at least one counter-element and the at least one contact element; and wherein the pressing device comprises at least one servomotor that is configured to move the at least one contact element.

28 Claims, 24 Drawing Sheets

Figure 1A:
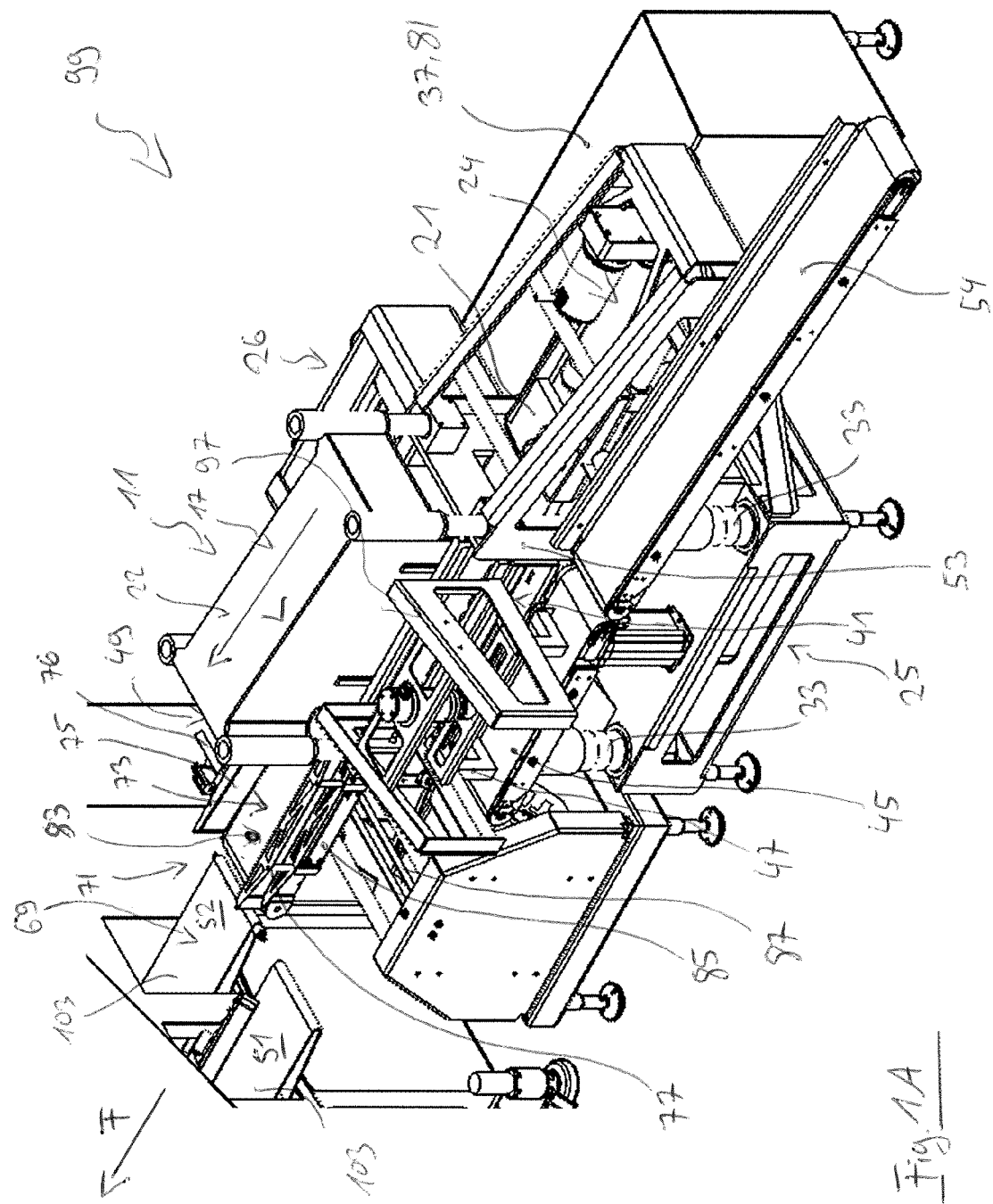

(51) Int. Cl.
  *B30B 1/42* (2006.01)
  *B30B 15/00* (2006.01)
  *B30B 15/14* (2006.01)
  *B30B 15/28* (2006.01)
  *B30B 15/32* (2006.01)
(52) U.S. Cl.
  CPC .......... *B30B 15/148* (2013.01); *B30B 15/285* (2013.01); *B30B 15/32* (2013.01)
(58) Field of Classification Search
  CPC .. B30B 15/0094; B30B 15/148; B30B 15/285
  USPC ...................................................... 452/174
  See application file for complete search history.

(56) References Cited

U.S. PATENT DOCUMENTS

| | | | |
|---|---|---|---|
| 3,326,120 A | 6/1967 | Schneider | |
| 3,327,622 A | 6/1967 | Lebovitz | |
| 3,706,209 A | 12/1972 | Gehlen | |
| 5,037,350 A * | 8/1991 | Richardson | A47J 43/20 83/326 |
| 5,273,484 A * | 12/1993 | Roger | A22C 25/00 426/513 |
| 5,482,166 A | 1/1996 | Brown | |
| 5,569,070 A * | 10/1996 | Smith | A22C 17/002 425/518 |
| 6,238,196 B1 | 5/2001 | Hyllstam et al. | |
| 6,366,046 B1 * | 4/2002 | Yan | B30B 1/266 318/560 |
| 7,182,683 B2 * | 2/2007 | Shefet | A22C 11/001 452/30 |
| 8,808,066 B2 * | 8/2014 | Haschke | B65D 33/1625 452/48 |
| 9,648,898 B2 * | 5/2017 | Strand | A23P 30/10 |
| 9,834,384 B2 | 12/2017 | Dopp et al. | |
| 2003/0209401 A1 | 11/2003 | Shaw et al. | |
| 2004/0035276 A1 | 2/2004 | Weber | |
| 2004/0043718 A1 * | 3/2004 | Shefet | A22C 11/001 452/35 |
| 2004/0241267 A1 | 12/2004 | Schultz | |
| 2005/0103207 A1 * | 5/2005 | Hansen | A23P 30/10 99/353 |
| 2005/0132855 A1 | 6/2005 | Weber | |
| 2006/0021487 A1 | 2/2006 | Dickover et al. | |
| 2008/0233228 A1 * | 9/2008 | Lindee | A22C 7/0084 425/144 |
| 2012/0312136 A1 | 12/2012 | Garaew | |
| 2016/0213010 A1 | 7/2016 | Petrovic et al. | |
| 2016/0213055 A1 | 7/2016 | Petrovic et al. | |
| 2019/0322029 A1 * | 10/2019 | Vantrease | B30B 1/266 |
| 2021/0000126 A1 * | 1/2021 | Zecher | B30B 15/062 |
| 2023/0112292 A1 * | 4/2023 | Müller | A22C 7/0023 426/513 |

FOREIGN PATENT DOCUMENTS

| | | |
|---|---|---|
| DE | 10054514 A1 | 5/2002 |
| DE | 102006015346 A1 | 10/2007 |
| DE | 102008011375 A1 | 9/2009 |
| DE | 102009024189 A1 | 12/2010 |
| DE | 102011013919 A1 | 9/2012 |
| EP | 1570979 A1 | 7/2005 |
| EP | 2532494 B1 | 12/2012 |
| EP | 3117743 A1 | 7/2018 |
| JP | 10277796 A | 10/1998 |
| JP | 2010089148 A | 4/2010 |
| JP | 2010089148 B | 11/2013 |
| WO | 9810918 A1 | 3/1988 |
| WO | WO 98/04141 * | 2/1998 ............ A22C 17/04 |
| WO | WO-9804141 A1 * | 2/1998 ............ A22C 17/04 |
| WO | 2005027667 A2 | 3/2005 |
| WO | 2009052865 A1 | 4/2009 |
| WO | 2019147784 A1 | 8/2019 |

OTHER PUBLICATIONS

European Patent Application 20182716.9 Second Office Action issued Oct. 4, 2023.
European Patent Application 20182719.3 Search Report issued Dec. 2, 2020.
European Patent Application 20182721.9 Search Report issued Nov. 23, 2020.
European Patent Application 20182716.9 Search Report issued Nov. 27, 2020.
European Patent Application 20182716.9 First Office Action issued Jun. 22, 2022.
Search Report regarding corresponding DE App. No. 20182716.9; issued Nov. 27, 2020.
"Taking portioning to a new era, Marel I-Cut 122 dual-lane high-speed portion cutter for poultry", Sep. 19, 2016, source: https://zootecnicainternational.com/poultry-facts/taking-portioning-new-era-marel-cut-122-dual-lane-high-speed-portion-cutter-poultrv/.
European Patent Application 20184359.6 Notice of Opposition issued Jan. 5, 2024.
Marel, I-Cut 122 Hardware Manual, Document No. 151113ENG-4, Apr. 28, 2016.
Marel, I-Cut 22 User's Guide, Version 110902-1, Mar. 2012.
Marel, I-Cut 610 Hardware Manual, Document No. 141016ENG-1, Apr. 3, 2015.
Solemn Declaration (in Danish and English translation) of Mr. Soren Bai dated Dec. 21, 2023 related to prior uses in 2015, 2016 and 2019.
Solemn Declaration of Mr. Kim Balle dated Dec. 21, 2023, Exhibit KB-1: I-Cut 22, User's Guide, Version 110902-1, Mar. 2012.
Solemn Declaration of Mr. Kim Balle dated Dec. 21, 2023, Exhibit KB-10, I-Cut 122 Hardware Manual, Document No. 151113ENG-4, Apr. 28, 2016.
Solemn Declaration of Mr. Kim Balle dated Dec. 21, 2023, Exhibit KB-11, Order Confirmation No. O148665.2, Jun. 14, 2019.
Solemn Declaration of Mr. Kim Balle dated Dec. 21, 2023, Exhibit KB-12, Marel accounting record for Contract No. O148665.2 (Order confirmation 414819 (0148665-1)), Jul. 12, 2019.
Solemn Declaration of Mr. Kim Balle dated Dec. 21, 2023, Exhibit KB-13, Marel invoice No. 90048351 of Jun. 19, 2019.
Solemn Declaration of Mr. Kim Balle dated Dec. 21, 2023, Exhibit KB-14, Marel invoice No. 90048990 of Jul. 31, 2019.
Solemn Declaration of Mr. Kim Balle dated Dec. 21, 2023, Exhibit KB-15, Marel invoice No. 90049868 of Sep. 24, 2019.
Solemn Declaration of Mr. Kim Balle dated Dec. 21, 2023, Exhibit KB-16, Freight documents, Aug. 30, 2019-Sep. 3, 2019.
Solemn Declaration of Mr. Kim Balle dated Dec. 21, 2023, Exhibit KB-16a, Detail of the second page of exhibit KB-16.
Solemn Declaration of Mr. Kim Balle dated Dec. 21, 2023, Exhibit KB-17, Photos of I-Cut 122 taken at HKScan.
Solemn Declaration of Mr. Kim Balle dated Dec. 21, 2023, Exhibit KB-18, Cargo note of Jan. 18, 2016.
Solemn Declaration of Mr. Kim Balle dated Dec. 21, 2023, Exhibit KB-19, Visit report of visit at HKScan on Feb. 28, 2017.
Solemn Declaration of Mr. Kim Balle dated Dec. 21, 2023, Exhibit KB-19, English translation of exhibit KB-19-a.
Solemn Declaration of Mr. Kim Balle dated Dec. 21, 2023, Exhibit KB-2, I-Cut 22, Order Confirmation to HKScan Denmark A/S, Jul. 3, 2015.
Solemn Declaration of Mr. Kim Balle dated Dec. 21, 2023, Exhibit KB-3, I-Cut 22, Order Confirmation to HKScan Denmark A/S, Jul. 3, 2015 with signatures.
Solemn Declaration of Mr. Kim Balle dated Dec. 21, 2023, Exhibit KB-4, Marel Invoice No. p5001465 of Jul. 3, 2015.
Solemn Declaration of Mr. Kim Balle dated Dec. 21, 2023, Exhibit KB-5, DSV Cargo Note, Aug. 21, 2015.
Solemn Declaration of Mr. Kim Balle dated Dec. 21, 2023, Exhibit KB-6, Marel Invoice No. p5001476 of Aug. 21, 2015.
Solemn Declaration of Mr. Kim Balle dated Dec. 21, 2023, Exhibit KB-7, Marel Invoice No. p5001482 of Aug. 31, 2015.
Solemn Declaration of Mr. Kim Balle dated Dec. 21, 2023, Exhibit KB-8, Video Marel I-Cut 22.

(56) References Cited

OTHER PUBLICATIONS

Solemn Declaration of Mr. Kim Balle dated Dec. 21, 2023, Exhibit KB-9, Video Marel I-Cut 22 Fillet, Exhibit KB-19, Translation of KB-19a.
Youtube video, Marel IPM3 x600, dated Feb. 20, 2015, https://www.youtube.com/watch?v=FiXiZhliDEw.
Vimeo Screenshot for the Marel I-Cut 22 video of the Video Marel I-Cut 22, Jun. 12, 2015, Download from Vimeo.com, Vimeo video No. 130529287.
Youtube video, Marel I-Cut 122 Portion Cutter White Fish, dated Jun. 7, 2017, https://www.youtube.com/watch?v=4ToNsnnxz7c.
Solemn Declaration of Mr. Kim Balle dated Dec. 21, 2023, including exhibits KB1-KB19a, related to prior uses in 2015, 2016, and 2019.
Video Marel I-Cut 22, Jun. 112, 2015, Download from Vimeo.com, Vimeo video No. 130529287.
U.S. Appl. No. 18/212,698 Non-Final Office Action issued Jan. 17, 2024.
U.S. Appl. No. 16/919,911 Non-Final Office Action issued Mar. 13, 2024.

\* cited by examiner

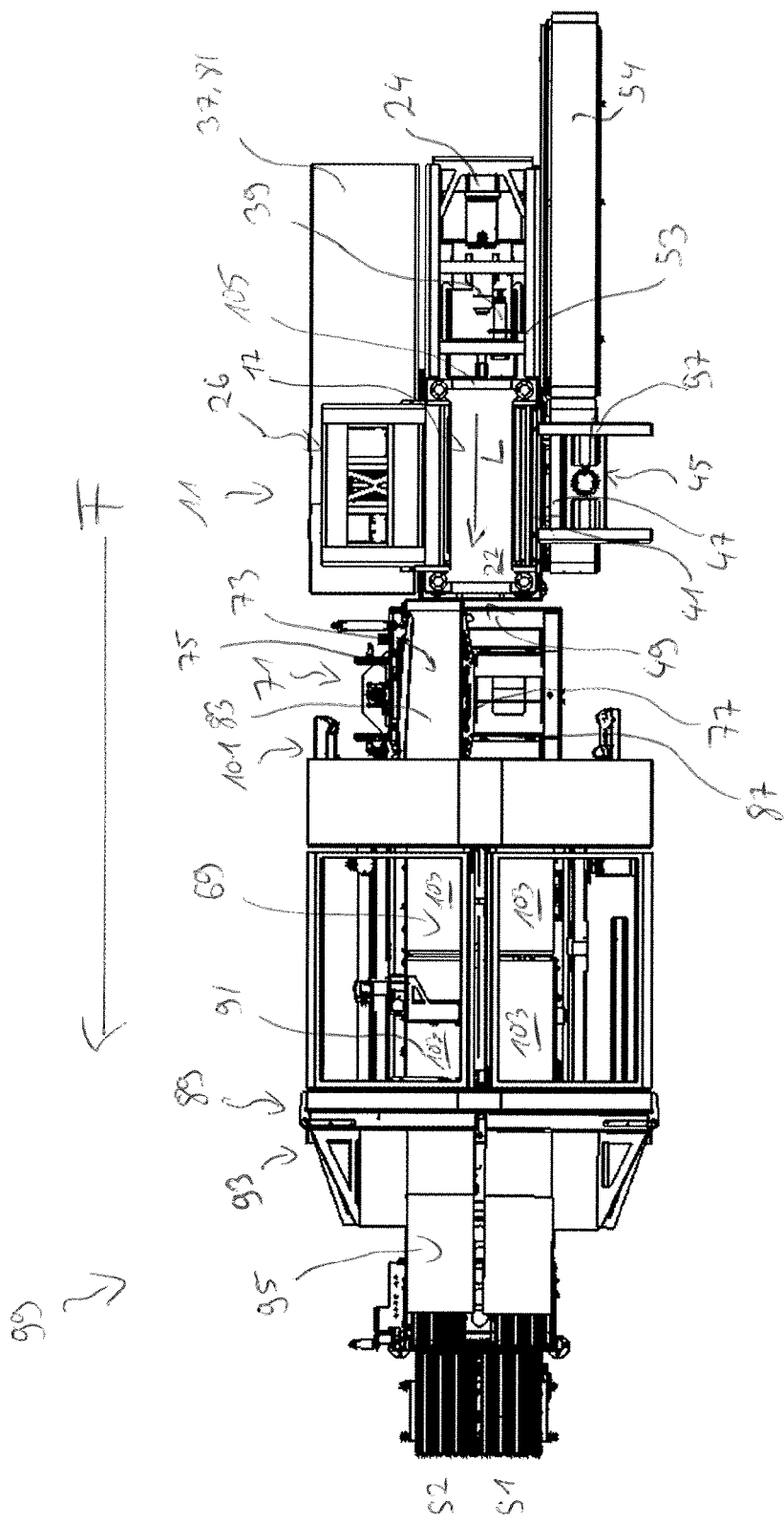

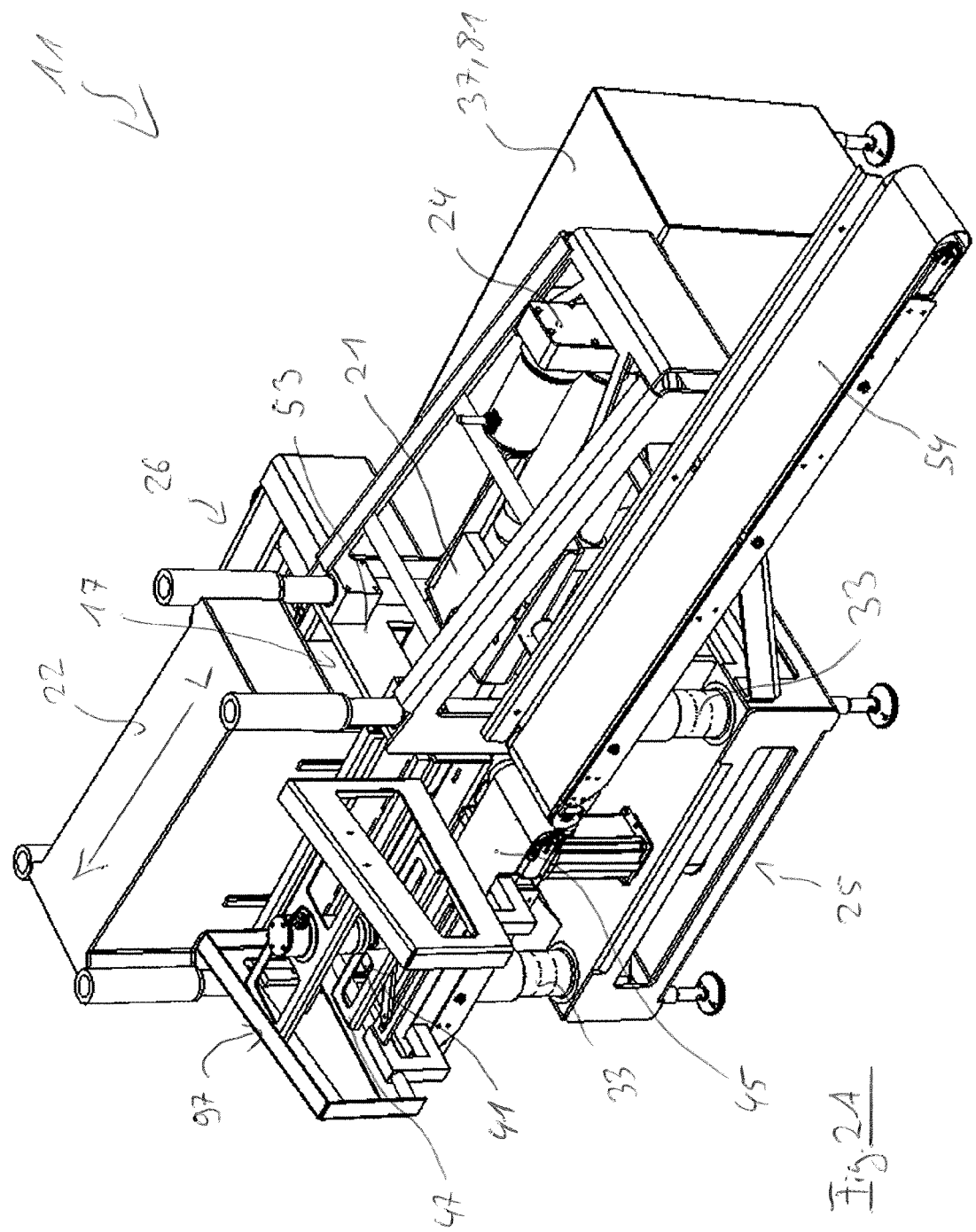

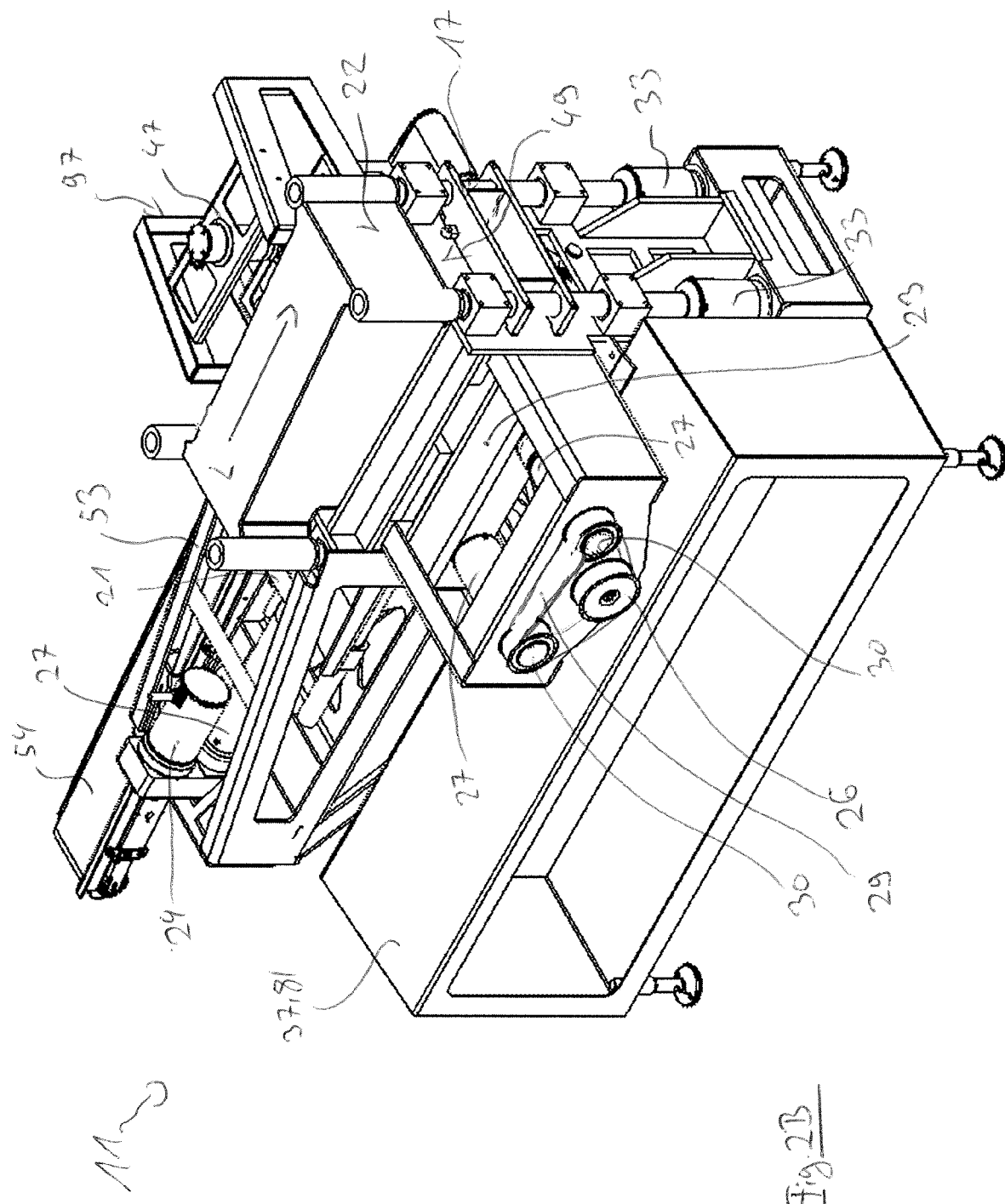

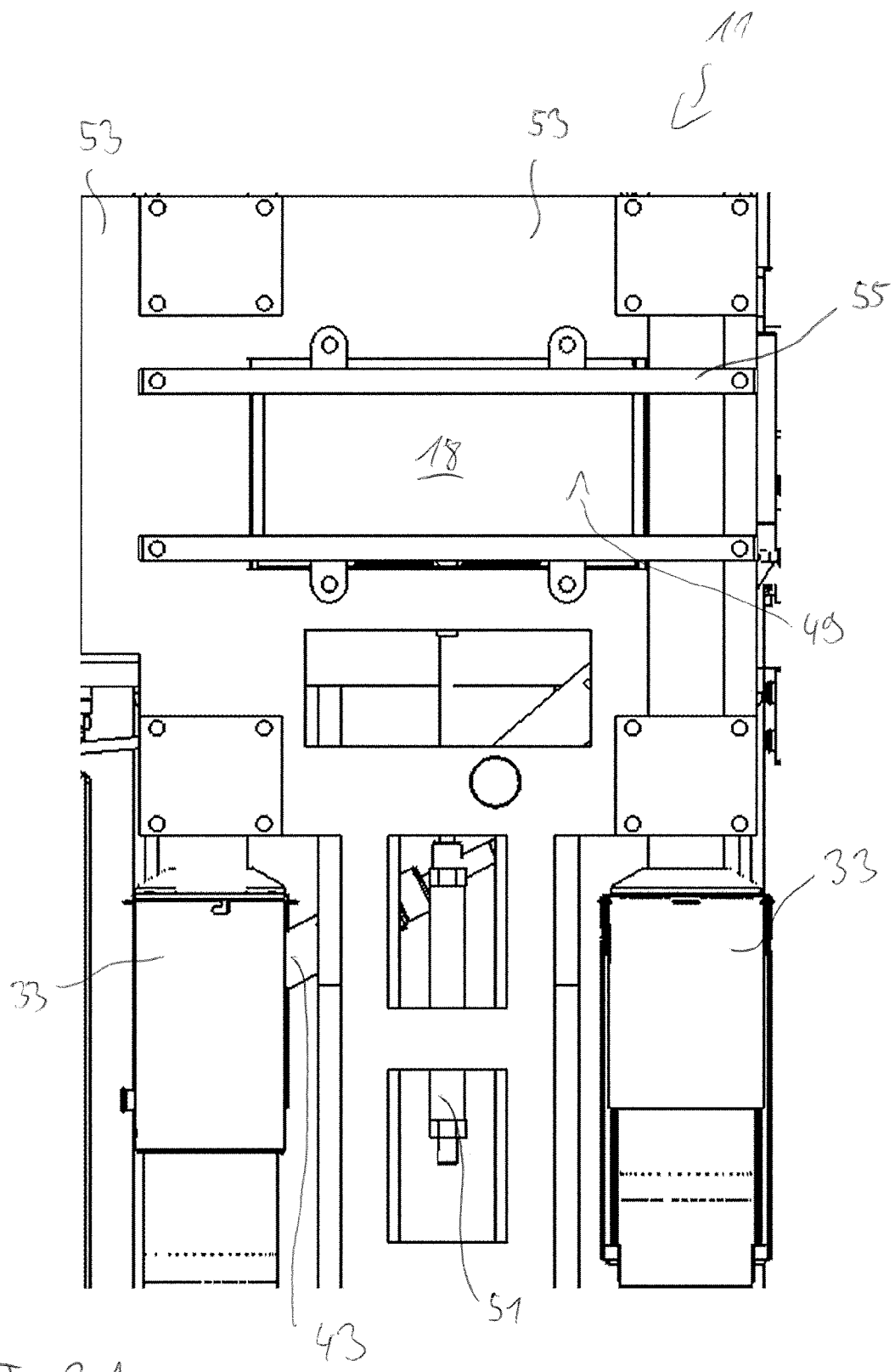

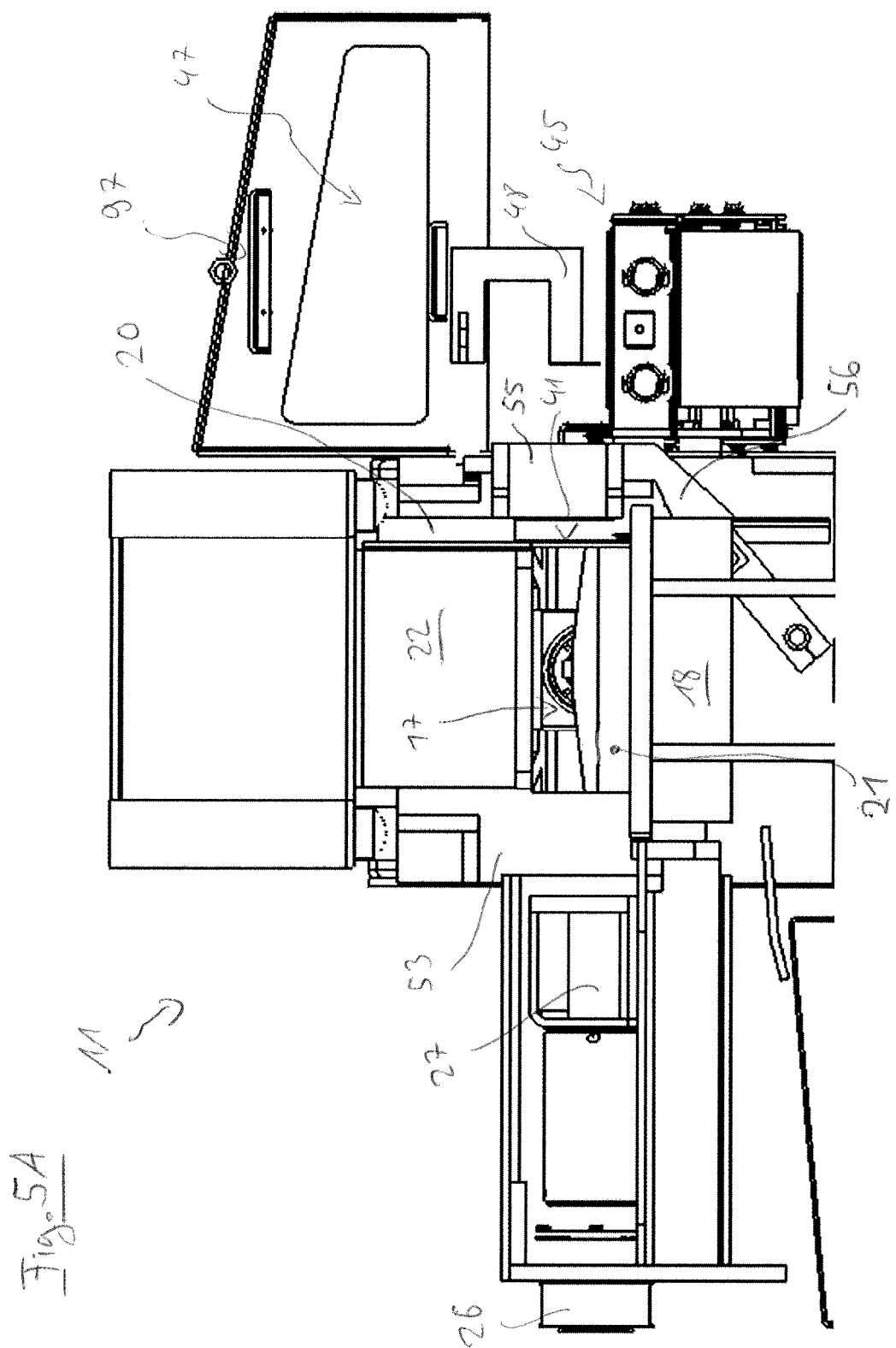

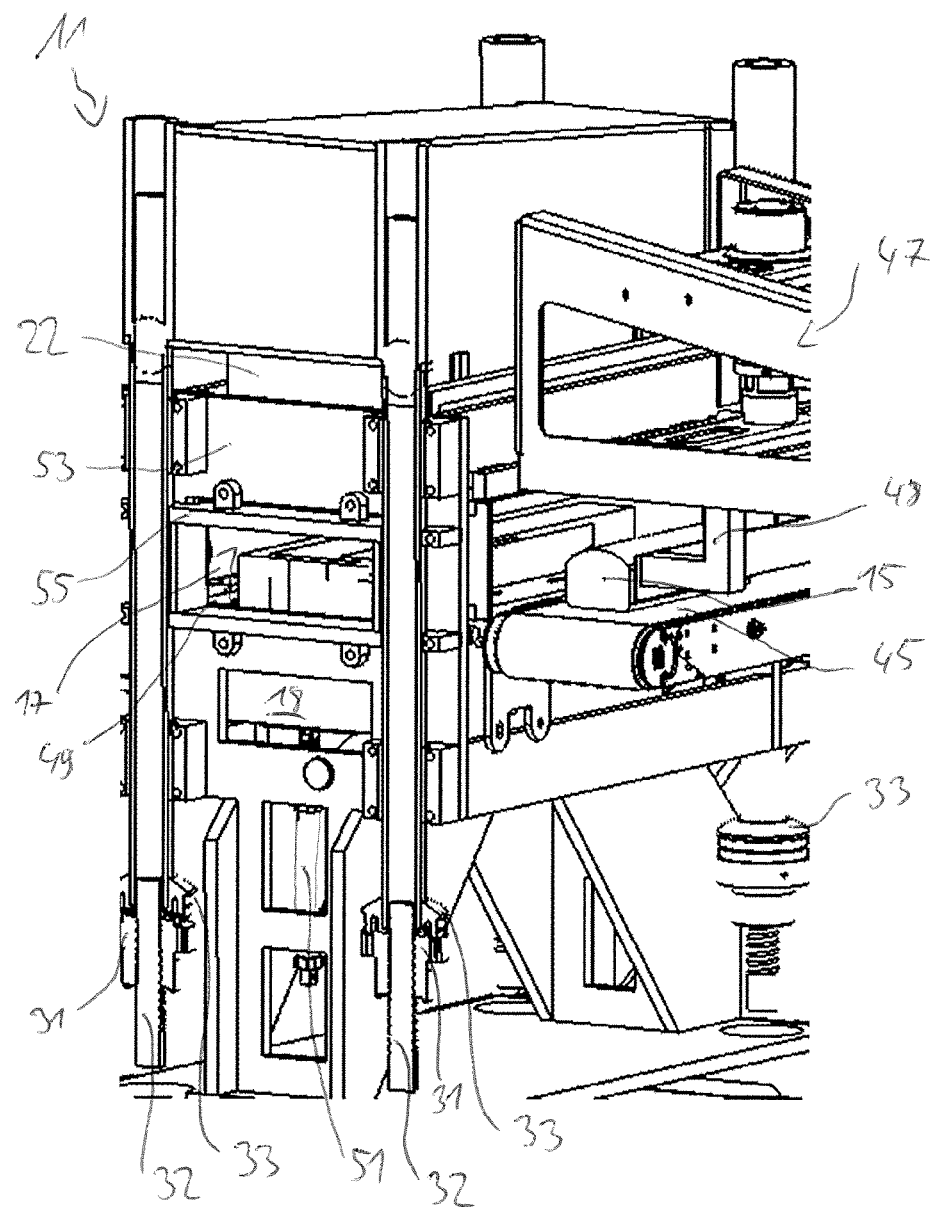

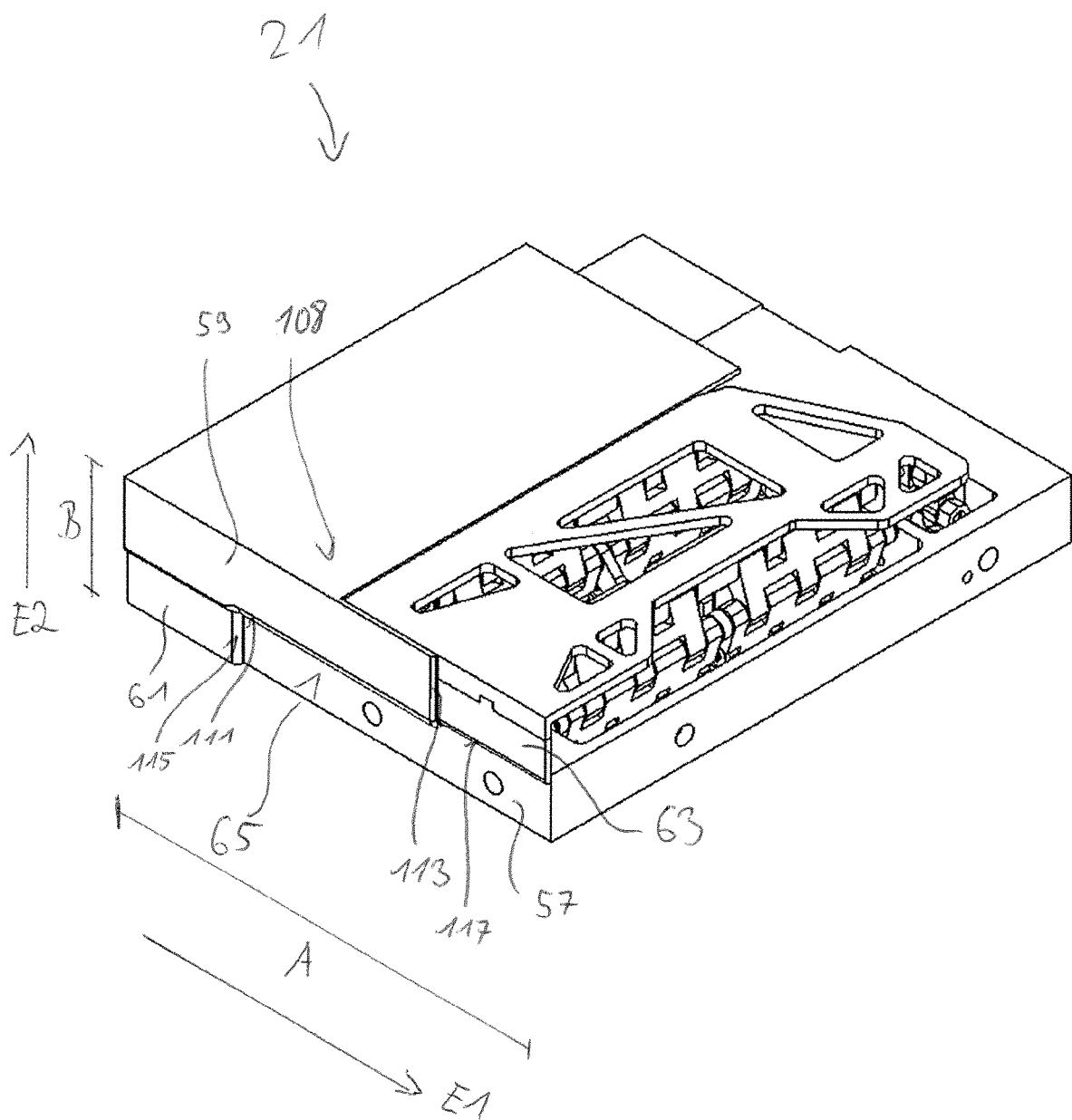

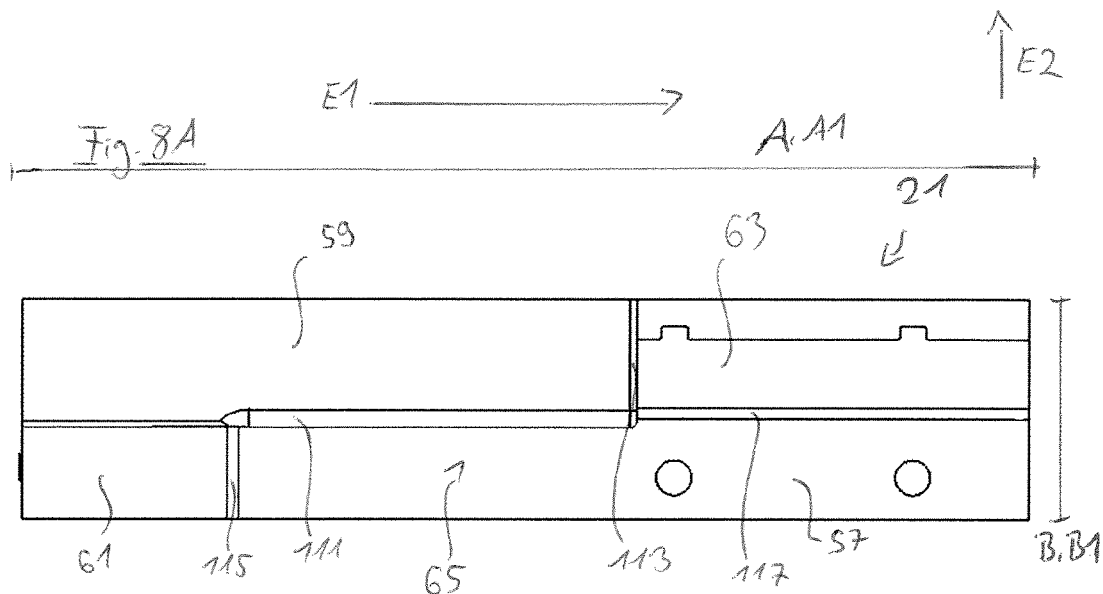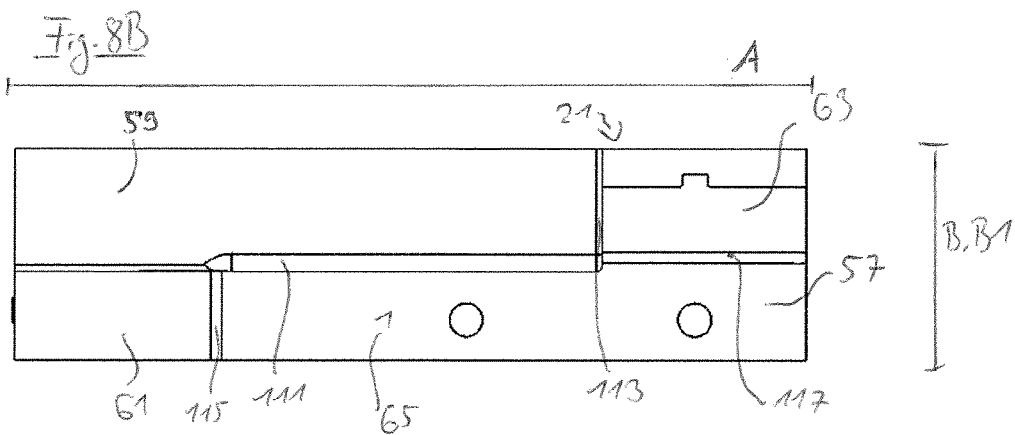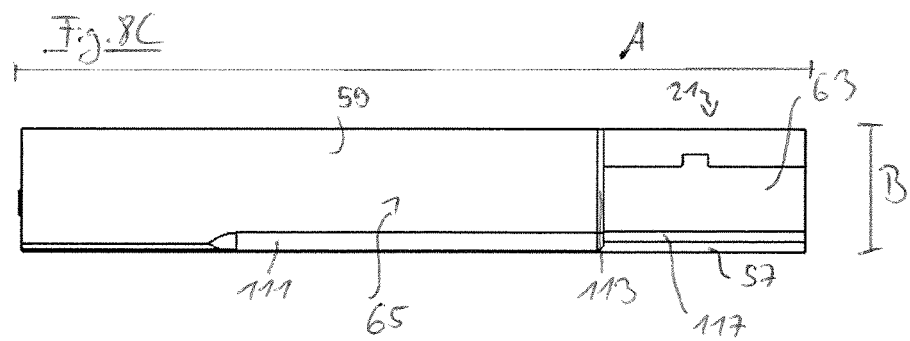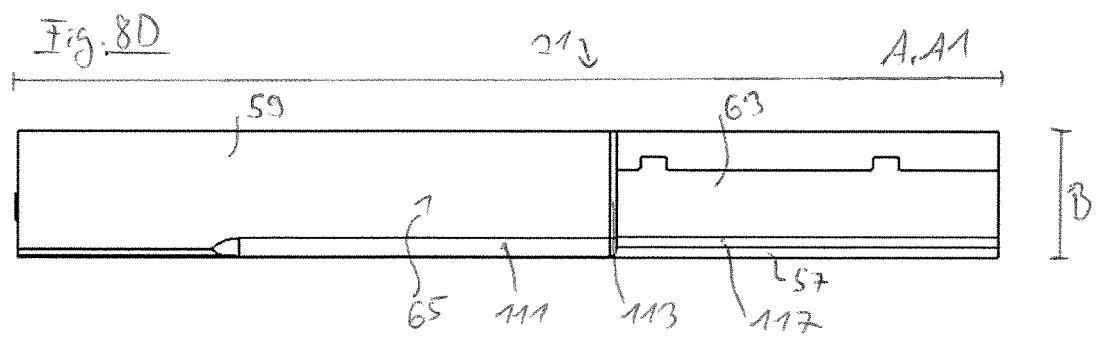

Figure 9A:
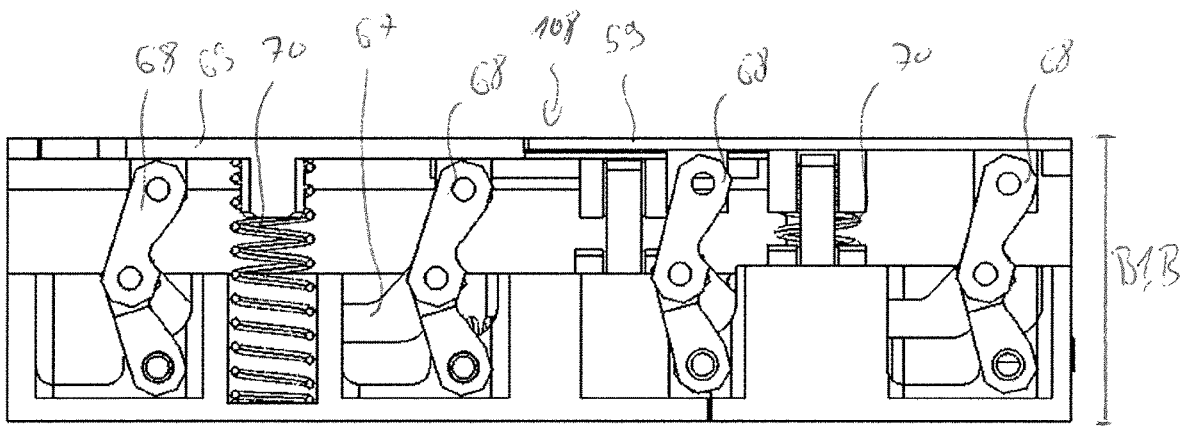
Figure 9B:
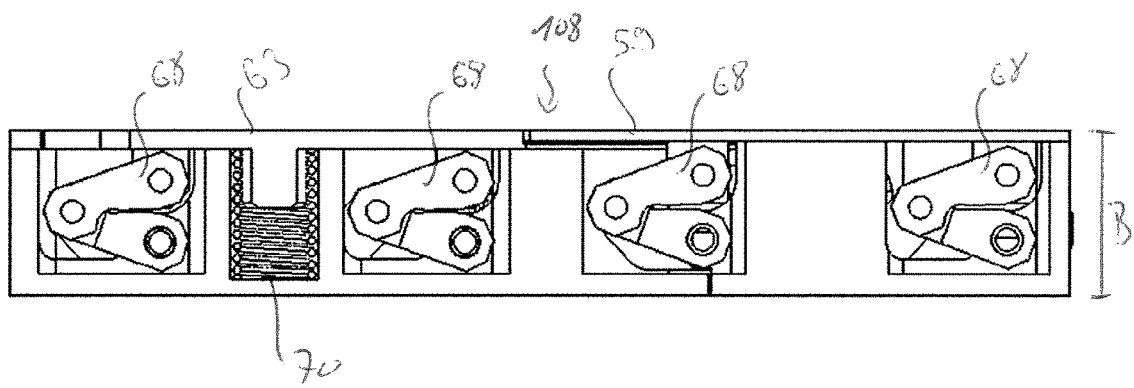

Fig. 9C
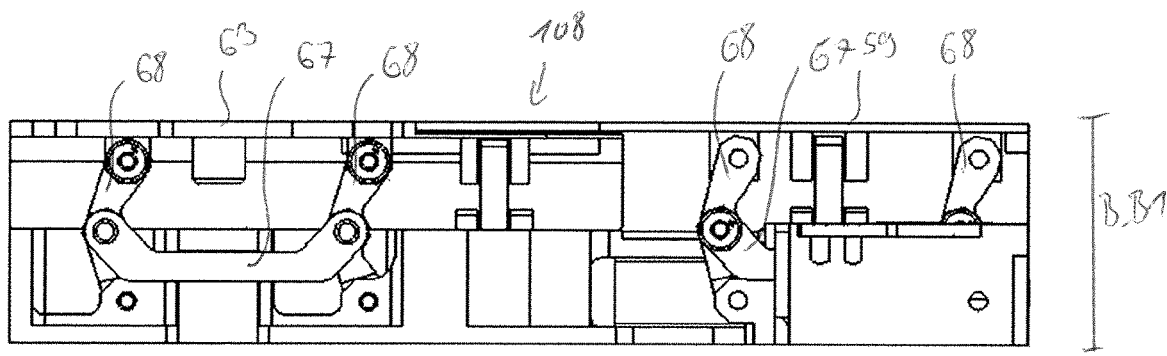
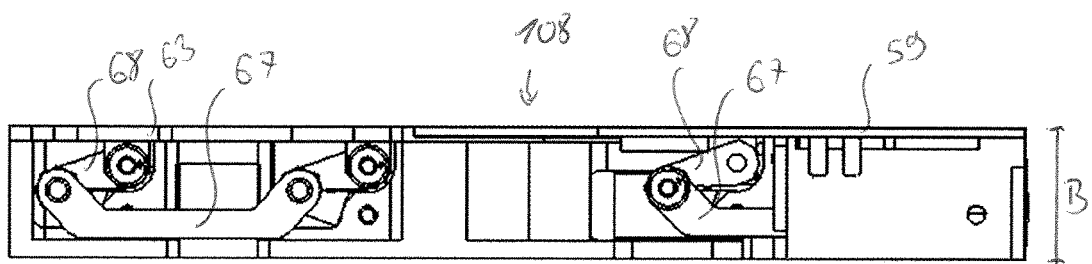
Fig. 9D
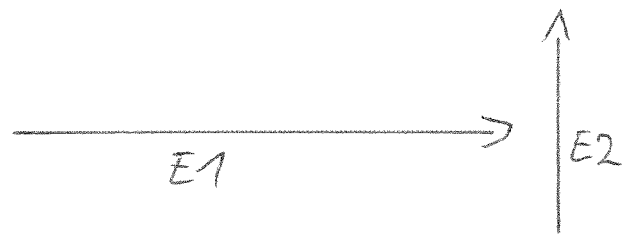

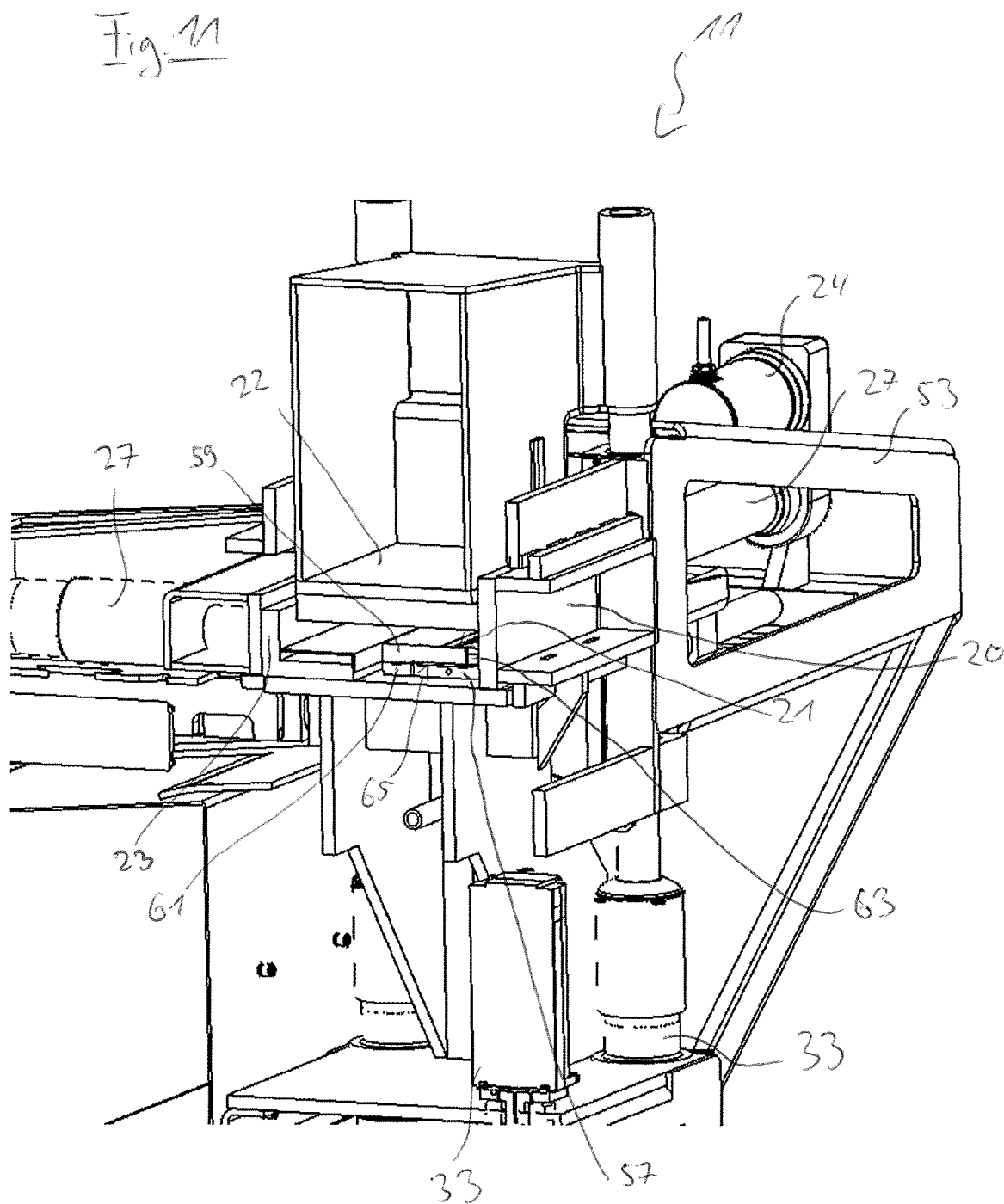

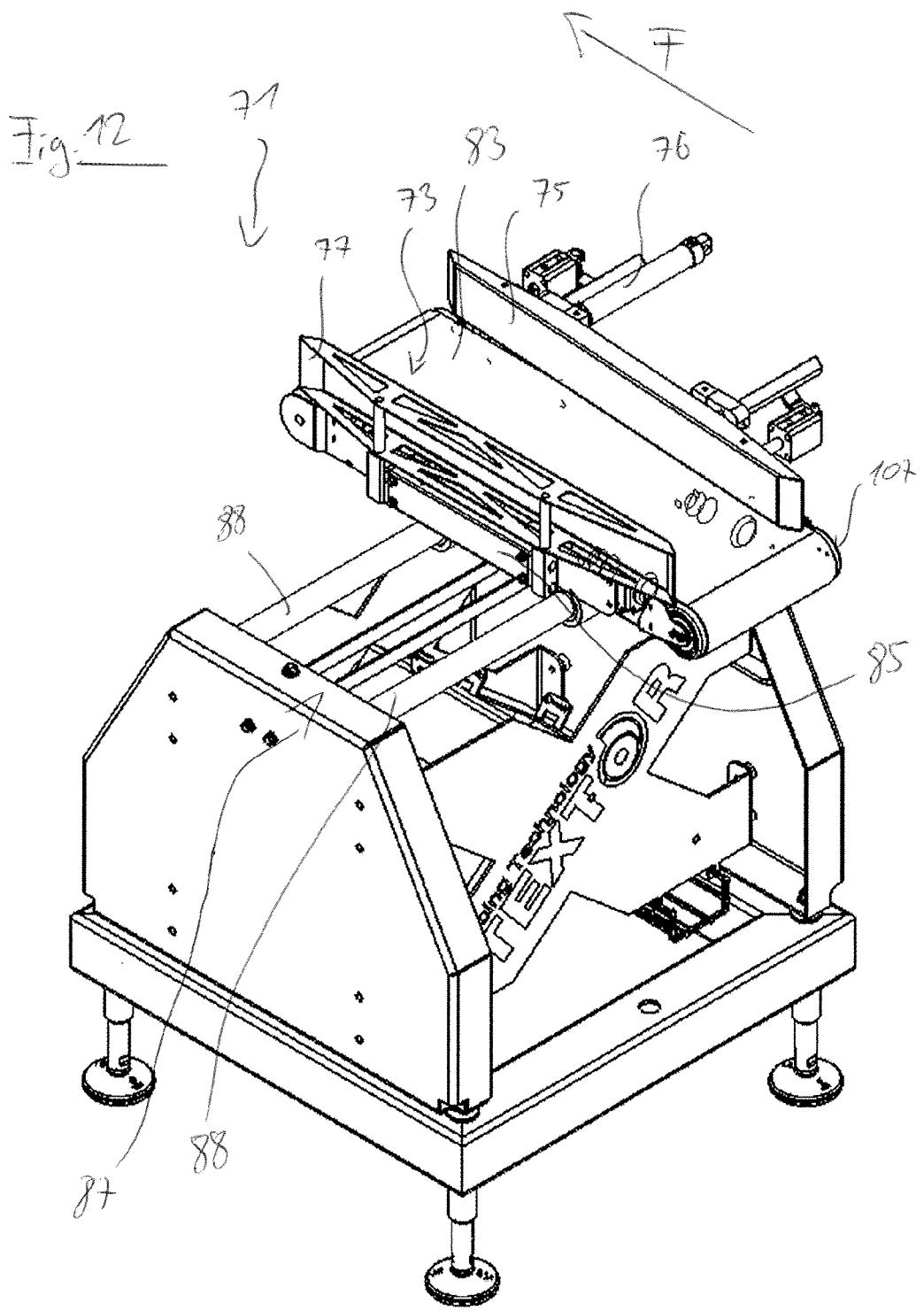

PRESSING DEVICE

The invention relates to a pressing device for pressing meat products, in particular frozen and/or partly frozen meat products, preferably fresh meat products and/or bacon, comprising a pressing chamber which extends along a longitudinal axis and into which a product to be pressed can be inserted, wherein the pressing chamber comprises at least one counter-element and at least one contact element, which is movable in the direction of the counter-element, that cooperate such that the product inserted into the pressing chamber can be compressed between the counter-element and the contact element.

The invention further relates to a movable contact element for such a pressing device, to a system for pressing and transferring meat products comprising a pressing device for pressing the products, and to a method of pressing and processing meat products.

Such pressing devices can be used to compress natural meat products and in particular to give them a desired shape in the process so that the product can be fed to further processing steps in an intended or necessary shape or, after the pressing, can be supplied or sold to a consumer in a desired shape that is as similar as possible, for example. Provision can, for example, be made to cut off slices from a meat product and in particular from a fresh meat product and/or from bacon in a step, in particular in a final step, of the processing before a packaging and to form portions from these slices that comprise at least one slice. It may be desired in this respect to produce at least substantially identical slice sizes, a uniform slice weight or portion weight, and a shape of the portions that is appealing to a customer and that has approximately similar slices, for example.

Such portions can subsequently be transferred to a packaging machine and can be placed into packaging depressions provided for this purpose, wherein a visually appealing filling of the packaging can also be aimed for in this respect, on the one hand, and the dimension limits of the packaging depressions have to observed, on the other hand. To make this possible, natural meat products having an initially asymmetrical shape and bacon that is in particular introduced as a natural product into the processing process can be pressed into a symmetrical and at least substantially parallelepiped shape by means of a pressing device before the cutting off of the slices.

In particular to facilitate a cutting off of slices from such a meat product, the meat product can be fed frozen and/or partly frozen to a cutting apparatus that is configured to cut off slices from the products by means of a moving and in particular rotating and/or revolving blade. Such a cutting apparatus can, for example, be configured as a high-speed slicer, wherein such cutting apparatus can achieve a high product throughput with several hundred to some thousand cuts per minute. To be able to achieve steps that are as precise as possible at such high cutting speeds and at the cutting forces associated therewith, provision can be made to guide the products into the cutting apparatus in a frozen or at least partly frozen state or with a frozen margin in order to form a stable edge for the penetration of the blade and to achieve a cut through the product that is as clear as possible. The placing down or falling of the cut-off slices into a region in which portions are formed from the slices can thereby also take place in a controllable manner. Accordingly, it may frequently be necessary to also already press and/or shape the products to be sliced in a frozen and/or partly frozen state in a previous step by means of a pressing device.

The problem results with such natural meat products that they can, for example, vary in their size, shape or contour, or other properties. In this respect, the prices to be obtained on the market for slaughter cattle and for the corresponding meat products, in particular for fresh meat products and/or bacon, can in particular require different sizes of the products to be obtained. For example, in times of high achievable prices, a large number of such products can be sold and made available so that a relatively large number of smaller and leaner pieces in particular have to be processed and pressed at the same time. In times of low market prices, sales are, in contrast, usually put off for longer so that the meat products are predominantly larger and have a higher fat content. To counteract such changes, which can also occur purely by chance in different natural products, it is usually necessary to provide different pressing devices for respective products and to mainly use them at certain times or for products of a certain size.

Furthermore, the difficulty arises of having to control such a pressing process as precisely as possible since the products to be pressed can have a deformability, which is particular also product-dependent, and cracks can particularly form in frozen and/or partly frozen products when too high a pressing force is applied and can result in an unusability of the product both for sales and for a subsequent processing step such as a cutting of the products into slices. In this respect, it is frequently necessary to specify the position into which the contact element is moved for pressing the product on the basis of empirical values which, however, in view of the varying product properties and in particular the varying product sizes, can frequently result in non-ideal results of the pressing process or even in damage to the product.

It is therefore an object of the invention to provide a pressing device for pressing meat products which provides a flexible use for a desired processing of different products, and in particular products of different sizes, and a possibility which is as simple and precise as possible of monitoring and controlling the pressing process.

This object is satisfied by a pressing device having the features of claim 1 and in particular in that the pressing device comprises a servomotor that is configured to move the contact element.

In this respect, the pressing device is provided to press meat products. Such meat products can in particular be processed in a frozen and/or partly frozen state, for example having a frozen surface or a frozen margin, by means of the pressing device. The meat products to be pressed or the pressed meat products can in this respect in particular be fresh meat and/or bacon, wherein these products can be compressed and/or shaped by means of the pressing device both in the frozen state and/or in the partly frozen state and even completely unfrozen.

In general, the counter-element with which the movable contact element cooperates can be configured as a fixed-position wall element, wherein provision can likewise be made to also move the counter-element in the direction of the contact element for the purpose of pressing a product inserted into the pressing chamber. A counter-element can thus generally also be configured as a movable contact element. By moving the contact element in the direction of the counter-element, irrespectively of whether the counter-element is fixed or movable, the inserted product can be compressed between these two elements.

The pressing chamber can provide a planar support surface for the product on which the product is disposed during the pressing. This support surface can in particular be oriented in the horizontal to prevent a movement of the product in the pressing chamber that is caused by gravity. The longitudinal axis of the pressing chamber in this respect faces perpendicular to the outer boundaries of the pressing chamber in the direction of its greatest extent in the plane of this support surface. For a pressing chamber having a rectangular outline, the longitudinal axis consequently extends in parallel with the long sides and perpendicular to the short sides.

The servomotor for moving the contact element can have an electric motor of generally any desired design having a rotor, for example a direct current motor, an asynchronous motor or a synchronous motor, and in particular comprises a measurement device that makes it possible to determine the exact position or the rotational position and/or the angle of rotation of the rotor at any time. In this respect, this position measurement can, for example, take place via a rotary encoder, for which purpose a resolver, an incremental encoder, or an absolute value encoder can in particular be provided.

Furthermore, the servomotor can in particular be a component of a servo drive for moving the contact element, wherein the servo drive can comprise a servo inverter, having power electronics and a regulation device, in addition to the servomotor. A targeted movement of the contact element can thereby be made possible, wherein the servomotor can in particular be position-regulated, torque-regulated, and/or speed-regulated.

Since the pressing device comprises a servomotor or a servo drive by means of which the contact element can be moved, a precise and flexible control and performance of the pressing process can thus be achieved. First, positions in which the contact element is to be arranged in the course of a pressing of a product can be precisely predefined and controlled by means of the servomotor, wherein precise information on a current position of a contact element can likewise be obtained at any time. However, such servomotors in particular enable a controlled process control without a fixed specification of positions or end positions into which the contact element is to be moved since the motor current acting at such a servomotor, in particular with a high and position-independent efficiency of the attached mechanics, allows an exact conclusion in every position of the contact element on the counter-force acting on the contact element and, correspondingly, on the force by which the product is pressed. This makes it possible to always obtain precise information on the applied pressing forces without any use of further sensors and to flexibly move the respective contact element so far until the desired or necessary pressing force acts on the product. Thus, a pressing process adapted to the respective product can always be carried out irrespectively of the respective product size in that, when a smaller product is pressed, the contact element is pressed into that position which is disposed closer to the counter-element in comparison with a larger product and in which the desired or necessary pressing force is registered. It is furthermore possible to carry out the pressing process while taking into account further, for example previously determined, properties of the product and, for example, also properties such as the fat content and/or salt content of the product during the pressing process.

To be able to draw an exact conclusion on the applied pressing force from the determined motor current, the servomotor can in particular be connected via a linear drive to the contact element in which the overall efficiency with respect to a conversion of the rotary drive movement generated by the servomotor into a linear travel movement of the contact element is substantially constant in a position-independent manner. For this purpose, a linear drive can in particular be provided by means of which an efficiency from a motor current input to a pressing force output over the total travel path of the contact element of constantly more than 70% can be achieved. Furthermore, linear drives having an efficiency of more than 80% or more than 90% can be provided. It can thereby also be achieved that current fluctuations dependent on the direction of rotation remain in a relatively small range.

To be able to achieve as high as possible an efficiency, the contact element can be connected to the servomotor via a low-friction linear drive. For example, the servomotor can be connected to the contact element via one or more spindle drives, in particular comprising spindles supported on rolling element bearings, to be able to achieve a high and position-independent efficiency. Alternatively to spindle drives, rack-and-pinion drives, chain drives, and/or toothed belt drives can, for example, be used to convert a rotation generated by the servomotor with a high efficiency into a linear movement of the contact element.

In conventional presses which can, for example, have a crank drive or a hydraulic drive for moving a contact element, higher forces can indeed generally be achieved, for example at the dead center of a crank drive, than by a servomotor, wherein forces corresponding to a weight of 40 t can be possible, for example. However, since the ratio between the pressing force transmitted to the product and the motor current in such drives is, for example, dependent on the stretching of a toggle lever and has strong gradients, an expensive and complex sensor system is in this respect initially required for process monitoring to be able to determine the currently effective pressure, for example. Nevertheless, due to the transmitted forces increasing sharply and quickly in the direction of a dead center, it is frequently not possible to achieve a sufficiently precise process control so that a movement of the contact element into a position that is based on empirical values has to be used, which in particular makes a flexible process performance adapted to respective products difficult or not achievable. Furthermore, the acting forces increasing sharply in the direction of a dead center can damage the product when a position is only slightly set incorrectly such that the product becomes unusable for a further processing or for a sale.

It has been recognized in the course of the invention that pressing forces of approximately 1 $N/mm^2$ are sufficient for achieving ideal results when pressing meat products, in particular frozen and/or partly frozen products, at a temperature of −20° C. at an outer surface in order to achieve the respective desired shape. Correspondingly, ideal results can already be sufficient at considerably lower pressing forces of at most approximately 16 t weight for the meat products to be pressed that can be achieved by means of a servomotor that allows a precise process control. The power of such a servomotor can in this respect amount to approximately 1 kW to 5 kW, wherein provision can be made to move the contact element at approximately 10 mm/s during the pressing.

The use of a servomotor for moving the contact element consequently makes it possible to flexibly process products of any desired size using a single pressing device and to bring them into a desired shape in order to feed the products to further processing steps or to offer them for sale in an intended shape. Provision can in particular also be made to determine properties of the product such as its size, its surface structure, its weight or its salt content and/or fat content already before the insertion or directly after the insertion of a product into the pressing chamber and to take them into account during the pressing. In this respect, the use of the servomotor for moving the contact element enables a sufficiently precise control so that a possible wealth of information on the product can also actually be ideally used for adapting the pressing process.

Furthermore, the precise movement of the contact element by means of a servomotor also makes it possible to bring the product into a shape that is as advantageous as possible, in particular for further processing steps. If provision is, for example, made to cut the product into slices after the pressing by means of a cutting apparatus, in particular by means of a high-speed slicer, such a slicing apparatus can frequently have a product feed that feeds the products to a cutting region in which slices are cut off from the products by means of a moving blade, in particular a revolving and/or rotating blade. In this respect, the products can, for example, be held and guided in a rear region by a product holder to be able to control the guidance into the cutting region and, optionally, to individually perform the guidance in a plurality of tracks. Accordingly, a product residue in which the product holder engages and which is therefore not suitable for the cutting off of slices can remain in such a cutting process. To keep the percentage share of such a product residue as small as possible and to be able to use as large a portion of the product as possible for cutting off slices and for forming portions, provision can, for example, be made to give the product as large a length as possible in the course of the pressing so that the product holder engages into only a small percentage share of the product.

To achieve this, the product can be compressed across its width, for example, by approximately a maximum possible pressing force. In this respect, a precise control of the pressing process is required not to exceed a critical pressing force at which damage to the product, for example a crack formation, occurs. Due to the possibility of drawing precise conclusions, independently of the position of the contact element, on the acting pressing forces from the motor current registered at the servomotor, or from the servo drive comprising the servomotor, and of controlling the pressing process in a corresponding manner, results of the pressing process optimized in this manner can be achieved.

Provision can furthermore be made to bring a product into a shape having as large as possible a height in order, in a subsequent cutting process, to make the falling of the cut-off slices into a region in which portions are formed from the slices more precise or to improve it. In this respect, a movement of the contact element can also take place up to an approximately maximum pressing force to achieve an upward extension of the product with a simultaneous compression in at least one other spatial direction.

Provision can generally also be made to specify a desired end position for the contact element into which said contact element is to be moved in the course of the pressing in order, for example, to compress the product as desired in this direction. The use of a servomotor in this respect makes it possible to take the currently acting pressing forces into account and, for example, to stop the movement of the contact element even before the desired end position is reached if a further movement threatens to damage the product. Due to the predefined end position, products of the same kind, for example products of one batch, can first be pressed into the predefined shape which is thereby always at least approximately the same, wherein, by taking the acting pressing forces into account, the pressing process can nevertheless take place adapted to the respective pressed product. If, for example, a product that is unusually large for a batch enters the pressing chamber within this batch, this product can also be flexibly processed without the need to adapt the settings of the pressing device or without the risk of damaging the product.

As already mentioned, these possibilities of a precise and flexible process control and process performance result from the use of a servomotor for moving the contact element and from the associated exact information on the position of the contact element or on the position and/or the rotational position or the angle of rotation of the rotor of the electric motor. This information that can, for example, be obtained by means of a measurement device, which is comprised by the servomotor and which has a rotary encoder, is not available either in the already mentioned possibilities of moving a contact element by means of a crank drive or a hydraulic drive or in a mere use of an electric motor that is not a servomotor or is not part of a servo drive. In addition, the driving of the contact element by a servomotor makes it possible to determine current forces and thus pressing forces in a precise and position-independent manner to also be able to take such information into account in the process control and process performance. For this purpose, the servomotor can in particular be connected to the contact element via a linear drive that provides a position-independent and in particular high efficiency in the conversion of the rotary movement generated by the servomotor into a linear movement.

The pressing chamber can have a parallelepiped design, wherein the product is disposed on a planar surface during the pressing. The contact element can in this respect, for example, be configured as a longitudinal punch that is movable in the direction of the direction defined by the longitudinal axis of the pressing chamber to compress the inserted product in this direction. Provision can likewise be made that the contact element is movable as a width punch perpendicular to this direction and in the plane of the surface in which the product is disposed to achieve a compression and a shaping in this direction or in the width. Furthermore, the contact element can be moved in a direction which is normal with respect to the plane in which the product is disposed, wherein such a contact element can in particular be moved vertically downwardly as a vertical punch. Provision can generally also be made to configure the support surface of the product itself as a contact element that is accordingly movable normally with respect to this plane and in particular vertically upwardly.

The pressing chamber can have at least three such movable contact elements to be able to press or deform the inserted product in all spatial directions and in particular in a parallelepiped form. In this respect, the product can in particular be disposed in a horizontal plane and can be compressed in this direction by means of a vertically downwardly movable contact element.

In particular for pressing bacon, the contact element and the counter-element can have planar surfaces which can in particular be produced from plastic and which the product contacts during the pressing in order to give said product a substantially parallelepiped shape. Provision can furthermore be made to arrange the contact element and/or the counter-element, or surfaces which are connected to the contact element and/or to the counter-element and which the product contacts during the pressing, in a removable or exchangeable manner in the pressing chamber to extend the flexibility of the pressing device and, for example, to be able to press products into different shapes as desired.

For example, the contact element or the contact elements can be connected to replaceable attachments that form surfaces which the product contacts during the pressing, wherein different attachments having different types of surfaces, for example planar or curved surfaces, can be provided to bring the product into different shapes as desired. Furthermore, the modular removability of the individual components enables a simple cleaning of these surfaces, and in particular of the surfaces which the product contacts during the pressing, to be able to meet the hygiene requirements necessary in the course of the processing of meat products, in particular of fresh meat products.

Further embodiments can be seen from the description, from the dependent claims, and from the drawings.

In some embodiments, the contact element can be connected to at least one linear drive, in particular at least one spindle drive, with the servomotor being configured to drive the at least one linear drive, in particular the at least one spindle drive.

A drive power generated by the servomotor can thus be transmitted via the linear drive or spindle drive to the contact element to move the latter. For example, the servomotor can set a spindle of such a spindle drive into rotation, on which spindle a spindle nut runs that is connected to the contact element so that the movement of the spindle nut can be transmitted to the contact element. Since such a spindle drive directly picks up the rotation generated by the servomotor and converts it into a linear movement of the contact element without further transmission steps or movement components, it is possible in any desired position of the contact element or of the spindle nut to draw a conclusion on a counter-force acting on the contact element, and correspondingly on a pressing force acting on the product, from the motor current acting at the servomotor. Accordingly, the pressing process can be controlled and carried out precisely and flexibly, in particular while taking into account the measured motor current, in dependence on the respective pressed product and in particular on its size, wherein the necessary or ideal pressing forces can be reliably transmitted to the respective product.

The contact element can generally be connected to the servomotor via any desired linear drive that enables a conversion of a rotation generated by the servomotor into a linear movement of the contact element. In this respect, drives can in particular be provided by means of which a directly proportional conversion, which is as low-friction as possible, of a rotary movement generated by the servomotor into a linear movement can be achieved, wherein the efficiency from a motor current input to a pressing force output of such a drive can in particular be position-independent and constant over the total travel path of the contact element. Rack-and-pinion drives, chain drives, and/or toothed belt drives can be considered, for example.

Due to the connection of the contact element to the servomotor via a linear drive that enables a directly proportional conversion of the rotary movement of a motor shaft or of a gear shaft generated by the servomotor into a linear travel movement of the contact element, a position-independent determination of the pressing force generated by means of the contact element can in particular take place by measuring the motor current of the servomotor. In this respect, the efficiency of such a drive from a motor current input to a pressing force output can in particular be constant in the total travel path of the contact element so that the measured motor current can be directly used for a process control in order, for example, to be able to process a product by applying a pressing force that is always constant. In addition, the exceeding of a maximum pressing force, which could result in damage to the pressed product, can be reliably prevented by such a checking of the motor current and without the necessity of a complex sensor system. The use of low-friction drives can furthermore make it possible to achieve a high efficiency.

Provision can furthermore be made that the contact element is connected to a plurality of linear drives, in particular two, three or four linear drives, in particular spindle drives, that can be driven by means of the servomotor. This makes it possible to transmit a linear movement at a plurality of points to the contact element in order to achieve a uniform guidance of the contact element. It is thus possible to counteract a possible tilting or wedging due to torques occurring during the pressing in the case of a drive transmission that, for example, only takes place centrally with respect to the contact element.

A connection with four spindle drives that engage at respective corners of the contact element, which is in particular rectangular, can in this respect in particular be provided for a contact element or a vertical punch that is movable perpendicular to the support surface, on which the product is disposed during the pressing, and that is in particular movable downwardly in a vertical direction. In this respect, such a contact element can in particular be pulled off from below, wherein the vertically movable contact element can be connected to four hollow rods that are arranged at its corners and that are fixedly connected to a spindle nut of a respective spindle drive in a lower region. The spindles on which the respective spindle nuts run can in this respect in particular be arranged within four vertical columns of a base of the pressing device, which supports the pressing device, and can be rotationally fixedly connected to a pulley driven by the servomotor, in particular a belt pulley.

A contact element that is movable in the plane in which the product is disposed during the pressing, but is movable perpendicular to the longitudinal axis of the pressing chamber, can in particular be driven by means of two spindle drives that engage at ends of the contact element which are oppositely disposed along the longitudinal axis.

A contact element that is movable along the longitudinal axis of the pressing chamber can, in contrast, in particular only be driven by means of a spindle drive. Due to the usually narrow extent of the products to be pressed, also of natural products to be pressed such as bacon, perpendicular to the longitudinal axis, at most small torques or tilt torques act on a contact element movable in this direction so that a drive transmission at one point can be sufficient to achieve a reliable and straight-line guidance of the respective contact element along the longitudinal axis. An unnecessary arrangement of further spindle drives with the associated use of the construction space that is only available to a limited degree can thus be avoided.

Furthermore, such a transmission of the drive by means of a different number of spindle drives or linear drives to contact elements that are movable in different directions takes into account the respective desired or necessary pressing forces that can be generated. Thus, for example, pressing forces corresponding to a weight of approximately 16 t can be required for a contact element movable in a vertical direction; pressing forces corresponding to a weight of approximately 8 t can be required for a contact element movable perpendicular to the longitudinal axis and to the vertical; and pressing forces corresponding to a weight of approximately 3 t can be required for a contact element movable along the longitudinal axis of the pressing chamber and can be achieved by the above-described arrangement.

The plurality of linear drives, in particular spindle drives, can be connected to one another via a synchronization element, in particular via a toothed belt, wherein the servomotor can be configured to drive the synchronization element; and wherein the synchronization element can be configured to uniformly transmit a drive power received by the servomotor to the plurality of linear drives, in particular spindle drives.

It can be achieved by such a synchronization element that the spindle drives or linear drives engaging at different points of the contact element move the contact element in a uniformly linear manner. It is thus possible to counteract a possible tilting or canting of the contact element during the movement due to a lack of synchronization and, for example, to a movement of a spindle drive, engaging at a corner of the contact element, that is accelerated in comparison with the further spindle drives, which can lead to considerable damage to the contact element in view of the necessary pressing forces. Furthermore, the plurality of spindle drives can be driven by means of a single and common servomotor in that the servomotor can directly drive the synchronization element and the latter uniformly transmits the received drive power to the plurality of spindle drives. This can in particular enable a compact design and a reduction of necessary components, wherein a reliable synchronization can in particular be achieved in a simple manner by means of a driven toothed belt. For this purpose, the spindles of the plurality of spindle drives can, for example, be rotationally fixedly connected to respective belt pulleys that are set into rotation by means of a toothed belt driven by the servomotor, wherein the contact element can be connected to the spindle nuts running on the respective spindles and can thereby be moved.

Furthermore, the use of a toothed belt as a synchronization element provides further functional and robustness advantages, in particular since no undefined forces act on the drive of the contact element and on the movement mechanism of the press in the event of a tearing of the toothed belt. In such a case, the force flow to the spindles is merely directly interrupted and said spindles remain in their positions due to their self-locking caused by the design.

For example, the plurality of linear drives can be connected to one another via exactly one synchronization element, in particular exactly one toothed belt. In general, however, a plurality of synchronization elements can also be provided that can be connected to a respective proportion of the plurality of linear drives, wherein the servomotor can be configured to drive the plurality of synchronization elements. The plurality of synchronization elements can thereby be driven synchronously with one another by the servomotor so that even when a plurality of synchronization elements are used, a drive power generated by the servomotor can be uniformly transmitted to all of the plurality of linear drives. For example, a servomotor arranged centrally between a plurality of spindle drives, in particular two, three or four spindle drives, can drive a plurality of synchronization elements, in particular two toothed belts, that connect a gear shaft and/or a motor shaft of the servomotor to the spindle drives. Due to the connection of the servomotor to the plurality of spindle drives via a plurality of synchronization elements, in particular radial forces acting on the gear shaft and/or on the motor shaft of the servomotor can be compensated.

Exactly one synchronization element can thus in particular be provided to connect the plurality of linear drives, in particular spindle drives, or exactly two synchronization elements can be provided to connect the plurality of linear drives, in particular spindle drives.

Alternatively to this, provision can also be made to drive the plurality of spindle drives to move a contact element by separate and associated servomotors so that, for example, a contact element movable by means of four spindle drives, which e.g. engage in respective corners of the contact element, can be moved by means of four servomotors. This can in particular make it possible to achieve relatively high pressing forces, wherein the necessary synchronization of the servomotors can be made more difficult in comparison with a use of a single servomotor and with a simple and reliable synchronization of the spindle drives so that an increased risk of damage to the contact element can exist, for example, when one of the servomotors fails.

In some embodiments, the pressing chamber can have a support surface which is substantially oriented in a horizontal plane and on which the inserted product is disposed, with the servomotor being able to be arranged beneath the support surface. The orientation of the support surface substantially in a horizontal plane can enable a stable positioning of the product to be pressed in the pressing chamber without movements of the product due to gravity taking place. In this respect, the support surface can be formed by a stable steel plate that can in particular be held in a holding structure, for example on a plurality of struts, to form a stable framework structure and to be able to reliably absorb the forces occurring during the pressing.

Since the servomotor is arranged beneath the support surface, an entry of contamination into the interior of the pressing chamber and in particular a contamination of the pressed product or of the product to be pressed, for example by oil running down from the servomotor, can be prevented. A possible contamination of the pressing chamber or of the products can thus be avoided to be able to meet the high hygiene requirements with respect to a processing of meat products. A contact element moving down in a vertical direction can in this respect in particular be pulled downwardly by a servomotor that is arranged beneath the support surface of the pressing chamber. Equally, servomotors for moving contact elements that are movable in a horizontal direction can also be arranged beneath the support surface to prevent an entry of contamination into the pressing chamber.

It is, however, generally also possible to arrange the servomotor or a pressing device comprising at least one servomotor or a plurality of servomotors above or at least partly above such a support surface. The same applies to synchronization elements, gears or drive mechanisms or drive elements coupled thereto.

The servomotor can be connected to an evaluation and control device that is configured to evaluate signals of the servomotor and to control the servomotor in dependence on the evaluated signals. Such an evaluation and control device can in particular either measure the motor current acting at the servomotor itself or can receive a corresponding motor current signal from the servomotor or from a servo drive comprising the servomotor and can be configured to determine the pressing forces transmitted by the contact element therefrom. Furthermore, the position of a rotor of the servomotor or its rotational position, a rotational speed, an angular acceleration, a voltage, and/or a current can be determined and can be used in the control of the pressing process. This can, for example, make it possible to move the contact element exactly up to the point at which a desired and predefined pressing force acts on the product which can in particular also be specified in advance and/or determined flexibly adapted to a respective product. Provision can furthermore be made that properties of the product relevant for the required or ideal pressing forces are determined before the insertion of the product into the pressing chamber and that the evaluation and control device automatically determines pressing forces adapted thereto.

For example, the evaluation and control device can for this purpose be connected to a measurement device that is configured to determine at least one property of the products before the pressing. Such a measurement device can in particular comprise a camera and an image evaluation device by means of which the size of the products can be determined before the insertion into the pressing chamber. This information can be transmitted to the evaluation and control device that can be configured to automatically determine parameters for the pressing process adapted to this product or to its size, in particular adapted pressing forces and/or end positions of the contact element, and to carry out the subsequent pressing process using the determined parameters.

Provision can furthermore be made that the evaluation and control device already controls the servomotor to move the contact element before the insertion of the product in order to position the contact element as close as possible to the product as soon as the latter is inserted into the pressing chamber. The time until the contact element comes into contact with the inserted product and can develop a pressing effect can thereby be minimized so that the pressing process can take place as quickly as possible, while taking into account the respective product dimensions.

In this respect, the contact element can in particular already be moved in the direction of the respective counter-element before the insertion of a relatively small product. Equally, for example after a pressing of a relatively small product, a space adapted to a subsequent larger product and sufficient therefor can be provided in the pressing chamber. However, it is not necessary in this respect to return the contact element or the contact elements into respective starting positions after a pressing process, but the return can also take place adapted to the subsequent product. It can thus be achieved with both a larger and a smaller subsequent product that the contact element comes into direct contact with the product after the insertion of the product into the pressing chamber and can develop an adapted pressing effect.

The evaluation and control device can be configured for an automatic control of the pressing process and/or the evaluation and control device can have an interface via which a user can input commands and/or parameters for controlling the pressing process. A user can thus in particular predefine parameters or desired values of parameters, for example on a batch change or product change, to be able to achieve an ideal result of the pressing process.

Provision can furthermore be made that the evaluation and/or control device determines the volume of the pressed product on the basis of the position of the contact element and in particular on the basis of the positions of a plurality of movable contact elements. The precise positionability of the contact element by means of the servomotor can thus provide a further possibility of controlling the pressing process in order, for example, to compress a product to a desired volume or desired dimensions in respective directions. In this respect, an indirect control of the pressing forces can in particular also take place in that, for example, a product whose size was determined before or, optionally, directly before the pressing process in the pressing chamber can be pressed while taking into account its maximum deformability that can be at 10% to 30%, for example. A user can thus, for example, indicate desired percentage deformations of the products, in particular also for different directions, or such deformations can be determined by the evaluation and/or control device, wherein these specifications can be flexibly implemented for different products independently of their size.

In general, the connection of the servomotor to such an evaluation and control device can make it possible to directly control the pressing process, while taking into account the signals of the servomotor, and to use said pressing process to a certain extent for determining the process parameters without a further sensor system being necessary, for example for determining the pressing forces. Such sensor elements can consequently be dispensed with and the information that can be taken from the servomotor can be used in a targeted and intelligent manner. By dispensing with a further sensor system, the complexity of the pressing device and, optionally, its necessary construction space and the manufacturing costs can in particular also be reduced.

Provision can be made that the contact element has a pneumatic cylinder, wherein the pneumatic cylinder is configured to position the contact element in the direction of the counter-element before the pressing. Such a pneumatic cylinder provided in addition to the servomotor used during the pressing makes it possible to move the contact element extremely quickly provided that no large counter-forces have to be overcome. For example, the contact element can thereby be positioned adapted to the size of the product to be pressed before the pressing in order to shorten the distance to be bridged by the servomotor until the contact element comes into contact with the product and can develop a pressing effect. This can in particular take place if the size of the product was determined in a previous step by means of a measurement device and was reported to an evaluation and control device that is configured to control the servomotor and the pneumatic cylinder. Due to such a pre-positioning of the contact element, the necessary time for pressing the inserted product can be reduced and the product throughput can be correspondingly increased. Such a pre-positioning can in particular take place for a contact element that is displaceable along the longitudinal axis of the pressing chamber.

Furthermore, such a pneumatic cylinder can be provided to push a pressed product out of the pressing chamber by means of the contact element after the pressing process and to feed it to further processing steps, for example. Due to the low forces to be overcome, such a pushing out can also take place extremely fast by means of the pneumatic cylinder. The pneumatic cylinder can for this purpose drive a pressure plate and can be movable together with the contact element during the pressing to push the product contacting the pressure plate out of the pressing chamber, starting from the end position of the contact element reached during the pressing. Provision can in this respect in particular be made to push a product out of the pressing chamber along the longitudinal axis thereof so that in particular a contact element movable along the longitudinal axis can have such a pneumatic cylinder.

Provision can likewise be made to first pre-position a product inserted into the pressing chamber by means of such a pneumatic cylinder driving a pressure plate and, for example, to bring said product into contact with the counter-element with which the contact element cooperates. After this accelerated pre-positioning of the product, the pressing process can start through a movement of the contact element by the servomotor.

Alternatively to a configuration of the contact element with a pneumatic cylinder, provision can also be made that the contact element is connected to a servomotor that is configured to position the contact element in the direction of the counter-element before the pressing. In this respect, a further servomotor can generally be provided or the pre-positioning and/or ejection can take place by means of the servomotor that is also used to move the contact element during a pressing of a product. In this respect, provision can in particular be made that the contact element can be driven via a fast servo axle and a slow servo axle. In this respect, the fast servo axle, which can develop correspondingly lower forces, can serve for a fast pre-positioning of the product before the actual pressing process by orienting the product in the direction of the counter-element. The actual pressing process that requires the application of greater forces can, in contrast, take place via the slower and thereby more powerful servo axle. After the pressing, the fast servo axle can, in turn, in particular be used to eject the product from the pressing chamber and to feed it to further processing steps, for example.

The use of such a servomotor having a fast servo axle can also enable an accurate check of a current position of the product on the pre-positioning and/or ejection of the product. The more powerful axle can thereby, for example after the pre-positioning, quickly move, in a rapid traverse, into contact with the product pre-positioned in the pressing chamber by means of the fast servo axle and can only reduce the speed after reaching the product in order to drive the contact element at a slower speed during the pressing and to carry out the pressing process with the necessary force. Due to this exact knowledge of the position of the pre-positioned product, the cycle time or the time necessary for a pressing process can thus in particular be reduced and the product throughput can thereby be increased. Furthermore, such a position determination can also make it possible to monitor the position of the product during an ejection from the pressing chamber to be able to achieve a transfer to further processing steps that is as controlled and precise as possible. For example, the slower servo axle and/or the fast servo axle can comprise a spindle drive and/or a linear belt drive.

A measurement device for determining the size of the product can, for example, have a camera, a scanner, an X-ray machine, or a thermal imaging camera.

In some embodiments, the pressing chamber can have a lateral inlet which extends in the direction of the longitudinal axis of the pressing chamber and through which the product to be pressed can be inserted into the pressing chamber, with the counter-element and/or the contact element being able to be configured to selectively release or block the lateral inlet.

The pressing chamber can in this respect provide a support surface for the product to be pressed within which the longitudinal axis extends, wherein the lateral inlet is arranged at an outer boundary of the pressing chamber that can in particular be oriented perpendicular to the support surface. For example, the lateral inlet can form a substantially rectangular opening in such an outer boundary through which the product to be pressed can be inserted into the pressing chamber. Since the lateral inlet extends along the longitudinal axis of the pressing chamber, it is consequently arranged at a long outer side of this pressing chamber in the case of a pressing chamber having a rectangular outline.

Since the lateral inlet extends in the direction of the longitudinal axis of the pressing chamber, a product, for example bacon, which has a relatively longer longitudinal side and a relatively narrower front side, can be inserted into the pressing chamber from the lateral direction via the longitudinal axis or by a parallel displacement thereto. To insert the product into the pressing chamber, only the path distance corresponding to the narrow extent of the product perpendicular to the longitudinal axis consequently has to be overcome so that this insertion can take place as fast as possible and the cycle time for inserting and pressing a product can be reduced.

It is furthermore possible to provide such a pressing device as part of a system or of a processing line for processing meat products along which the products are fed to different work stations, for example of the pressing device, in a conveying direction. Since the product can be inserted into the pressing device laterally and in particular perpendicular to such a conveying direction, the pressing device can be arranged laterally offset with respect to the conveying direction to the further components of the processing line, such as a feed belt for guiding the products to the pressing device, and the extent of the total processing line along the conveying direction can thereby be reduced. A servomotor that drives a contact element movable along the longitudinal axis of the pressing chamber and correspondingly in the conveying direction of the processing line can thereby in particular be arranged behind the contact element, and correspondingly behind the lateral inlet, in the conveying direction. In principle, the construction space to be provided for this servomotor in the conveying direction can thus be saved with respect to the total extent of the processing line. This construction space saved in the conveying direction is in particular relevant since such processing lines mainly extend in the conveying direction as a rule, wherein the space available in practice is usually limited in one direction, for example in a production hall. A displacement of the pressing device laterally to the conveying direction can thus simplify the design and the possibilities of use of the processing line.

A switch cabinet for controlling the pressing device can be provided at a side disposed opposite the lateral inlet. This switch cabinet can consequently also be positioned outside a conveying direction of a processing line so that its extent can be bounded in the conveying direction. Such a switch cabinet can in particular also have a modular design so that a customer can provide it flexibly and possibly even in a space separate from the pressing device.

Since the counter-element and/or the contact element can be configured to selectively release or block the lateral inlet, a product can consequently first be inserted into the pressing chamber through this inlet, whereupon a pressing of the product can also take place in this direction after a blocking of the lateral inlet.

Provision can be made that the counter-element and/or the contact element is/are movable in a substantially vertical direction to selectively release or block the lateral inlet, wherein the counter-element and/or the contact element can in particular be vertically movable by means of a pneumatic cylinder. In this respect, the movement of the respective element for selectively releasing or blocking the lateral inlet can at least extend in a vertical plane, wherein a vertical movement can in particular be solely provided. Correspondingly, the movement for selectively releasing or blocking the lateral inlet takes place perpendicular to the direction in which the contact element that cooperates with the counter-element blocking the lateral inlet or the contact element that blocks the lateral inlet is moved during the pressing so that these two movements can be decoupled.

To be able to carry out the necessary movement of the respective element for selectively releasing or blocking the lateral inlet as quickly as possible, said movement can take place by means of a pneumatic cylinder that can move the respective element substantially vertically and thus perpendicular to the direction in which the contact element is moved. A movement of the respective element that takes place solely in a vertical direction makes it possible to only provide a small space for this movement and to be able to guide the element through a gap that is as narrow as possible. This gap can in this respect in particular be precisely adapted to the extent of the respective element by the clearly defined movement so that the gap can be closed exactly and substantially without any free space by the element during the pressing process in order to reliably prevent as smooth as possible a transition and an exiting of product parts or liquids from the pressing chamber.

Provision can in particular be made that the lateral inlet is selectively released or blocked by means of a counter-element that is not moved during the pressing process. Such a counter-element can, for example, be configured as a planar wall element and can be connected to a pneumatic cylinder so that a vertical movement through a gap can be achieved in a simple manner. Correspondingly, the movements of the contact element during the pressing and the movement of the counter-element perpendicular thereto for selectively releasing or blocking the lateral inlet can be decoupled and can be carried out by respective elements so that only movements along one direction are required for both elements.

Provision can be made that the pressing device comprises an introduction section onto which the product to be pressed can be placed, wherein the pressing device has an insertion device that is configured to insert, in particular to push, the product to be pressed through the lateral inlet into the pressing chamber.

Such an introduction section can in particular be formed by a conveyor belt onto which the products can be placed or onto which the products are guided after previous processing steps, wherein the insertion device can in particular be configured as a slider that pushes the product from the conveyor belt laterally through the lateral inlet into the pressing chamber. The extent of a processing line in a conveying direction in which the products are mainly conveyed can, in turn, be reduced by this lateral pushing in by arranging the press laterally offset from this conveying direction. Nevertheless, due to the configuration of the pressing device with a relatively small number of components, a narrow design having a width of, for example, approximately 1.5 m perpendicular to the conveying direction can also be achieved.

An introduction section formed by a conveyor belt movable in the conveying direction can furthermore make it possible to lead a product possibly not to be pressed past the pressing device by drawing forward the conveyor belt and to displace said product to further processing steps or into a reject zone. This enables a flexible use of the pressing device in processing lines by means of which the most varied products can be processed, wherein the products can selectively be inserted and pressed into the pressing chamber by means of the insertion device or by means of a slider or can be guided past said pressing chamber. Furthermore, products identified as deficient can, if necessary, be sorted out in a simple manner, by drawing forward the conveyor belt, without being pressed beforehand.

In some embodiments, the pressing chamber can have a longitudinal outlet through which the pressed product can be guided out of the pressing chamber along the direction defined by the longitudinal axis of the pressing chamber, wherein the counter-element and/or the contact element can be configured to selectively release or block the longitudinal outlet.

This longitudinal outlet can, in turn, consequently be blocked during the pressing, for which purpose a counter-element that is not moved during the pressing process can in particular be provided. The longitudinal outlet can thereupon be released to convey the product out of the pressing chamber and, for example, to feed it to further processing steps.

The pressing chamber can in particular have a lateral inlet through which the product can be inserted into the pressing chamber and a longitudinal outlet through which the product can be guided out of the pressing chamber. In this respect, the pressing device can in particular be part of a system or of a processing line within which the products are guided along a conveying direction, wherein the product can be inserted into the pressing chamber perpendicular to this conveying direction and can be guided out of the pressing chamber along this conveying direction. The pressing device can consequently be arranged laterally offset from the conveying direction to be able to reduce the extent of the total processing line in this direction and accelerate the insertion of the products, wherein the product can be guided further along the conveying direction after the pressing.

Provision can be made that the counter-element and/or the contact element is/are substantially movable in a vertical direction to selectively release or block the longitudinal outlet, with the counter-element and/or the contact element in particular being able to be vertically movable by means of a pneumatic cylinder.

The respective element can, in turn, consequently be moved perpendicular to the direction in which the contact element is moved to selectively release or block the longitudinal outlet and the movements can be decoupled. The longitudinal outlet can in particular in this respect be selectively released or blocked by means of a counter-element that is moved downwardly to release the longitudinal outlet in order to block a gap that enables this movement. The product can accordingly be guided through the longitudinal outlet without abutting the boundaries of a gap and without product parts possibly moving into the gap by scraping at the edges thereof. The lowered counter-element releasing the longitudinal outlet can thus extend a planar support surface, on which the product is disposed during the pressing, to be able to convey the product at least substantially in a gap-free manner through the longitudinal outlet. The product can in this respect in particular be pushed through the longitudinal outlet by means of a contact element movable along the longitudinal axis, wherein the contact element can in particular have a pneumatic cylinder or be connected to one for this purpose. Alternatively to a pneumatic cylinder, a servomotor can also be provided for ejecting the product, wherein the servomotor can, for example, be connected to a linear belt drive.

The contact element can be movable in the direction defined by the longitudinal axis of the pressing device and/or the contact element can be movable in a substantially vertical direction and/or the contact element can be movable perpendicular to the direction defined by the longitudinal axis of the pressing device and perpendicular to the vertical. In general, as already mentioned, the described contact element driven by means of a servomotor can thus be movable such that the product inserted into the pressing chamber can be compressed in a respective one of the spatial directions.

The pressing device can have three movable contact elements that cooperate with respective counter-elements, with the three contact elements in particular being able to be movable by means of respective servomotors.

The pressing device can in this respect in particular have three movable contact elements that enable a compression of the product and a shaping as desired in all three spatial directions. To achieve a movement of the respective contact elements that is as precise as possible, each of these contact elements can at least be movable by means of a respective servomotor. At least one servomotor can in particular be provided per movement axis of a respective contact element along which said contact element is moved during the pressing. However, provision can generally also be made to move a plurality of the contact elements by means of a single servomotor, wherein forces of a central drive or of a servomotor can optionally be transmitted by means of a coupling to the respective contact elements or can be tapped in a manner adapted to the operation.

In some embodiments, the pressing device can have a holding structure within which the pressing chamber is supported. This holding structure can in particular be frame-like, grid-like or cage-like and can serve to absorb the forces occurring during the pressing, for which purpose the holding structure can be produced from metal or steel and can in particular be produced as a milled part. For example, this holding structure can support a base plate produced from steel that forms a support surface for the product to be pressed. This base plate can be supported by a plurality of struts of the holding structure so that a stable framework structure is produced. Furthermore, the holding structure can, for example, have a section that extends to the rear in a wedge shape in the direction of the longitudinal axis, that surrounds a contact element movable along the longitudinal axis, and that carries and supports its drive or the driving servomotor. An introduction section on which products to be inserted into the pressing chamber can be placed and an insertion device that inserts the products into the pressing chamber can likewise be supported by the holding structure.

The holding structure can be supported by a base of the pressing device.

In some embodiments, the pressing chamber can have a lateral inlet, through which the product to be pressed can be inserted into the pressing chamber, and a longitudinal outlet through which the pressed product can be guided out of the pressing chamber along the direction defined by the longitudinal axis of the pressing chamber, wherein the longitudinal outlet can be selectively blocked or released by a first counter-element and the lateral inlet can be selectively blocked or released by a second counter-element; and wherein an intermediate frame for receiving and transmitting the pressing forces to the holding structure is arranged between the holding structure and/or the first counter-element and/or between the holding structure and the second counter-element. Both the holding structure and the intermediate frame can in this respect in particular be configured as precise milled parts, wherein the division into two parts makes it possible to design a gap as small as possible that is necessary to selectively release the lateral inlet or the longitudinal outlet. The intermediate frame can in particular be screwed to the holding structure for this purpose.

The intermediate frame can have two torque supports that extend obliquely downwardly and that are connected to the holding structure. During the pressing, a counter-element blocking the lateral inlet and/or the longitudinal outlet can in particular contact the intermediate frame and a respective contact element is moved in the direction of said counter-element so that the pressing forces act on the counter-element. These pressing forces can be transmitted via the intermediate frame to the stable holding structure, wherein torques can have an effect due to the frame-like design of the intermediate frame and its frame-like connection to the holding structure, which torques can be taken up by the additional torque supports and can be conducted to the holding structure.

The pressing device can furthermore have a pneumatic cylinder for ejecting the product from the pressing chamber after the pressing. This pneumatic cylinder can in particular be formed at a contact element movable along the longitudinal axis and can be moved together with said contact element during the pressing, wherein a further pressure plate by means of which the product can be moved through the longitudinal outlet out of the pressing chamber can be connected to the cylinder. It can thereby be achieved that the servomotor or a spindle connected thereto does not have to cover the total distance up to the ejection of the product from the pressing chamber, but that this ejection can take place by means of the pneumatic cylinder.

As already explained above, provision can also be made that the pressing device has a servomotor for the ejection of the product from the pressing chamber after the pressing process has been completed. A contact element movable along the longitudinal axis can in this respect in particular be selectively movable via a fast servo axle and a slow servo axle, wherein the fast servo axle can serve to pre-position a product inserted into the pressing chamber in the longitudinal direction before the pressing and/or to eject it after the pressing, whereas the slow servo axle can be provided to move the contact element during the actual pressing process.

Such a pressing device consequently enables an extremely flexible use, wherein the pressing process can in particular be flexibly adapted to respective products and their sizes. Since the contact element is moved by a servomotor, a precise and controlled process control as well as a desired pressing process can furthermore be achieved without the necessity of a complex sensor system.

The invention furthermore relates to a movable contact element for a pressing device for pressing meat products, in particular frozen and/or partly frozen meat products, preferably fresh meat products and/or bacon, in particular for a pressing device as disclosed herein, comprising a base part; an attachment part; a transverse sliding part; and a height part that are connected to one another at respective connection points and that form a contact surface for a product at one side of the contact element during the pressing, wherein the contact surface has an effective length along a first direction of extent and an effective width along a second direction of extent perpendicular to the first direction of extent, with the effective length and the effective width of the contact surface being variable.

Such a movable contact element or its contact surface which the product at least partly contacts during the pressing can correspondingly be flexibly adapted in two dimensions to the size of a product to be pressed or to the desired or intended shape of the product after the pressing process. Both the effective length and the effective width of the contact surface can be adapted for this purpose.

This makes it possible to flexibly insert different products and in particular products of different sizes into a pressing chamber of a pressing device and to compress them there by moving the contact element, wherein the dimension of the pressing chamber can so-to-say also be adapted to the respective product by the adaptation of the contact surface of the contact element. Consequently, the most varied products can be pressed with unchanging quality and with unchanging results by means of such a pressing device by a contact element variable in two dimensions. It is therefore not necessary, as in the case of conventional pressing devices, to also provide respective pressing devices specifically adapted to different products or products of different sizes for said products. A possible pre-sorting of the products in previous processing steps, for example to feed the products to respective suitable pressing devices, can also be omitted and the time required for such a sorting can be saved.

Such a contact element having a variable contact surface can in particular be provided in a pressing device as that contact element which is movable along a longitudinal axis of a pressing chamber of the pressing device in order to compress a product inserted into the pressing chamber in this direction. In this respect, the effective length of the contact surface can be oriented perpendicular to the longitudinal axis of the pressing chamber and the effective width can correspond to a height of the contact element or of its contact surface in a vertical direction. The second direction of extent can in particular extend perpendicular to a horizontally oriented support surface of the product in a vertical direction.

Provision can likewise be made to provide contact elements that are movable in directions other than along the longitudinal axis of a pressing chamber and that have contact surfaces variable in two dimensions. A contact element movable perpendicular to such a longitudinal axis and/or a contact element movable in a vertical direction can in particular also be configured in such a manner and a pressing device can have a contact element having a variable contact surface or a plurality of contact elements having a respective variable contact surface.

The contact surface of such a contact element can thus in particular be set to the effective length that is suitable for a respective product and that can, for example, correspond to its desired width after the pressing process. In this respect, the contact surface of the contact element is variable by an exertion of a pressure. Accordingly, provision can, for example, be made that the effective length and/or the effective width of the contact surface is/are initially to be set as desired by a respective contact element of a pressing device movable along the first direction of extent or along the second direction of extent, whereupon the contact element adapted to the respective product can be moved for the purpose of compressing the product.

For example, in the case of a contact element that is configured in this manner, that has a variable contact surface and that is configured for a movement along the longitudinal axis of an above-described pressing device or of its pressing chamber, provision can be made that the effective length is variable in a range from approximately 180 mm to 230 mm, in particular in a range from approximately 190 mm to 230 mm. The effective width can in this respect in particular be variable in a range from approximately 30 mm to 50 mm.

In the case of conventional contact elements that can at most have a variability in the height or in one dimension, a product can, in contrast, only be compressed with an extent, unchangeably predefined by the contact element, perpendicular to the direction of travel of said contact element. In this respect, a contact element movable perpendicular to the respective contact element can only be brought into a position predefined by this extent without an adaptation to the product being able to take place. Such a flexible adaptation can, in contrast, be made possible by the contact element disclosed herein that has a contact surface variable in two dimensions.

Provision can be made that the contact element is preloaded in the direction of a maximum effective length and/or in the direction of a maximum effective width so that the contact element can be compressed against this preload, for example by a contact element movable along the first direction of extent and/or the second direction of extent, to change the effective length and/or the effective width of the contact surface. Due to the preload in the direction of the maximum effective length or of the maximum effective width, the gap formed between the margin of the contact surface and an element exerting an pressure can be reliably closed.

Such a preload can in particular be generated in a simple manner by means of a respective spring or a plurality of respective springs.

The contact surface formed by the base part, by the attachment part, by the transverse sliding part, and by the height part can extend unevenly in sections to enable an engagement of the parts into one another and a relative displacement of the parts with respect to one another.

In some embodiments, the respective connection points of the base part, of the attachment part, of the transverse sliding part, and of the height part can be designed such that the pressure acting on the contact surface during a pressing brings about a sealing or a reinforcement of the sealing of the connection points. Elastically deformable sealing elements can in this respect in particular be provided at the connection points and can be deformed, while sealing the connection points, by a pressure acting on the contact surface during the pressing; and/or the base part, the attachment part, the transverse sliding part, and/or the height part can have at least one elastically deformable sealing section that can be deformed, while sealing the connection points, by a pressure acting on the contact surface during the pressing.

To achieve such a sealing, arched and elastically resilient sealing elements can, for example, be provided at the connection points and are deformed when a pressure is applied in the direction of a gap created between two respective parts of the contact element in order to seal said gap. A possible passage of product parts or liquid can thus be counteracted. A sealing of the connection points can likewise be achieved in that at least one of the parts and in particular a plurality of the parts of the contact element have a deformable sealing section that can be deformed when acted on by a pressure in the direction of a gap between the respective parts and seals said gap. Such a sealing section of a part can in particular at least partly overlap another part in the contact surface to be able to achieve the desired sealing in a simple manner when acted on by a pressure.

Sealing elements can be provided at the margins of the contact surface and are configured to seal a connection of the contact surface to further surfaces by a pressure acting on the contact surface and on the sealing element during the pressing. For example, the contact surface can be moved between a further movable contact element and the counter-element cooperating therewith during a pressing, wherein a gap can remain between the margins of the contact surface and these elements. In this respect, the sealing elements can, for example, be formed as elastic and arched in order, during the pressing, to be pressed in the direction of the elements, or of their surfaces, arranged perpendicular to the direction of travel of the contact element or of the contact surface and to seal the gap. Such a gap can in particular be sealed both by a preload of the contact element in the direction of a maximum effective length and/or of a maximum effective width and by sealing elements arranged at the margins during a pressing process.

Provision can be made that the transverse sliding part is displaceable relative to the base part along the first direction of extent. The effective length of the pressing element can consequently be variable by this displacement of the transverse sliding part along the first direction of extent. The extent of a contact element, displaceable along a longitudinal axis of a pressing chamber, perpendicular to this longitudinal axis and in parallel with a support surface for the product can thus in particular be adapted to the extent of the product in this direction or to the desired extent of the product in this direction after the pressing.

The base part can in this respect be arranged in the direction of the first direction of extent and in the direction of the second direction of extent at respective counter-elements, which are not moved during the pressing, in a pressing chamber of a pressing device. Provision can accordingly be made to leave the base element unmoved relative to the other parts during the use of the contact element for pressing products, whereas the further parts can be provided movable relative to the base element, for example by further contact elements of the pressing device, along at least one of the first direction of extent and/or of the second direction of extent.

Provision can be made that the transverse sliding element is preloaded along the first direction of extent in the direction of a maximum effective length. The contact element or its contact surface thus generally has a maximum effective length that can be adapted in the sense of a reduction by an application of pressure, in particular by a pressure applied by a further contact element moved in the course of a pressing of a product, so that the contact surface also experiences a reduction. The preload of the transverse sliding part in the direction of the maximum effective length in this respect in particular brings about a sealing of the gap that is formed between the contact surface and the element exerting a pressure onto the contact surface. An exit of product parts or of liquid through this gap can thus be counteracted.

The attachment part can be displaceable together with the transverse sliding part relative to the base part along the first direction of extent and the attachment part can be adjustable relative to the transverse sliding part and to the base part along the second direction of extent. Accordingly, the attachment part can be adjustable along both the first direction of extent and the second direction of extent so that the attachment part is adjustable in two dimensions overall. Due to a displacement of the attachment part together with the transverse sliding part, the effective length of the contact surface can thus first be adapted, wherein an adjustment of the attachment part along the second direction of extent also enables a change in the effective width of the contact surface in the region in which the attachment part extends along the first direction of extent.

The height part can be adjustable relative to the base part and to the transverse sliding part along the second direction of extent. The effective width of the contact surface in the region in which the height part extends along the first extension axis can thus also be changed by a movement of the height part.

The effective length of the contact surface is generally determined by the positions of the transverse sliding part and of the base part, wherein the effective length can be adapted by a displacement of the transverse sliding part and can in particular be reduced, starting from a maximum effective length. The effective width of the contact surface likewise results from the extent of the base part and of the transverse sliding part in the direction of the second direction of extent and from the positioning along the second direction of extent of the attachment part and of the height part. In a maximum position, the attachment part and the height part can in this respect define a maximum effective width of the contact surface that can be reduced by adjusting the attachment part and the height part along the second direction of extent.

Consequently, the contact element can be formed in four parts and can have a base part that is not moved relative to the other parts during a pressing. Furthermore, a transverse sliding part movable in one dimension, along the first direction of extent, and a height part adjustable in one dimension, along the second direction of extent, can be provided. The remaining attachment part can be adjustable in two dimensions, along the first extension axis together with the transverse sliding part and along the second direction of extent. This design makes it possible to flexibly adapt the contact surface in two dimensions to the requirements of a respective product.

In some embodiments, the attachment part and the height part can be adjustable along the second direction of extent and can be preloaded in the direction of a maximum effective width and at least one synchronization element can be provided that is configured to synchronize an adjustment of the attachment part and of the height part along the second direction of extent. Thus, the effective width can, in turn, be reduced by the preload, starting from a maximum effective width, and can be adapted to a respective product, wherein a uniform reduction of this effective width can be achieved by the synchronization element on an adjustment of the attachment part and of the height part.

The attachment part and the height part can in particular have a respective pressure surface extending perpendicular to the contact surface, wherein the effective width of the contact surface can be variable by an exertion of a pressure onto the pressure surfaces. The effective width can in this respect determine an extent of the contact surface in a vertical direction so that the effective width can be adapted by a further contact element of a pressing device that is downwardly movable in a vertical direction.

A plurality of toggle lever joints which can be connected to one another via associated guide elements can be formed beneath the respective pressure surfaces. This makes it possible to move the pressure surfaces uniformly and in a straight line along the second direction of extent during a change in the effective width of the contact surface and to counteract possible deflections of the pressure surfaces in the sense of a tilting, which deflections may result in damage to the contact element or to a pressing device in view of the forces acting during a pressing.

The movements of the height part and of the attachment part along the second direction of extent for changing the effective width of the contact surface can take place in a synchronized manner. For this purpose, the above-mentioned pressure surfaces can, for example, be arranged disposed above one other in sections, in particular after a displacement of the attachment part together with the transverse sliding part, so that a force acting on one of the pressure surfaces can be transmitted in the direction of the second extension axis to the other one of the pressure surfaces. A section in which the pressure surfaces are disposed above one another can in this respect in particular be arranged centrally with respect to the first direction of extent.

The mentioned preloads of the respective parts can in particular and in a simple manner be generated by means of springs, wherein other and in particular controllable elements can also be provided for this purpose. A desired and predefined or predefinable preload can in particular be generated by means of a controllable element to be able to achieve a reliable and sufficient sealing between the contact surface and further elements contacting its margins.

Such a contact element having a contact surface variable in two dimensions for a meat product to be pressed consequently makes it possible to flexibly adapt the contact element to the dimensions of the product and to press and shape different products and in particular products of different sizes flexibly and as desired. In particular in the case of relatively small products, a desired pressing of the products into a shape having a relatively large height can thereby be achieved, which shape can enable a controlled cutting off of slices in a slicing process of the products which may be provided later and in the course of which slices can be cut off from the products and portions can be formed from them.

The invention further relates to a pressing device for pressing meat products, in particular frozen and/or partly frozen meat products, preferably fresh meat products and/or bacon, in particular to a pressing device as disclosed herein, comprising a pressing chamber which extends along a longitudinal axis and into which a product to be pressed can be inserted, wherein the pressing chamber comprises at least one counter-element and at least one contact element which is movable in the direction of the counter-element and which comprises a base part, an attachment part; a transverse sliding part; and a height part that are connected to one another and that form a contact surface for a product at one side of the contact element during the pressing; wherein the contact surface has an effective length along a first direction of extent and has an effective width along a second direction of extent perpendicular to the first direction of extent, with the effective length and the effective width of the contact surface being variable; and wherein the contact element is furthermore in particular configured as disclosed above.

Such a pressing device consequently has at least one contact element having a contact surface variable in two dimensions for the product to be pressed so that a flexible and optimized adaptation to the respective product to be pressed can be achieved. Furthermore, such a contact element can in particular also be driven by means of a servomotor as described above to be able to achieve a pressing process that can be controlled in a particularly precise and controlled manner with a flexible dimensioning of the contact surface.

The invention further relates to a system for pressing and transferring meat products, in particular frozen and/or partly frozen meat products, preferably fresh meat products and/or bacon, having a pressing device for pressing the products, in particular having a pressing device as disclosed herein, and preferably having a pressing device as disclosed herein, that has a contact element having a contact surface variable in two dimensions as disclosed herein, wherein a conveying device is arranged downstream of the pressing device and is configured to transport the pressed products in at least two tracks along a conveying direction; and wherein a distribution device having a product support surface for at least one product is arranged between the pressing device and the conveying device with respect to the conveying direction and is configured to distribute the pressed products over the at least two tracks of the conveying device.

In this respect, the pressing device can be part of a processing line along which the products are mainly transported in the conveying direction and are processed in a plurality of steps. Provision can, for example, be made to subsequently feed the pressed products to a slicing apparatus, in particular to a high-speed slicer, and to cut off slices from the products from which portions are formed that comprise at least one slice. To be able to increase the product throughput in so doing, provision can be made to perform such a slicing of the products on multiple tracks so that two products can, for example, simultaneously be fed into a cutting region of a cutting apparatus and slices can be cut off from the respective products at substantially the same time. Other processing steps, for example a packaging of the pressed products or of the portions formed therefrom by means of a packaging machine, can also take place on multiple tracks.

The distribution device in this respect makes it possible to flexibly distribute the products over the at least two tracks of the conveying device after the pressing, which conveying device can subsequently transport the products further along the conveying direction and can in particular feed them to processing steps carried out on multiple tracks such as a slicing of the products by means of a slicing apparatus.

The product support surface of the distribution device can be configured as a sliding surface and/or can be formed by a conveyor belt on which the products are disposed and which is configured to transport the products in the direction of the conveying device or in the conveying direction. In this respect, the product support surface can, for example, be movable perpendicular to the conveying direction to be able to selectively transfer a product disposed on the product support surface to a respective one of the at least two tracks of the conveying device. A transfer of a product to the conveying device can in this respect, for example, be achieved by a drawing forward in the conveying direction of a conveyor belt forming the support surface, whereas it is also possible to push a product disposed on a sliding surface in the conveying direction onto the conveying device by means of a slide element, for example.

The distribution device can have a slider movable perpendicular to the conveying direction and an abutment fixed perpendicular to the conveying direction, wherein the movable slider and the abutment cooperate to position the product perpendicular to the conveying direction on the support surface. Due to this positioning of the product perpendicular to the conveying direction, it can be achieved that the product is subsequently transferred in a predefined position perpendicular to the conveying direction to the conveying device and can, for example, thereupon be transported centered in a respective track of the conveying device.

In some embodiments, the distribution device can comprise at least one load cell that is configured to determine the weight of the at least one product disposed on the product support surface.

Provision can generally be made that the product support surface provides space for a plurality of products arranged next to one another and simultaneously transfers them to one track or to different tracks of the conveying device. Provision can equally be made that only one product is simultaneously disposed on the support surface of the distribution device and is first transferred to one of the tracks of the conveying device before a subsequent product is moved onto the distribution device or its product support surface and is subsequently transferred to the conveying device.

A distribution of the products over a plurality of tracks of the conveying device, a track-specific orientation of the products, and a weighing of the products can take place using only a single component of the system since the distribution device can have at least one load cell. The necessary extent of the processing line in the conveying direction can thereby be minimized in that a weighing belt can be saved that would, for example, otherwise have to be provided separately. The number of belt transitions via which the products are transported can thus also be reduced.

Furthermore, the load cell of the product integrated in the distribution device makes it possible to carry out the distribution of the products directly in dependence on the determined product weight. Provision can, for example, be made to fill the tracks of the conveying device as uniformly as possible with respect to the total weight of the products transported in the tracks so that a product that is detected by means of the load cell and that is heavy relative to the previously transferred products can, for example, be associated with a track in which products of a relatively low total weight were transported up to then.

Provision can in particular be made that the conveying device transfers the pressed products in a plurality of tracks to a slicing apparatus that is configured to cut off slices from the fed products on multiple tracks and to form portions from the cut-off slices. In this respect, it may in particular be provided or desired to produce portions having a total weight that is as uniform as possible in both tracks in the course of the processing process so that, in particular on such a further processing of the pressed products, a sorting onto the tracks of the conveying device can take place in dependence on the product weight.

The load cell can be configured to determine the weight of the at least one product disposed on the product support surface at only one contact point. The load cell can in this respect be configured to also detect any torques or tilt torques, which can arise due to a not exactly balanced positioning of the product at the only one contact point, in addition to the weight force acting in a vertical direction. A precise determination of the weight can thereby take place despite the support of the product at only one contact point.

Since only one contact point can be provided at which the load cell determines the product weight, a compact and space-saving design of the load cell can be achieved. The load cell can in particular be movable perpendicular to the conveying direction together with the product support surface to be able to determine the weight of the at least one supported product in every position and in particular also during a movement of the product support surface.

In some embodiments, the load cell can be connected to a control device that is configured to control the distribution device, wherein the control device can in particular be configured to move the product support surface perpendicular to the conveying direction in dependence on the determined weight of the at least one supported product. The control device can in particular be configured to move the product support surface perpendicular to the conveying device and thereby to achieve a distribution of the supported product onto one of the subsequent tracks of the conveying device. Since the load cell can be directly connected to the control device, this distribution of products can in particular take place in dependence on the determined weight of the at least one supported product so that, for example, the plurality of tracks of the conveying device can be loaded with products of approximately the same total weight in the course of the processing process.

In some embodiments, the distribution device can comprise a conveyor belt that revolves continuously in the conveying direction and that forms the product support, wherein the conveyor belt can be supported by a support element; and wherein the support element can be displaceably supported in a guide perpendicular to the conveying direction. In this respect, the support element can be moved perpendicular to the conveying direction in the guide in order to orient the conveyor belt forming the product support surface in the direction of a respective track of the conveying device so that the product can be moved onto the respective track of the conveying device by drawing the conveyor belt forward in the conveying direction. The guide can in this respect in particular have at least one guide tube, in particular two guide tubes, on which the support element is movably supported perpendicular to the conveying direction.

Provision can be made that the conveyor belt is driven in an accelerated manner at least at times to transfer the product onto one of the tracks of the conveying device. To enable a weighing of the product within the distribution device, provision can generally be made to provide the conveyor belt as non-accelerated at least for a certain time period and, accordingly, either as unmoved or as moved at a constant speed. This can make it possible to determine the weight of the at least one product disposed on the product support surface as precisely as possible and without the necessity of a compensation of forces caused by an accelerated movement of the product. In this respect, it can be sufficient to provide such a non-accelerated movement or a resting of the product for approximately 25 ms within which the weighing can take place by means of the load cell.

Since the conveyor belt can in particular be moved accelerated after the weighing, a fast transfer of the products to the subsequent conveying device can be achieved. Due to this accelerated transfer, the pressed products can in particular be fed continuously and without time loss to a subsequent processing step that is carried out more slowly in comparison to the pressing by means of the pressing device disposed upstream of the distribution device, but is carried out in at least two tracks.

In some embodiments, the distribution device can have a plurality of individual belts revolving endlessly in the conveying direction and/or a plurality of belt straps that are spaced apart from one another and that form the product support surface, wherein a lifting element that is configured to raise the product disposed on the product support surface can be arranged beneath the product support surface, and wherein the lifting element can particular be connected to a load cell for weighing the product.

Such a lifting element can, for example, be rake-shaped so that the lifting element can engage between the revolving individual belts or the spaced-apart belt straps to raise a supported product. Since a load cell can be connected to the lifting element, the weighing of the product can take place while the product is raised by means of the lifting element so that the weighing can take place uninfluenced by a movement of the distribution device. Individual belts or the belt straps can in particular accordingly revolve permanently without an interruption of their movement being necessary for a weighing of the product.

The load cell can, in turn, in particular determine the weight of the raised product at only one contact point, wherein the load cell can be configured to detect possible tilt torques of the product, which is correspondingly possibly not disposed in a completely stable and balanced manner on the one contact point, and to take said tilt torques into account in the determination of the weight. The lifting element and a motor necessary for its drive can in this respect be arranged beneath the product support surface so that the construction space that is anyway available there can be used to arrange these components.

The distribution device can be configured to move the product support surface perpendicular to the conveying direction beyond a track of the conveying device that is outwardly disposed with respect to this movement. This can make it possible not to transfer a product disposed on the product support to the conveying device, but rather into a reject zone, for example. This can in particular take place if a weight was determined by means of a load cell integrated into the distribution device, which weight characterizes the product as deficient and, for example, as unusable for a subsequent processing step. Provision can equally be made to determine a quality criterion such as the fat content and/or salt content of a product or its surface property directly after the pressing by means of a measurement device and to sort out a product identified as deficient on the basis of these determined properties.

Such a measurement device can in particular comprise a camera and an image evaluation device by means of which the surface structure of a pressed product can be analyzed so that products that are, for example, pressed with too large a force and that have cracks can be sorted out. The information on this product that is sorted out due to a deficient pressing process can be reported to an evaluation and control device of the pressing device to which the measurement device and/or the distribution device can be connected and which can be configured to adapt the pressing process for further products, while taking this information into account. For example, specifications for the pressing forces to be achieved can then be corrected. Furthermore, the measurement device can have an X-ray machine, a product scanner, a thermal imaging camera, and/or an impedance measurement device.

In some embodiments, a slicing apparatus, in particular a high-speed slicer, can be arranged downstream of the conveying device, wherein the conveying device can be configured to transfer the products to a product feed that is configured to feed the products to a cutting region in which slices are cut off from the products by means of a moving blade, in particular a rotating and/or revolving blade. The conveying device can furthermore be configured to feed the products to a cutting region of a slicing apparatus, in particular of a high-speed slicer, in which slices are cut off from the products by means of a moving blade, in particular a rotating and/or revolving blade.

Accordingly, provision can be made that the conveying device is, for example, formed by one or more conveyor belts that form the tracks of the conveying device and that transfer the products to a subsequent product feed of a slicing apparatus and in particular of a high-speed slicer. In this respect, the conveying device can also comprise a plurality of conveyor belts following one another in the conveying direction for each of the tracks. It is also possible for the distribution device to load the products directly onto the tracks of a product feed of a high-speed slicer or of another slicing apparatus so that the conveying device can form such a product feed.

Provision can be made that a scanning device is arranged at the transition between the distribution device and the conveying device, said scanning device being configured to determine at least one property of the product and in particular to visually examine the surface of the product. The scanning device can in this respect in particular be arranged at a belt transition between two conveyor belts following one another in the conveying direction.

The scanning process can be started when the product arrives at the transition between the distribution device and the conveying device, wherein the total product can be scanned during the advance of the product onto the conveying device. In this respect, the scanning process can accordingly be stopped when the product has been completely transferred to the conveying device.

It is in particular possible to connect the scanning device to a means generating the advance of the product from the distribution device to a respective track of the conveying device. It can thereby be achieved that the current speed of the product can always be transmitted to the scanning device so that a spatially exactly resolved image of the product can also be produced in the case of an accelerated transfer of the product from the distribution device to the conveying device.

In addition to a pure distribution of the products over a plurality of tracks and to a possible weighing of the products, the distribution device can thus also be used to enable an accelerated scanning and the information acquisition on the product associated therewith. Due to an accelerated transfer from the distribution device to the conveying device, it is in particular possible to continuously feed products to a processing step that is slower in comparison with the pressing process, but that is performed on multiple tracks. A decoupling of the accelerated transfer of the distribution device and of the processing step that takes place continuously and more slowly in comparison thereto can accordingly take place by means of the interposed conveying device. The time required for a slicing of meat products into slices can in particular exceed the time required to press the products so that as large as possible a product throughput of products to be cut into slices, such as bacon, can in particular be achieved due to the distribution of the products over two tracks after the pressing.

Such a distribution device accordingly enables a flexible distribution of the products with a simultaneously improved information acquisition, wherein a design of the system that is short in the conveying direction can in particular be achieved by integrating a load cell into the distribution device.

Irrespective of the described system for pressing and transferring meat products comprising a pressing device, the present invention also relates to a distribution device having a product support surface for at least one product that is configured to convey the products along a conveying direction, wherein the product support surface is movable perpendicular to the conveying direction, and wherein the distribution device comprises at least one load cell that is configured to determine the weight of the at least one product disposed on the support surface.

The invention further relates to a method of pressing and processing meat products, in particular frozen and/or partly frozen meat products, preferably fresh meat products and/or bacon, wherein the products are inserted into a pressing chamber of a pressing device, in particular of a pressing device as disclosed herein, and are pressed in the pressing chamber by at least one displaceable contact element, the contact element being moved by means of a servomotor. The contact element can in this respect in particular be designed with a contact surface whose effective length and effective width are variable, as disclosed herein.

A precise pressing process can take place since a servomotor is used to move the contact element. The servomotor in this respect in particular makes it possible to obtain information in every position of the contact element on the counterforce acting on the contact element and exerted by the product and, accordingly, on the pressing force generated by the contact element. For this purpose, the contact element can in particular be connected to the servomotor via a linear drive, for example a spindle drive, a toothed belt drive, a chain drive or a rack-and-pinion drive, by means of which a constant efficiency can be achieved when a rotary drive movement generated by the servomotor is converted into a linear drive movement of the contact element. Whereas higher pressing forces can indeed generally be generated in the case of other kinds of drives, for example crank drives or hydraulic drives, in particular at a dead center, the ratio between the motor current and the generated pressing force varies in this respect, for example, in dependence on a stretching of a toggle lever. Furthermore, the pressing force has large gradients in dependence on the position of a contact element moved by means of such drives so that the respective contact element can usually only be moved into a predefined position without being able to specifically coordinate the pressing process with a respective product. In contrast, the ratio between the motor current and the exerted force of the contact element that is a position-independent ratio in the case of a servomotor, in particular in combination with a linear drive which enables a position-independent efficiency with respect to the conversion of the rotary movement generated by the servomotor into a linear movement of the contact element, allows the contact element to be moved adapted as ideally as possible to a respective product and a desired result to be obtained in the pressing process.

Furthermore, the movement of the contact element by means of a servomotor enables a permanent and precise check of the position of the contact element so that information on the volume of a pressed product or its extent in one direction can be directly determined, for example. In particular due to the possibility of precisely determining the forces acting during the pressing or of generating them in a precise and desired manner by means of the servomotor, it can be achieved that the necessary pressing forces are exactly applied for a respective product, in particular for a product having a certain size. It can furthermore be ensured that product-dependent maximum forces are not exceeded and damage to the product resulting therefrom can be avoided.

Due to a movement of the contact element by means of a servomotor, a check and control of the pressing process can generally take place directly on the basis of signals of the servomotor, in particular on the basis of the motor current, so that an expensive and complex sensor system for checking the acting forces can be dispensed with.

Provision can be made that the contact element is moved in dependence on a signal of the servomotor. Provision can in particular be made to always check the motor current of the servomotor and to determine the pressing force transmitted by the contact element therefrom. In this respect, the contact element can, for example, be stopped when a desired pressing force is reached. On the one hand, this can enable a desired pressing and shaping of the product, whereas it can in particular also be prevented that the product is damaged due to pressing forces that are too high and, for example, becomes unusable for further processing steps or for a sale. This can be achieved independently of the size of the product in this respect so that ideal results of the pressing process adapted to a respective product can likewise be achieved independently of the product size.

In some embodiments, at least one property of the products can be determined by means of a measurement device before the insertion into the pressing chamber and the contact element can be moved in dependence on the properties of the product, with the measurement device in particular being able to comprise a product scanner; a camera; a scale; an impedance measurement device; an X-ray machine; and/or a thermal imaging camera.

Provision can in particular be made to determine the size of the products before their insertion into the pressing chamber so that the contact element can, for example, already be moved in the direction of a counter-element before the pressing. The distance that the contact element has to cover before it comes into contact with the product to be pressed and can develop a pressing effect can thereby be shortened so that the pressing process can be take place in an accelerated manner.

Provision can furthermore be made to determine the fat content and/or salt content of the products, in particular by means of an impedance measurement, before the insertion of the products into the pressing chamber or directly before the pressing in the pressing chamber and to carry out the pressing process in dependence on these properties. Provision can equally be made to examine the product for any foreign bodies before the pressing, for example, by means of a thermal imaging camera or an X-ray machine. On the basis of such a measurement, the pressing forces acting during the pressing can, for example, be adapted or the product can be guided past the press and into a reject zone, for example. Provision can also be made to determine the position of a bone in a meat product or in a fresh meat product, in particular by means of an X-ray machine, and to adapt the pressing forces or their directions accordingly in order to prevent the bone from splintering during the pressing process.

In this respect, the pressing device can be connected to a control device that is configured to automatically determine parameters adapted to the respective product in dependence on the determined property of the product and to carry out the pressing process using these parameters. Provision can, for example, be made that the control device defines end positions for the contact element or for the contact elements or pressing forces to be achieved in different directions as parameters.

Provision can furthermore be made to determine further properties of the products by means of the measurement device that, for example, make it possible to draw conclusions on the quality of the products. This can in particular take place by a camera and an image processing device. In this respect, any wear or losses or damage of the products during previous processing steps or during a storage of the products can also be quantified and reported. Provision can furthermore be made to feed the products to further processing steps after the pressing, wherein said further processing steps can, for example, take place in dependence on the quality of the products or a sorting of the products can take place in dependence on their quality.

The contact element can be moved in dependence on previous pressing processes during the pressing. Thus, the movement of the contact element can, for example, not only take place by taking into account predefined parameters or parameters that are, for example, determined on the basis of a property of the product, but provision can rather be made to take the results of previous pressing processes into account. For example, an initially predefined pressing force can be reduced for subsequent pressing processes if damage to the product due to the pressing, such as a crack formation at the product surface or the splintering of a bone, is detected. In this respect, a control device of the pressing device can in particular be provided that is configured to determine parameters of the pressing process that are adapted to a respective product to be pressed and to move the contact element accordingly, wherein the control device can be configured to take the results of previous pressing processes into account in the determination of the parameters. The control device can accordingly be configured to carry out a self-learning algorithm, wherein the parameters of the pressing process determined for respective products can be continuously optimized.

Provision can be made that the volume of the product is determined on the basis of the signals of the servomotor. The volume can in this respect in particular be determined by a detection of the motor current or by a determination of the position and/or of the angle of rotation of the contact element or of the servomotor. On the one hand, this makes it possible to compress a product up to a predefined or predefinable volume, wherein the pressing process can, on the other hand, be controlled in dependence on the volume of the product or of its extent in respective directions. In this respect, pressing forces can, for example, be generated by means of the contact element that cause a desired compression in the direction in which the contact element is movable. This can also in particular take place adapted to a respective product, wherein compressions of 10% to 30% can typically be achievable for the frozen and/or partly frozen meat products, in particular fresh meat products and/or bacon, that are usually provided and such compressions can, for example, be predefined as process parameters or as results to be achieved.

Furthermore, in some embodiments, a product stiffness can be determined on the basis of the signals of the servomotor, in particular on the basis of a course of a motor current of the servomotor.

For example, a temperature of the product can be determined from the product stiffness.

Since a developed pressing force can be determined from the measured motor current of the servomotor and the position of the contact element can simultaneously be checked at any time, a respective compression of the product by the pressing can be put into relation with the pressing forces required for this purpose. This can be used to determine a stiffness or a deformability of the product since high pressing forces in the case of a small compression indicate a high product stiffness, for example. In this respect, associations between a product stiffness and a temperature can, for example, be provided for certain products to be pressed or to be processed and conclusions on the temperature of the product can be drawn from the determined product stiffness by means of these associations. For example, the temperature determined in this way can be reported to a cooling device arranged upstream or downstream of the pressing device and/or can be used to control such a cooling device in that the cooling device can, for example, be regulated or controlled such that the products enter the pressing device with a predefined temperature and/or product stiffness.

The determined product stiffness can generally also be directly used to control a cooling device without a temperature being determined based on the course of the motor current. In this respect, the temperature of a cooling device arranged upstream of the pressing device can, for example, be increased if a product stiffness that is too high for an ideal pressing process is determined.

Furthermore, the determined product stiffness can be used in some embodiments to recognize foreign bodies, in particular metal parts, in the product. In this respect, expected values for the product stiffness of a respective product can, for example, be present or provided, wherein a deviation from such expected values can be detected as an indication of a foreign body in a pressed product. For example, a metal part that has entered the product can result in a higher determined product stiffness so that such defective products can be recognized by checking the product stiffness and can be sorted out, if necessary. Products having a product stiffness deviating from a desired value can in particular be fed to a monitoring process in which a check is made whether the respective product is suitable for the further processing or has to be sorted out.

In some embodiments, the contact element can be replaceable, and a reference travel may be carried out before a pressing process in order to check the inserted contact element. The reference travel can in this respect in particular be carried out with a force that is reduced in comparison with the pressing process in order to obtain information on the inserted contact element. Contact elements of different types, in particular contact elements of different shapes and/or different sizes, can in this respect in particular be used to press the products into the pressing device to be able to ideally adapt the contact element to a respective product to be pressed. Furthermore, the exchange of the contact element can make it possible to remove a used contact element from the pressing device for a cleaning and to insert it again after the cleaning or to replace it with a clean contact element, in particular a contact element of the same kind.

A reference travel can in particular be carried out before the pressing of a first product, for example after a change or insertion of the contact element, in order, for example, to recognize an incorrectly inserted contact element and to avoid a collision of the contact element with further sections of the pressing device, in particular possible further contact elements, during a pressing process. Possible damage to the pressing device due to such incorrectly inserted contact elements can thereby be avoided. An incorrectly inserted contact element or a collision of the contact element can in this respect be determined for example on the basis of the course of the motor current of the servomotor and a user can, for example, be requested by a warning signal to check the incorrectly inserted contact element or its position.

Provision can furthermore be made that an incorrect loading of the pressing chamber is recognized by means of the signals of the servomotor, in particular of the motor current. Contradictory motor current signals can, for example, indicate an incorrect loading of the pressing chamber in that, for example in the case of products that are too small for a certain batch, an increase in the motor current is only registered with a delay with respect to an expected time or with respect to an expected position when the contact element comes into contact with the unexpectedly and undesirably small product. As mentioned above, it is also possible to recognize foreign bodies on the basis of the motor current via a determined product stiffness so that unusable products can be recognized. In the case of a detected incorrect load, a signal can be output to a user so that the user can sort out the product that incorrectly entered the pressing chamber. Alternatively to this, provision can be made that a product recognized as an incorrect load is automatically sorted out.

Provision can be made that, after the pressing, the products are distributed over different tracks, in which the products are fed to subsequent processing steps, in dependence on a quality criterion and/or on their weight.

All of the products can thus first be pressed in the pressing device that is in particular configured by the driving of the contact element by means of a servomotor to carry out the pressing process in a manner specifically adapted to each of the products. A sorting of the products can then take place in dependence on at least one criterion.

For example, provision can be made to process the products further on multiple tracks in a subsequent processing step in which the products can in particular be cut into slices by means of a slicing apparatus such as a high-speed slicer, wherein it may be desired to process products of approximately the same total weight in the plurality of tracks of the subsequent processing step. Accordingly, after the pressing, a relatively heavy product can be distributed onto a track in which products of a relatively lower total weight were fed to the subsequent processing steps up to then, whereas, after the pressing, a relatively light product can be distributed onto a track on which products of a relatively higher total weight were fed to the subsequent processing steps up to then.

Provision can furthermore be made, in particular by means of a measurement device as described above, to determine at least one property of the product from which conclusions can be drawn on the quality of the product. For this purpose, an image of the product surface can, for example, be taken by means of a camera and can be evaluated by an image evaluation device to detect possible unwanted deformations of the product or cracks in its surface. Provision can equally be made to distribute the products over different tracks in dependence on the fat content or the salt content that can, for example, be determined by means of an impedance measurement.

Provision can be made that the products are sorted in dependence on a quality criterion and/or on their weight before the pressing and are inserted after one another into the pressing chamber in dependence on the quality criterion and/or on their weight.

The products can, for example, be stored in a product magazine, wherein an insertion device can be provided that is configured to insert the products into the pressing chamber. This insertion can, for example, take place in dependence on the weight of the products so that if a relatively heavier product is, for example, required in a subsequent processing step, a relatively heavier product can be inserted into and pressed in the pressing chamber in a targeted manner. This can in particular also be provided if a sorting of the products in dependence on their weight onto a plurality of tracks after the pressing process is provided, wherein the products can, for example, be inserted into the pressing chamber in dependence on the requirement in a track that becomes free next.

Provision can likewise be made to insert the products sorted in accordance with a quality criterion into the pressing chamber in order, for example, to be able to take into account the requirements of a subsequent processing step as early as the insertion into the pressing chamber. Equally, an intended quality of the products in that track to which a product is to be transferred next can also be taken into account in this respect.

In some embodiments, the pressed products can be cut into slices in a subsequent step by means of a slicing apparatus, in particular a high-speed slicer. The pressing device accordingly forms a part of a processing line, wherein the cutting into slices can in particular represent a final step of the product processing and portions can be formed from the cut-off slices. These portions which can comprise at least one slice can subsequently, for example, be transported to a packaging machine and transferred thereto so that the portions can be delivered completely packaged to a customer or a consumer.

The invention further relates to the use of a servomotor for moving at least one contact element of a pressing device for pressing meat products, in particular frozen and/or partly frozen meat products, preferably fresh meat products and/or bacon, in the direction of a counter-element, wherein the contact element and the counter-element cooperate to compress the product. As described above, this use of servomotors for driving such a contact element enables an extremely precise control and performance of the pressing process without the necessity of an expensive and complex sensor system.

The invention will be described purely by way of example with reference to the drawings in the following. Further embodiments can be seen from the introduction to the description and from the dependent claims.

Figure 1B:
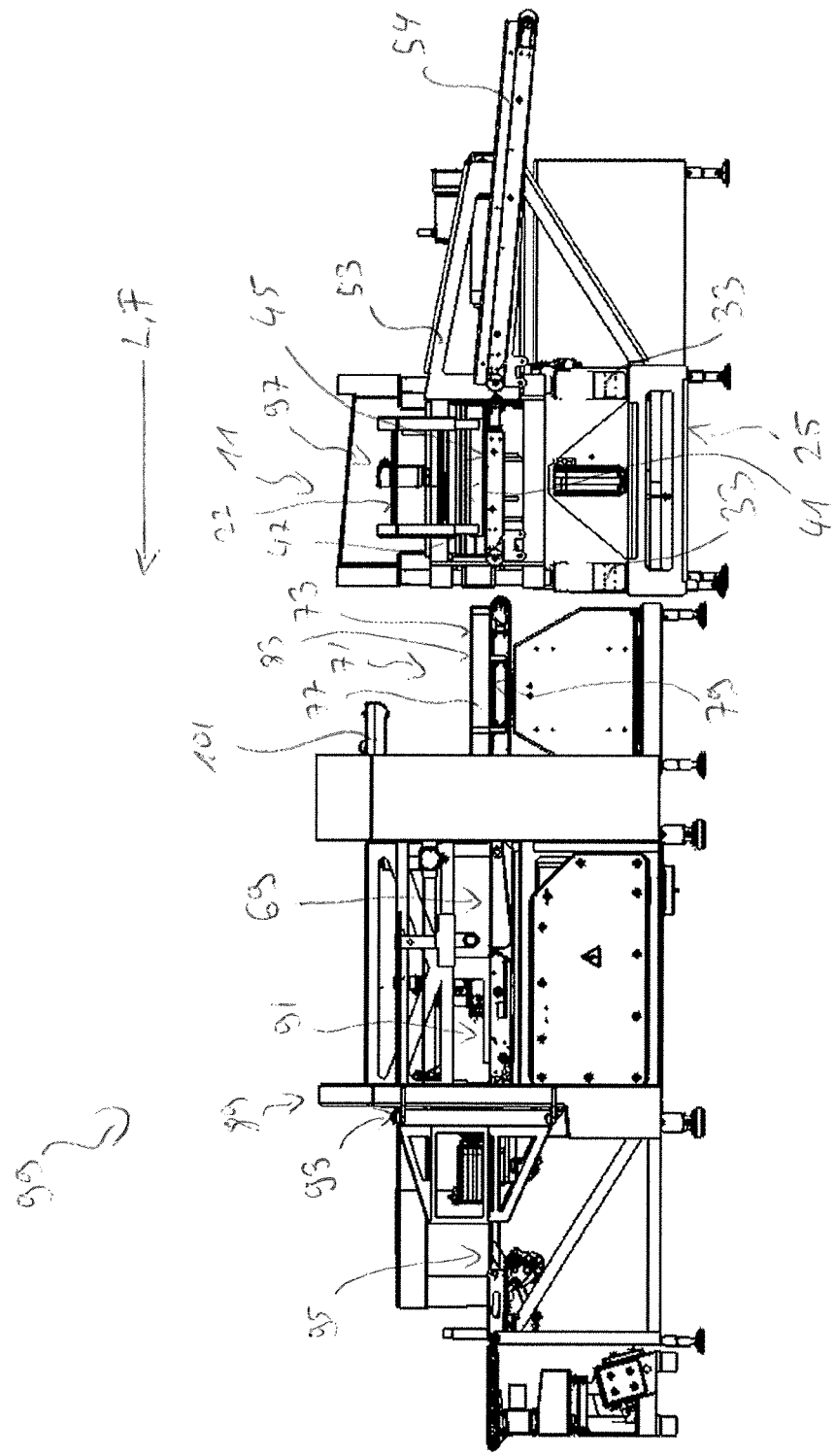
Figure 2C:
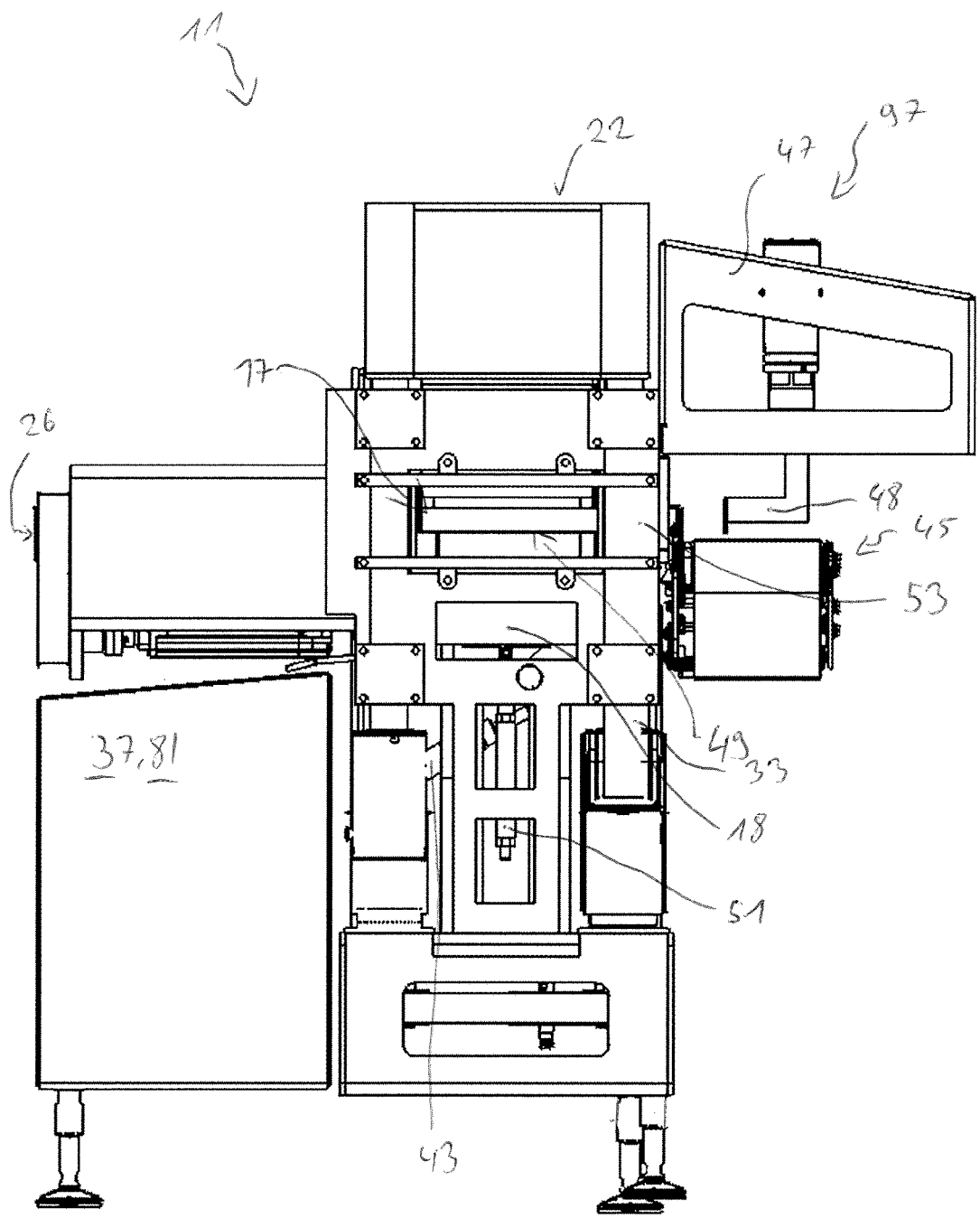
Figure 2D:
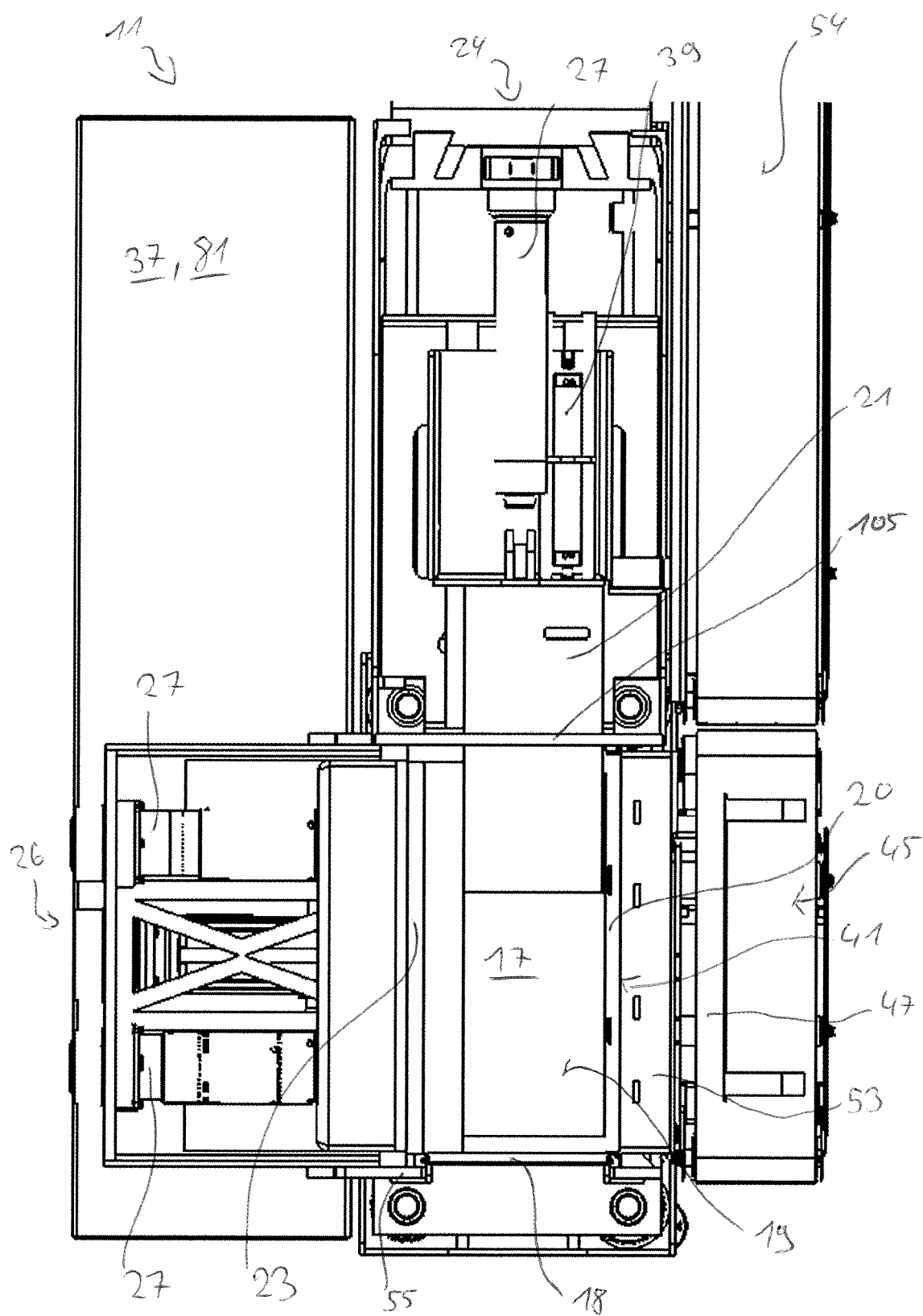
Figure 3B:
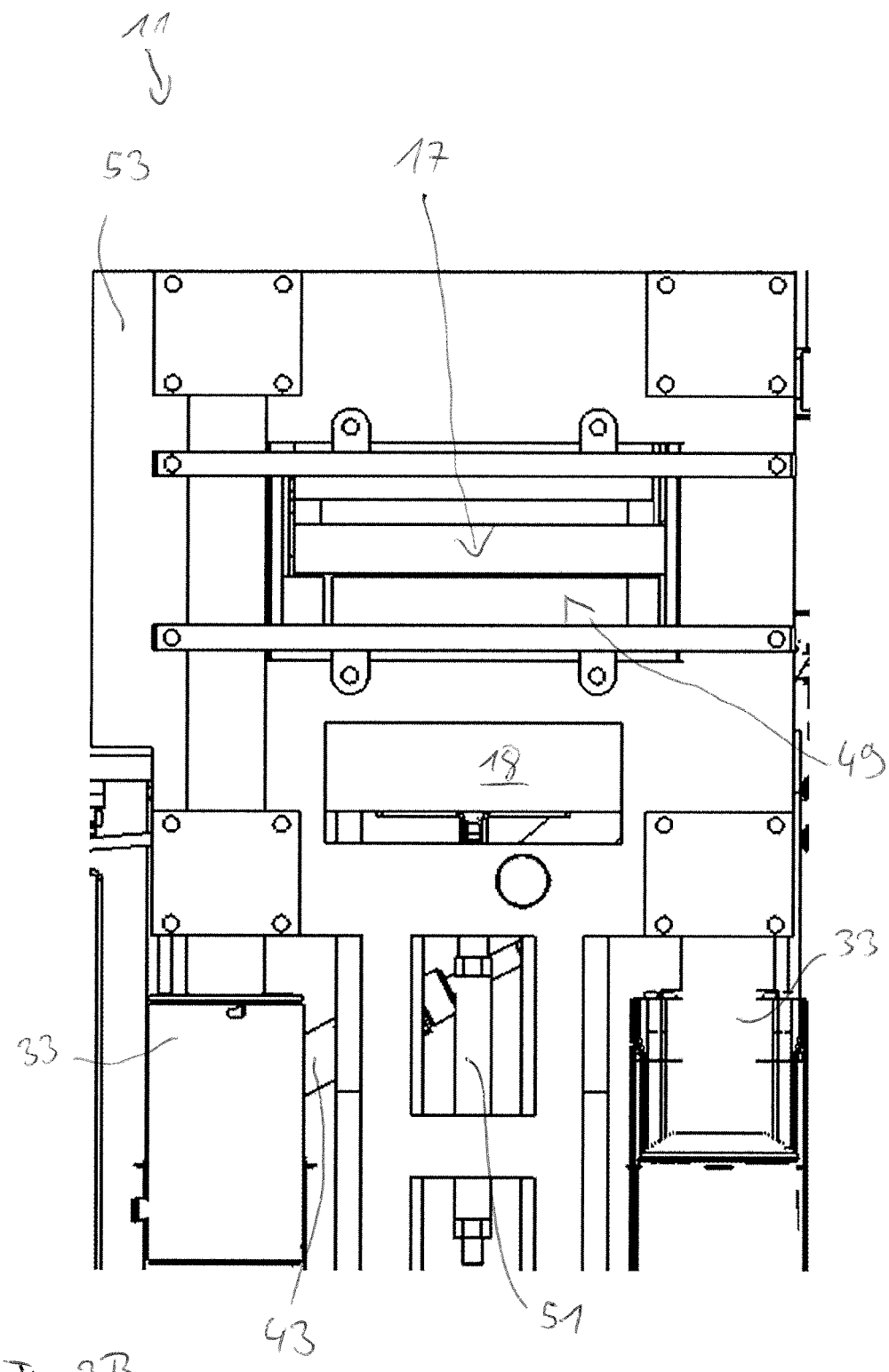
Figure 4A:
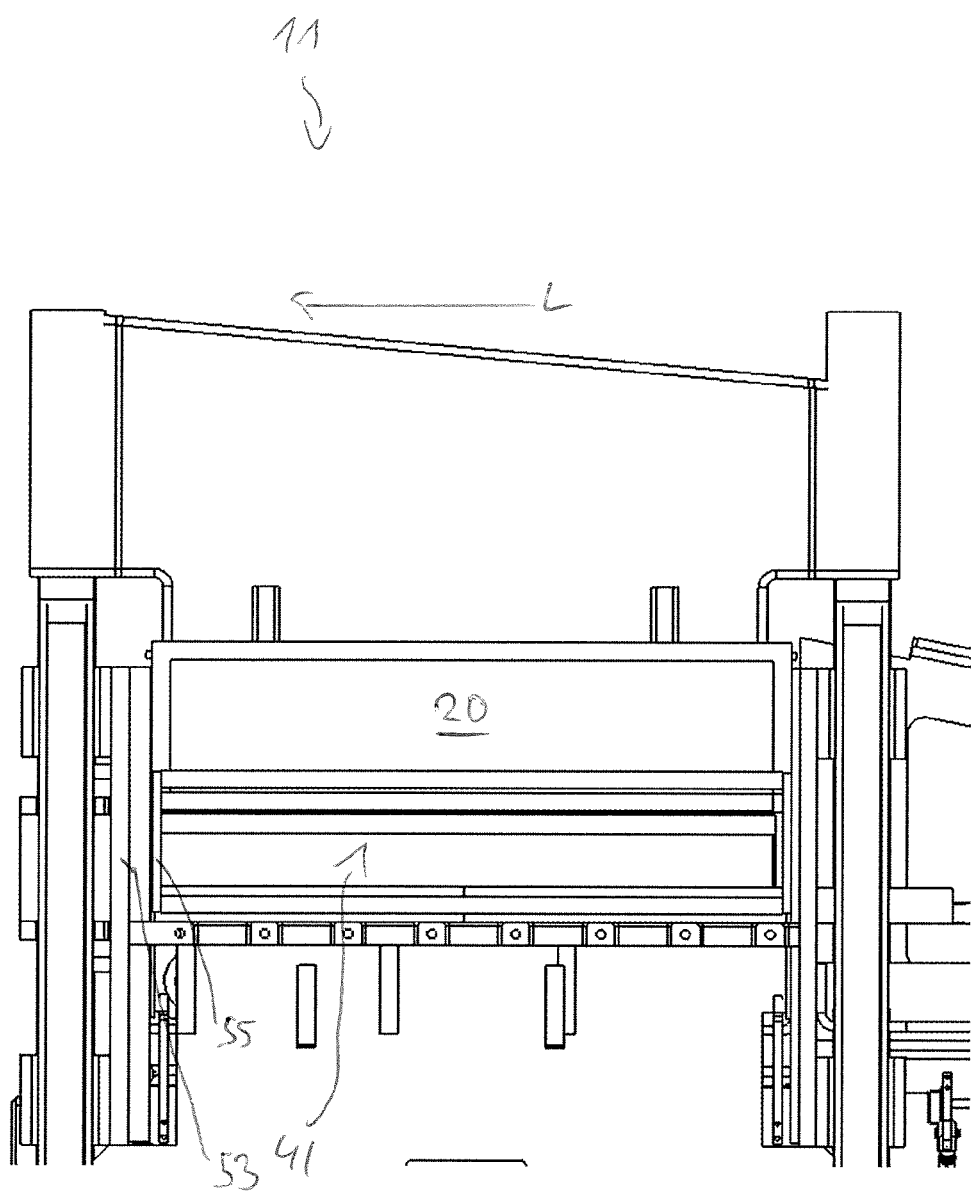
Figure 4B:
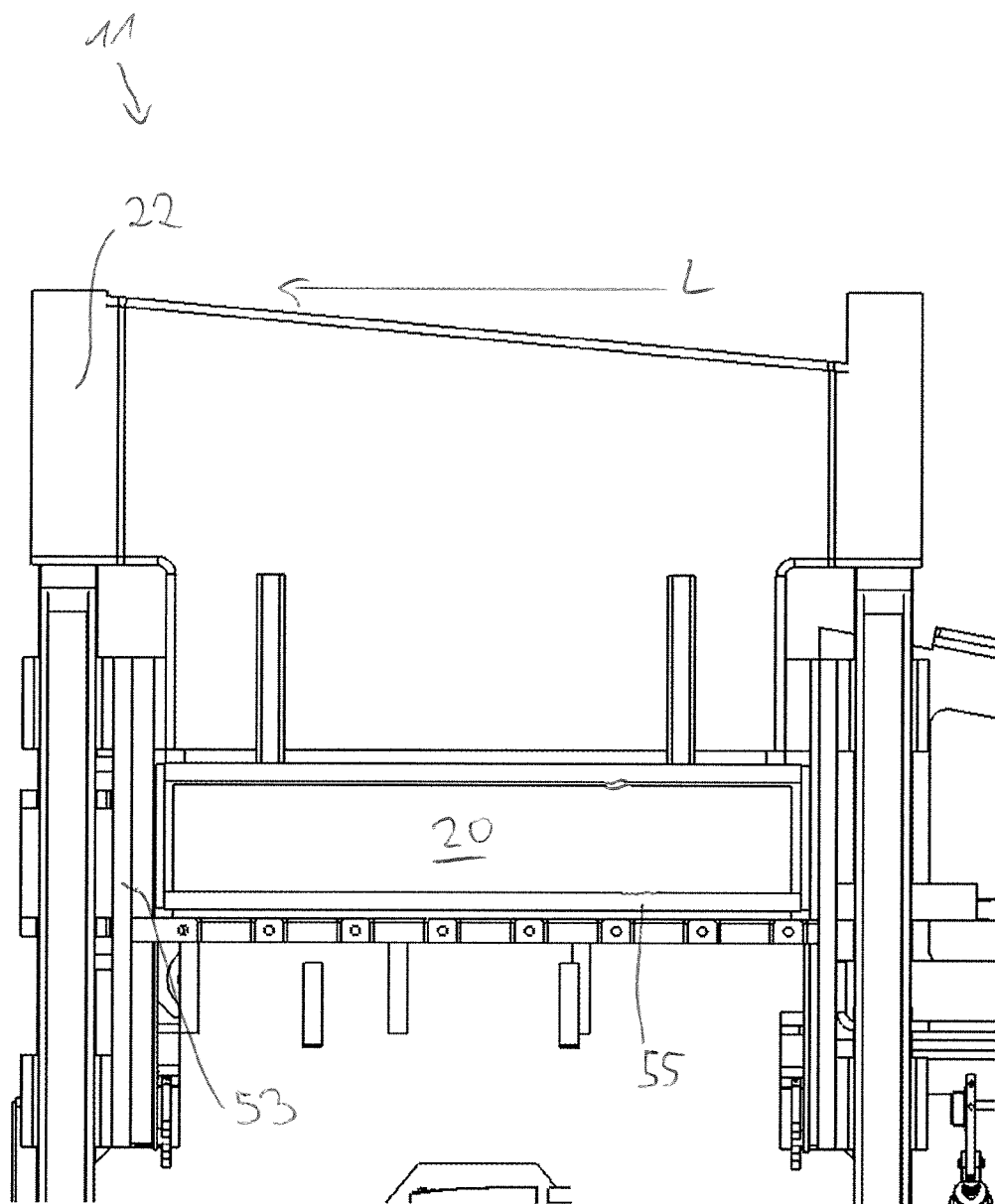
Figure 6A:
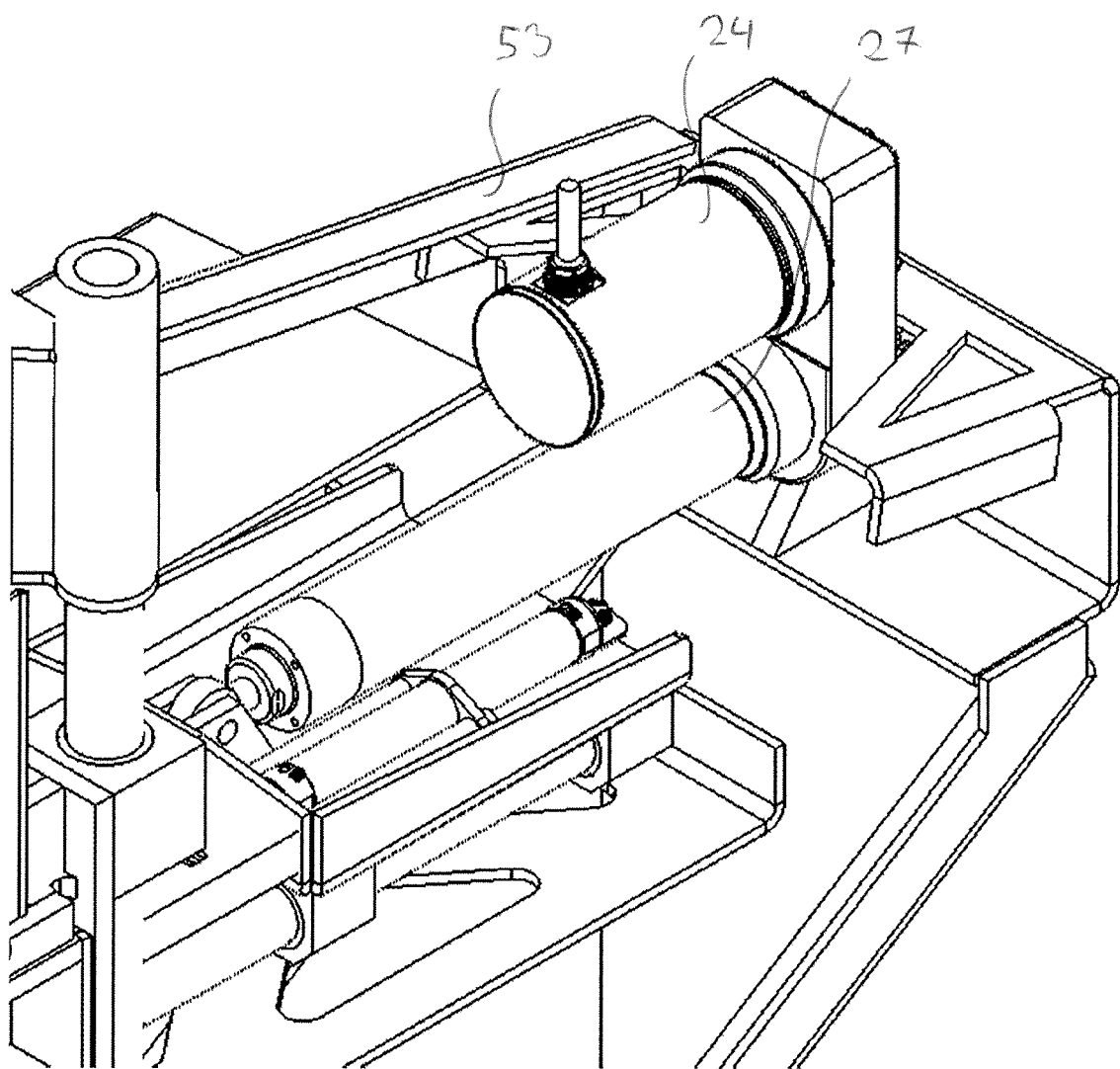
Figure 6B:
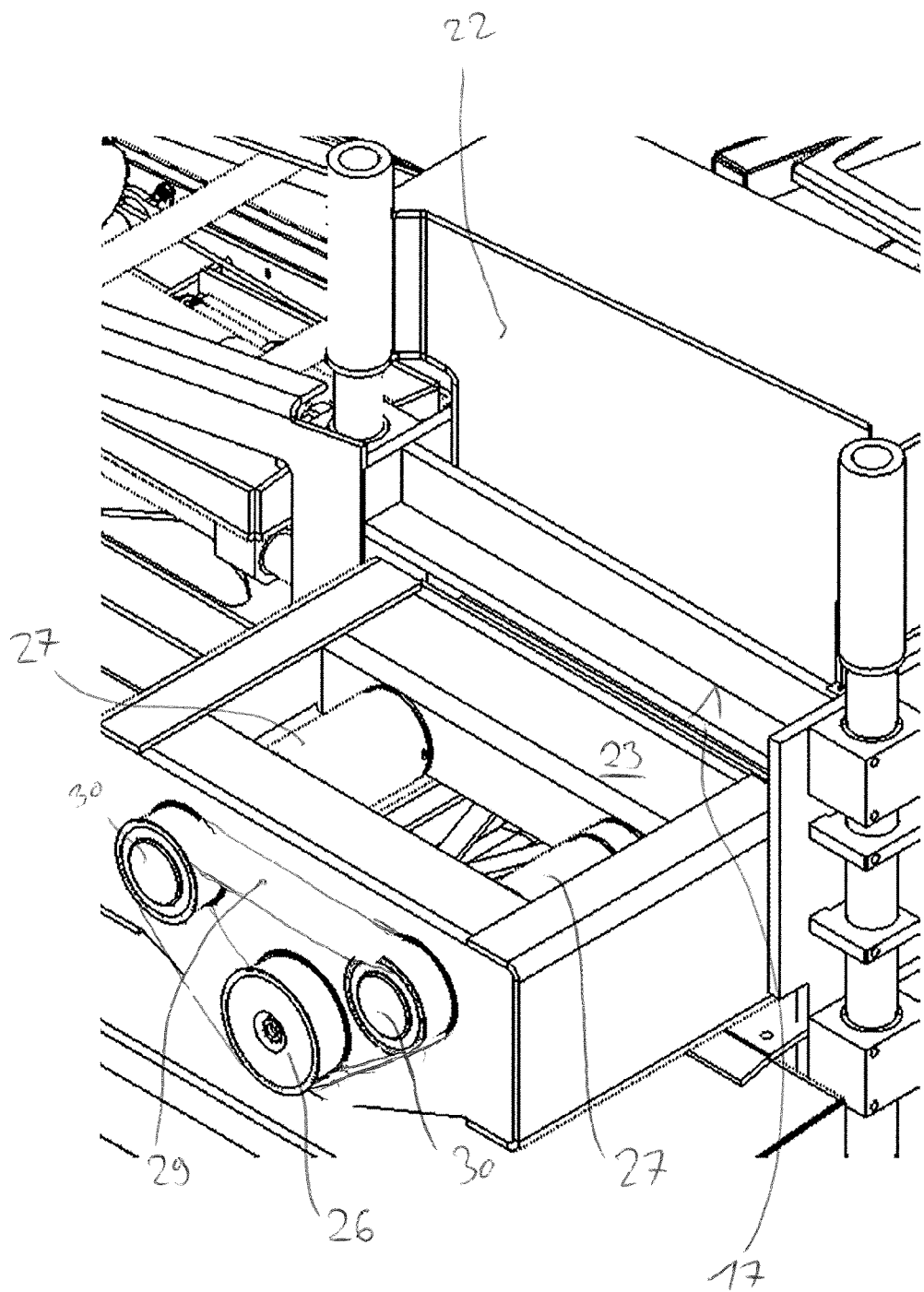
Figure 6L:
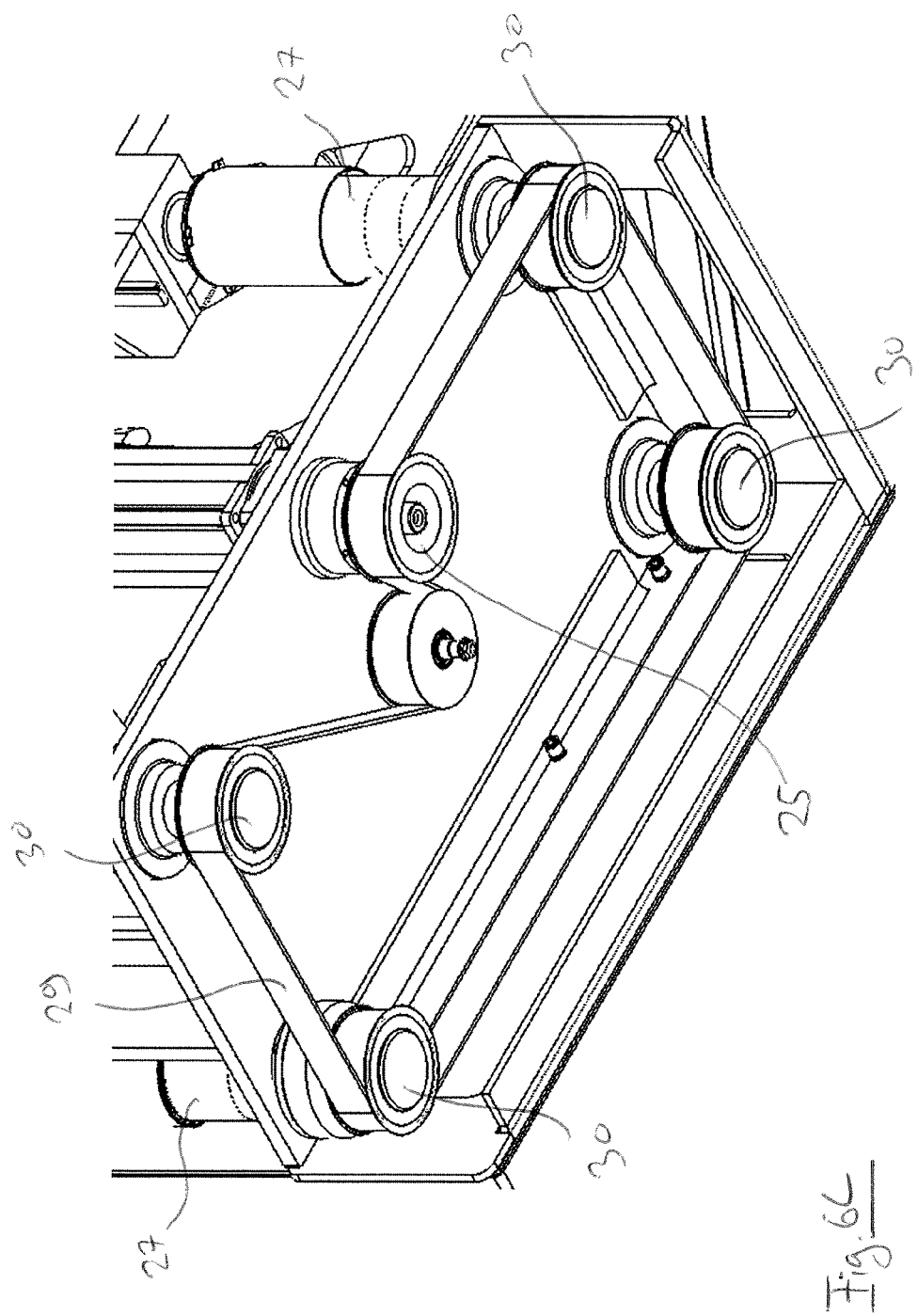
Figure 10A:
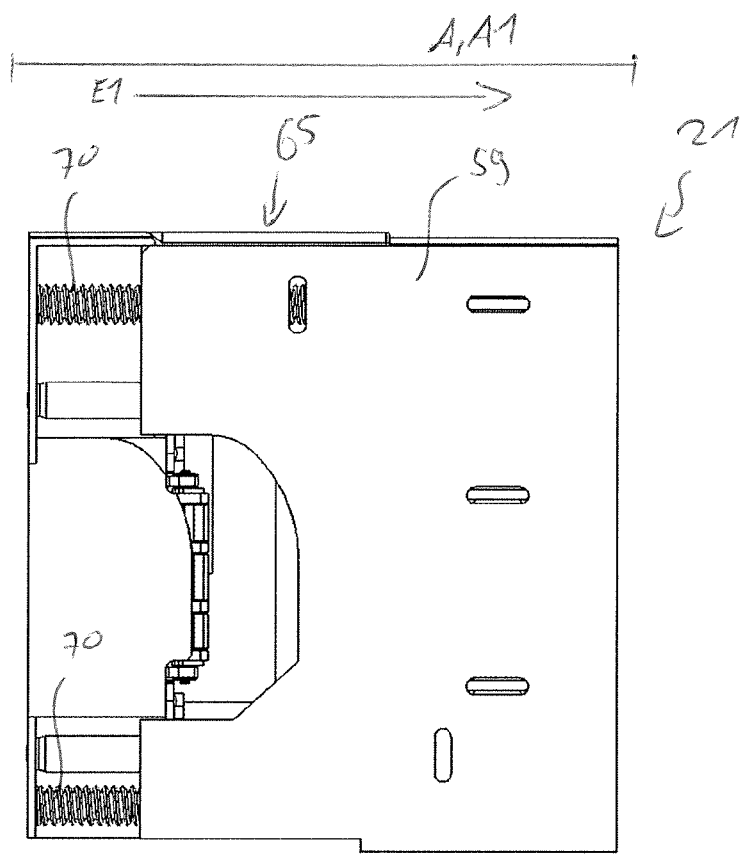
Figure 10B:
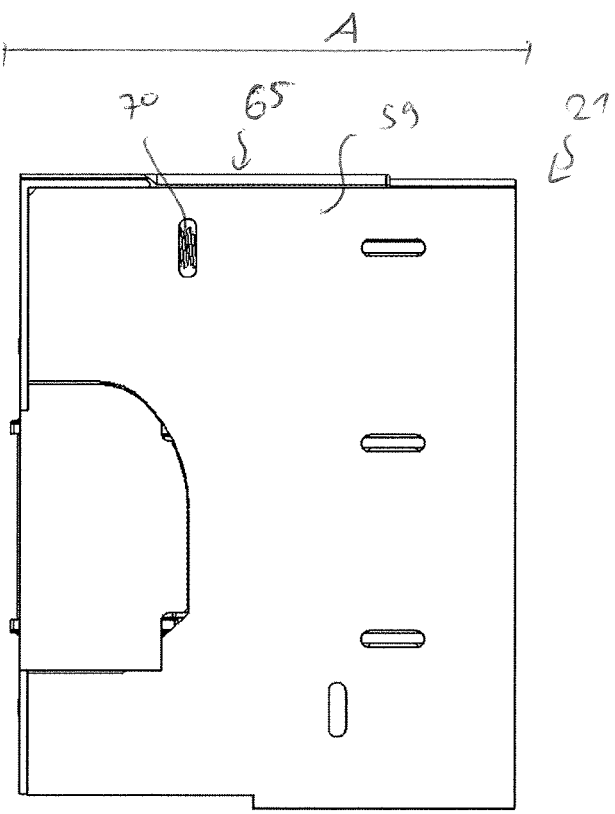

There are shown:

FIGS. 1A to 1C a perspective view, a side view, and a plan view of a system for pressing and transferring meat products, with a pressing device, a distribution device, a conveying device, and a slicing apparatus;

FIGS. 2A to 2D two perspective views, a front view, and a sectional representation in the horizontal of the pressing device;

FIGS. 3A and 3B a respective front view of the pressing device with a blocked longitudinal outlet and a released longitudinal outlet;

FIGS. 4A and 4B a respective side view of the pressing device with a released lateral inlet and with a blocked lateral inlet;

FIGS. 5A and 5B a sectional representation of the pressing device through the pressing chamber in a vertical plane and a perspective front view of the pressing device with a released longitudinal outlet;

FIGS. 6A to 6C respective perspective views of the servomotors for driving three movable contact elements of the pressing device;

FIG. 7 a perspective view of a movable contact element with a contact surface for a product whose effective length and effective width are variable;

FIGS. 8A to 8D respective frontal views of the contact element and the contact surface at different effective lengths and effective widths of the contact surface;

FIGS. 9A to 9D respective sectional representations in a vertical plane through the contact element at different effective widths of the contact surface;

FIGS. 10A and 10B respective plan views of the contact element at different effective lengths;

FIG. 11 a perspective sectional view of the pressing device with an inserted contact element that has a contact surface with a variable effective length and a variable effective width;

FIG. 12 a perspective view of the distribution device; and

Figure 13A:
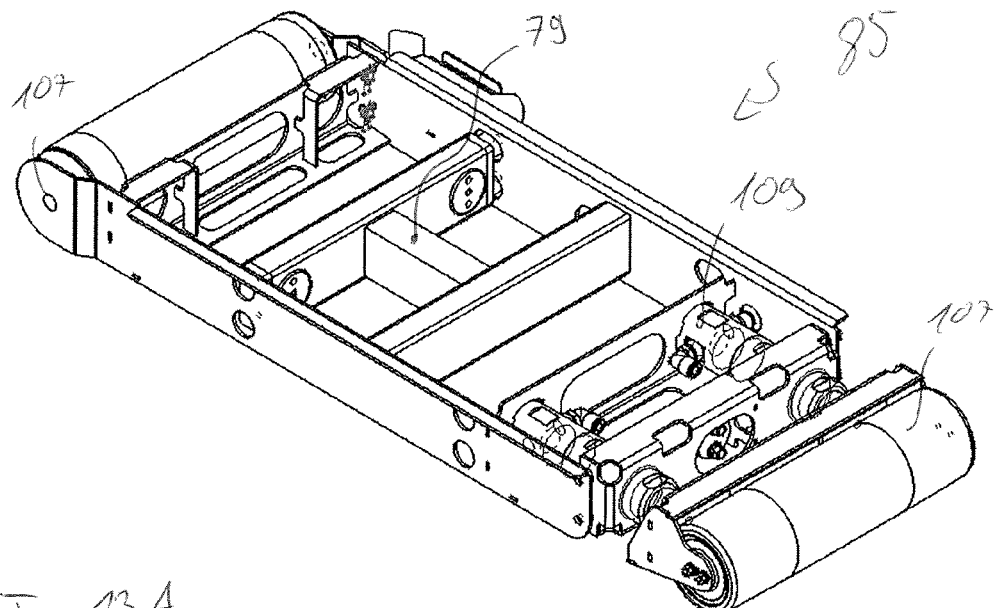
Figure 13B:
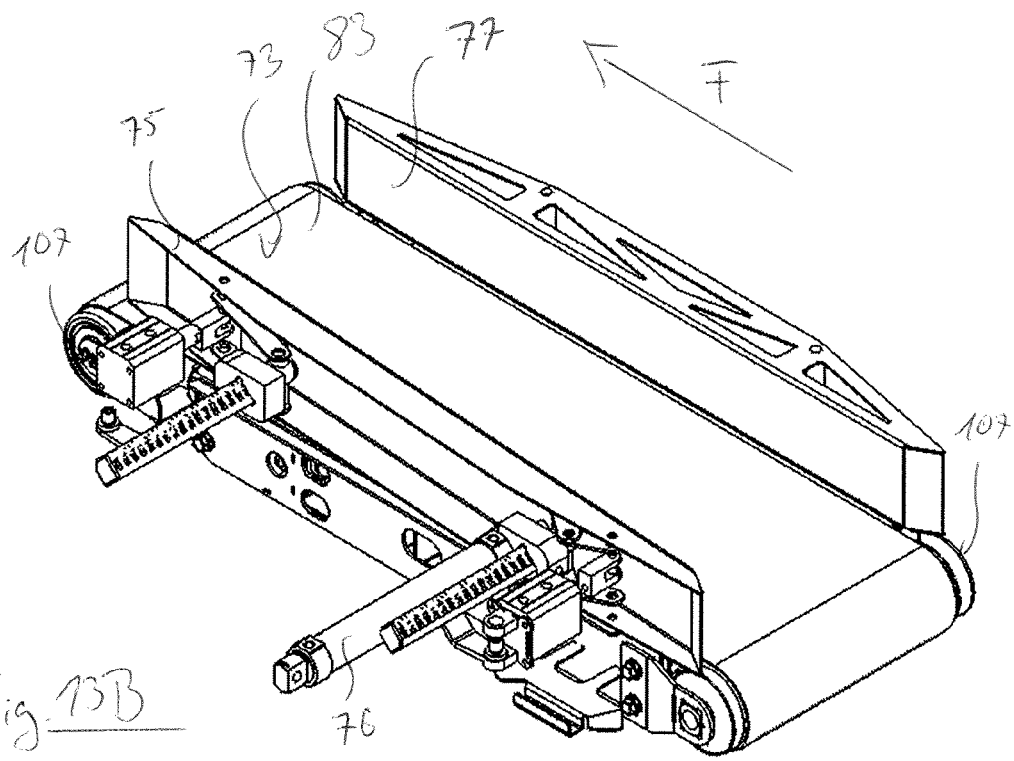

FIGS. 13A and 13B a perspective view of a support element of the distribution device and a perspective view of a conveyor belt that is connected to the support element and that forms a product support surface for the products.

FIGS. 1A to 1C show representations of a system 99 for pressing and transferring products 15, wherein the products 15 not shown in these Figures are substantially guided along a conveying direction F to a plurality of stations 11, 71, 69 and 89.

A respective product 15 first moves via a feed belt 54, which is configured as a conveyor belt revolving in the conveying direction F, onto an introduction section 45 that is likewise configured as a conveyor belt. In the region of the introduction section 45, an insertion device 47 is arranged that is configured to insert a product 15 located in or on the introduction section 45 by means of a slide element 48 into a pressing chamber 17 of a pressing device 11 in which the product 15 can be compressed and/or shaped.

In this respect, the pressing chamber 17 extends in the direction of a longitudinal axis L, which extends in parallel with the conveying direction F, and is arranged offset from the introduction section 45 and from the feed belt 54 in a direction perpendicular to the conveying direction F. On the one hand, this makes it possible to design the system 99 as comparatively compact in the conveying direction F in that the pressing device 11, which mainly extends in the direction of conveying direction F, is arranged laterally offset and is not, for example, connected to the feed belt 54 in the conveying direction F. Furthermore, the lateral insertion of the products 15 into the pressing device 11 by means of the slide element 48 makes it possible to insert a product 15, such as a bacon, extending mainly along or in the direction of the longitudinal axis L of the pressing chamber 17 into the pressing chamber 17 via the direction perpendicular to the longitudinal axis L. Accordingly, only a distance path corresponding to the extent of such a product 15 that is narrow in this direction has to be covered in order to insert the product 15 into the pressing chamber 17 (cf. in particular also FIG. 5B). A fast insertion of the products 15 into the interior of the pressing chamber 17 can thereby be achieved so that the necessary time to insert a product 15 into the pressing chamber 17 and to press it, and thus the time of a complete pressing process, can be minimized as much as possible.

Starting from the pressing device 11, the pressed products 15 move in the conveying direction F onto a distribution device 71 which has a conveyor belt 83 that revolves in the conveying direction F and that forms a product support surface 73 for the products 15. This distribution device 71 is in this respect configured to move the product support surface 73 perpendicular to the conveying direction F in order to transfer the products 15 to two tracks S1 and S2 of a conveying device 69 arranged downstream. The conveyor belt 83 is in particular supported by a support element 85 that is movably supported in a guide 87 perpendicular to the conveying direction F (cf. also FIGS. 12, 13A and 13B).

The conveying device 69 has a respective conveyor belt 103 in both tracks S1 and S2 by means of which the products 15 can be transported further in the conveying direction F. As FIGS. 1B and 1C show, the products 15 move from the conveying device 69 or its conveyor belts 103 onto a product feed 91 of a slicing apparatus 89 that likewise has a respective conveyor belt 103 for both tracks S1 and S2. This slicing apparatus 89 can in particular be configured as a high-speed slicer, wherein the product feed 91 is provided to guide the products 15 into a cutting region 93 of the slicing apparatus 89 in which slices can be cut off from the products 15 by means of a non-visible blade, in particular a revolving and/or rotating blade, and portions that comprise at least one slice can be formed from the slices.

The portions formed subsequently move onto a portion conveying device 95 that can, for example, be configured to transfer the portions to a packaging machine, not shown, so that the portions can be delivered packaged to a customer or another consumer. A scanning device 101 is furthermore arranged between the distribution device 71 and the conveying device 69 and is configured to analyze the surface of a product 15 transferred from the distribution device 71 to the conveying device 69. Furthermore, a measurement device 97 is provided in the region of the introduction section 45 and is configured to determine at least one property of a product 15 to be inserted into the pressing device 11. To be able to take the information obtained by means of the measurement device 97 or the scanning device 101 into account, in particular in the pressing process or in the slicing process, an evaluation and control device 37 is provided for the pressing device 11 and a control device 81 is provided for the distribution device 71. As in particular shown in FIGS. 1A and 1C, said distribution device 71 is also arranged in parallel with and offset from the feed belt 54 and the introduction section 45 so that the extent of the system 99 can be minimized in the conveying direction F.

The individual components of the system 99 will be described in more detail in the following.

FIGS. 2A to 6C illustrate the design of the pressing device 11 in this respect. Said pressing device 11 has a pressing chamber 17 that is supported by a holding structure 53. The holding structure 53 is grid-like or cage-like and has plurality of struts to be able to absorb and lead off pressing forces acting on the outer boundaries of the pressing chamber 17 during the pressing of a product 15. The holding structure 53 extends to the rear in a wedge shape opposite to the conveying direction F and supports a first servomotor 24 as well as a spindle drive 27 for transmitting a drive power generated by the servomotor 24 to a first contact element 21 that is movable along the longitudinal axis L (cf. also FIG. 6A). This contact element 21 that is correspondingly configured as a movable longitudinal punch cooperates with a first counter-element 18 in order to compress the product 15 inserted into the pressing chamber 17 in the direction of the longitudinal axis L (cf. in particular FIGS. 2A, 2B and 2D). The counter-element 18 is in this respect configured as a wall element that is not movable during the pressing.

The feed belt 54 and the introduction section 45 as well as the insertion device 47 are also supported by the holding structure 53.

Furthermore, the pressing chamber 17 has a second counter-element 19 that forms a support surface 19 for the products 15 inserted into the pressing chamber 17. A second contact element 22 that is downwardly movable in a vertical direction cooperates with this second counter-element 19 to compress the product 15 in a vertical direction (cf. in particular FIGS. 2A to 2D). The counter-element 19 can in this respect in particular be configured as a steel plate that is supported by struts of the holding structure 53 so that a stable framework structure is produced and the pressing forces acting on the product 15 and the counter-element 19 in a vertical direction can be reliably led off to the holding structure 53.

A second servomotor 25 is also provided for driving the second contact element 22 that is configured as a vertical punch (cf. also FIG. 6C). This servomotor 25 is arranged beneath the support surface 19 and is configured to pull the contact element 22 vertically downwardly by means of four synchronized spindle drives 27, as will be explained in the following.

Furthermore, the pressing device 11 has a third movable contact element 23 that cooperates with a third counter-element 20 to compress the product 15 inserted into the pressing chamber 17 in a direction perpendicular to the longitudinal axis L of the pressing chamber 17 and perpendicular to the vertical (cf. in particular FIGS. 2A to 2D). To move this contact element 23 configured as a width punch, a third servomotor 26 is provided whose drive power is transmitted to the contact element 23 via two synchronized spindle drives 27 (cf. FIG. 6B).

In the embodiment described here, the counter-elements 18, 19 and 20 are configured as wall elements that are not moved during the pressing, wherein provision can also be made to configure both the contact elements 21, 22 and 23 and the counter-elements 18, 19 and 20 as movable so that the respective cooperating elements can, for example, be moved toward one another during the pressing.

The servomotors 24, 25 and 26 mentioned are provided to move the contact elements 21, 22 and 23 in the direction of the associated counter-element 18, 19 or 20. As in particular FIG. 6A shows, the servomotor 24 provided for moving the contact element 21 movable along the longitudinal axis L of the pressing chamber 17 is arranged behind the pressing chamber 17 in the conveying direction F. This servomotor 24 drives a spindle drive 27 that is connected to the contact element 21.

To move the contact element 23 that is movable perpendicular to the longitudinal axis L of the pressing chamber 17 and perpendicular to the vertical, the servomotor 26 that is arranged at the side of the pressing chamber 17 disposed opposite the introduction section 45 drives a synchronization element 29 configured as a toothed belt (cf. in particular FIG. 6B). This synchronization element 29 uniformly transmits the drive power received by the servomotor to two belt pulleys 30 that are rotationally fixedly connected to respective spindle drives 27 or their spindles. The contact element 23 can in this respect be connected to the spindle nuts of the spindle drives 27 running on the spindles so that the contact element 23 can be moved by the servomotor 26 by means of the spindle drives 27. A synchronization of the spindle drives 27 can be achieved in a simple manner by the direct drive of the synchronization element 29 to be able to prevent a possible tilting or wedging of the contact element 23 during a movement and damage to the contact element 23 or to the pressing device 11 that is associated therewith.

As FIG. 6C shows, the servomotor 25 that is arranged beneath the pressing chamber 17 is provided to drive the contact element 22 movable in a vertical direction. This servomotor 25 drives a synchronization element 29 that is likewise configured as a toothed belt and that is configured to uniformly transmit the received drive power to four belt pulleys 30 that are coupled to respective spindle drives 27. As can in particular be seen from FIG. 5B, the belt pulleys 30 are rotationally fixedly connected to spindles 32 of the spindle drives 27 so that they can be set into rotation by the servomotor 25. The contact element 22 has four round guides 33 that extend vertically downwardly, that are connected to respective spindle nuts 31 of the spindle drives 27, and that run on the spindles 32 together with the spindle nuts 31 so that the contact element 22 can be pulled vertically downwardly by the servomotor 25. Due to the synchronized transmission of the drive power received by the servomotor 25 to the belt pulleys 30 and correspondingly to the spindles 32, a uniform movement of the four spindle nuts 31 can be achieved in a vertical direction. Correspondingly, a uniform force can also be developed in a vertical direction at the four corners of the contact element 22 at which the round guides 33 connected to the spindle nuts 31 are formed.

Since the contact element 23 is moved by two spindle drives 27 and the contact element 22 is moved by four spindle drives 27, a uniform movement of the respective contact element 23 or 22 can be achieved without any torques acting on these elements 23 or 22 during the pressing. A possible canting and possible associated damage to the contact element 22 or 23 or to other elements of the pressing device 11 due to such torques, which can in particular occur with comparatively wide contact elements driven at only one point, can accordingly be prevented.

It is generally also possible, in particular with respect to the contact element 22 movable in a vertical direction, to provide a separate servomotor at each of the corners and to synchronize these four servomotors via a control device, for example. In this respect, there can, however, be the risk of damage to the contact element 22 or to the pressing device 11 due to a deficient synchronization of the servomotors or to a failure of one of the motors.

Since the contact elements 21, 22 and 23 are moved via respective servomotors 24, 25 and 26 or spindle drives 27 driven by the servomotors 24, 25 and 26, a precise and controlled control and performance of the pressing process can be achieved. The servomotors 24, 25 and 26 in particular allow, independently of the position of the respective contact element 21, 22 and 23, the counterforce acting on the respective contact element 21, 22 or 23 and, accordingly, the pressing force acting on the product 15 to be determined on the basis of the measured motor current. In this respect, the motor current of the servomotors 24, 25 and 26 can in particular be evaluated by the evaluation and control device 37 and the respective pressing forces can be determined on the basis of this signal, wherein the evaluation and control device can be configured to move the contact elements 21, 22 and 23 in dependence on the evaluated signals of the respective servomotors 24, 25 and 26.

For example, provision can be made to compress a product 15 as much as possible in the three spatial directions or in at least one direction, wherein the achievable compression can in particular be limited in that an application of too high pressing forces can result in damage to the product 15. In particular in the case of frozen and/or partly frozen meat products such as fresh meat or bacon that can have a frozen margin with a surface temperature of approximately −20° C., an application of too high a pressing force can result in the formation of cracks or in a complete rupture of the inner structures of the meat product.

Since the acting pressing forces can be determined directly and independently of the position of the contact elements 21, 22 and 23 from the measured motor current of the servomotors 24, 25 and 26, the pressing process can thus be precisely monitored and controlled. For example, the movement of the contact elements 21, 22 and 23 can be reliably stopped directly before the maximum pressing force is reached in order to achieve an ideal result of the pressing process. Furthermore, such ideal results can be achieved independently of the size of the pressed product 15 in that smaller products 15 can, for example, also be compressed without restrictions in the process control resulting due to the necessary further movement of the contact elements 21, 22 and 23. Furthermore, it is also possible due to the precise controllability of the servomotors 24, 25 and 26 to flexibly give the products 15 in the pressing chamber 17 a shape as desired.

Provision can furthermore be made to determine at least one property of the products 15, for example their size, by means of the measurement device 97 before the insertion of the products 15 into the pressing chamber 17 and to move the contact elements 21, 22 and 23 or at least one of them in dependence on the determined property. Provision can, for example, be made to already move the contact elements 21, 22 and 23 in the direction of the respective counter-elements 18, 19 and 20 when a relatively small product 15 is inserted into the pressing chamber 17. The distances covered by the contact elements 21, 22 and 23 until they come into contact with the product 15 and can develop a pressing effect can thereby be minimized and the duration of a pressing process can be reduced, which can in particular enable an increased product throughput.

As can in particular be seen from the front views of FIGS. 3A and 3B, the counter-element 18 cooperating with the contact element 21 is movable in a vertical direction to selectively block (cf. FIG. 3A) or release (cf. FIG. 3B) a longitudinal outlet 49. To enable this movement, the counter-element 18 is connected to a pneumatic cylinder 51 that moves the counter-element 18 downward in order to release the longitudinal outlet 49.

A pressed product 15 can thus be conveyed through the longitudinal outlet 49 in the conveying device F out of the pressing device 11 or of the pressing chamber 17, wherein a gap, which is necessary to enable this vertical movement of the counter-element 18, can in particular be closed by the downwardly guided counter-element 18. The product 15 can accordingly be guided over a substantially planar surface and can be transferred to the distribution device 71 without the risk of product parts releasing at an edge of the gap.

To convey the product 15 through the longitudinal outlet 49, the contact element 21 movable along the longitudinal axis L is connected to a pneumatic cylinder 39 that is movable together with the contact element 21 by the servomotor 24 during the pressing. This pneumatic cylinder 39 is configured to move a pressure plate 105 along the longitudinal axis L of the pressing chamber 17 after a pressing process in order to push the product 15 through the longitudinal outlet 49. In this respect, the pneumatic cylinder 39 in particular enables a fast pushing out of the product 15. Furthermore, the pushing out accordingly does not have to take place by means of the spindle drive 27 so that the distance to be covered by means of the spindle drive 27 can be limited to the requirements of the pressing process.

The pneumatic cylinder 39 can furthermore be used to position the contact element 21 before or in particular directly after an insertion of a product 15 into the pressing chamber 17 in order, for example, to orient the product 15 in the direction of the longitudinal axis L of the pressing chamber 17 and to bring it into contact with the counter-element 18. This orientation can in particular take place accelerated by the pneumatic cylinder 39, wherein the pressing process can then be carried out by a movement of the contact element 21 by means of the servomotor 24.

Alternatively to the pneumatic cylinder 39, it is also possible to provide a servomotor, for example the servomotor 24 or a further servomotor, for the ejection and/or pre-positioning of a product 15, wherein this servomotor may in particular be connected to a linear belt drive. In this respect, a fast, less powerful servo axle and a slower, powerful servo axle can in particular be provided, wherein the pre-positioning and/or ejection of a product 15 can be carried out by means of the fast servo axle, whereas the actual pressing process can be carried out by means of the slow servo axle. This can, for example, make it possible to precisely determine the position of a pre-positioned product 15 and to move the more powerful servo axle to this position in a rapid traverse so that the pressing process can start immediately and cycle times or the duration of a pressing process can be minimized.

Furthermore, an intermediate frame 55 is arranged between the counter-element 18, which blocks the longitudinal outlet 49, and the holding structure 53, said intermediate frame 55 being configured to lead pressing forces acting on the counter-element 18 during the pressing off to the holding structure 53 (cf. in particular FIGS. 2C, 2D, 3A and 3B). The holding structure 53 and the intermediate frame 55 can in this respect be configured as a respective milled part, wherein, due to this two-part design, a narrow gap can in particular be achieved between the intermediate frame 55 and the counter-element 19 that forms a support surface for the products 15 and that can be closed with an exact fit by the counter-element 18. A possible exit of product parts or liquid through this gap can be correspondingly counteracted by such a precise design having an exact fit. In this respect, the intermediate frame 55 can in particular be screwed to the holding structure 53.

As FIGS. 4A and 4B show, the counter-element 20 cooperating with the contact element 23 is also movable in the vertical direction to selectively release or block a lateral inlet 41 through which the products 15 move into the pressing chamber 17. To release the lateral inlet 41, the counter-element 20 can in this respect be moved vertically upwardly, as FIG. 4A shows, in particular in order to achieve a stable structure of the pressing chamber 17 in the region of the support surface 19. To enable the vertical movement, the counter-element 20 is in this respect connected to a pneumatic cylinder 43 (cf. FIGS. 3A and 3B).

An intermediate frame 55 is also arranged between the counter-element 20 and the holding structure 53 to be able to lead off forces that act on the counter-element 20 during the pressing to the holding structure 53. As FIG. 5A shows, the intermediate frame 55 furthermore has torque supports 56, which extend obliquely downwardly, to be able to transmit any torques that act on the counter-element 20 during the pressing to the holding structure 53 so that they can be absorbed by the holding structure 53.

FIG. 7 shows a perspective view of the contact element 21 that can be inserted into the pressing device 11 (cf. FIG. 11) to compress a product inserted into the pressing chamber 17 along the longitudinal axis L. In this respect, the contact element 21 has a base part 57, a transverse sliding part 61, an attachment part 59, and a height part 63 that form a contact surface 65 for a product 15 at one side during the pressing. In this respect, the contact surface 65 has an effective length A along a first direction of extent E1 and an effective width B along a second direction of extent E2, wherein the first direction of extent E1 here extends perpendicular to the longitudinal axis L and in the plane of the support surface 19 of the pressing chamber 17 and the second direction of extent E2 extends perpendicular to the first direction of extent E1 and in a vertical direction. In this respect, both the effective width B and the effective length A of the contact surface 65 are variable.

The contact surface 65 is uneven in sections in this respect to enable a displacement of the parts 57, 59, 61 and 63 relative to one another. In this respect, a first sealing section 111 of the attachment part 59 overlaps the transverse sliding part 61 and the base part 57 and a second sealing section 113 of said attachment part 59 oriented perpendicular to the height part 63 overlaps the latter. The transverse sliding part 61 also has a sealing section 115 that overlaps the base part 57 and a sealing section 117 of the height part 63 overlaps the base part 57 (cf. also FIGS. 8A to 8D). These sealing sections 111, 113, 115 and 117 can be provided to seal the connection points of the parts 57, 59, 61 and 63 when a pressure acts on the contact surface 65 and correspondingly acts on the respective parts 59, 61 and 63 during the pressing.

The sealing sections 111, 113, 115 and 117 can in this respect in particular be elastically deformable in order to be deformed when a pressure is applied in the direction of one of the parts 57, 61 or 63 that overlaps the respective sealing section 111, 113, 115 or 117. Gaps present between the parts 57, 59, 61 and 63 to enable a smooth movement of the parts 57, 59, 61, 63 relative to one another can thus be reliably sealed during the pressing by the sealing sections 111, 113, 115 and 117 so that any or a possible passage of product parts or liquids through these gaps can be prevented. Alternatively or additionally to this, provision can also be made to provide the attachment part 59, the transverse sliding part 61, the height part 63, and/or the base part 57 with respective sealing elements, in particular elastically deformable sealing elements, to achieve such a sealing of the connection points.

As FIG. 8A shows, the contact surface 65 can be brought into a state with a maximum effective length A1 and a maximum effective width B1.

The transverse sliding part 61 and, together with it, the attachment part 59 can in this respect be moved relative to the base part 57 and to the height part 63 along the first direction of extent E1 so that the effective length A of the contact surface 65 can be reduced, as shown in FIG. 8B.

As FIG. 8C shows, the attachment part 59 is adjustable in a synchronized manner with the height part 63 relative to the base part 57 and to the transverse sliding part 61 along the second direction of extent E2 so that the effective width B of the contact surface 65 is also variable. It is furthermore possible to move the attachment part 59 in a synchronized manner with the height part 63 along the second direction of extent E2 without the attachment part 59 having been previously moved along the first direction of extent E1 together with the transverse sliding part 61. It is consequently also possible to transfer the contact surface 65 into a state in which it has the maximum effective length A1, but an effective width B that is reduced with respect to the maximum effective width B1 (cf. FIG. 8D).

The extent of the contact surface 65 can consequently be adapted in two dimensions due to this configuration of the contact element 21 with a base part 57 that is unmoved relative to the other parts, with a transverse sliding part 61 displaceable in the direction of the first direction of extent E1, with a height part 63 displaceable in the direction of the second direction of extent E2, and with an attachment part 59 displaceable both along the first direction of extent E1 and along the second direction of extent E2. This makes it possible to flexibly adapt the contact element 21 or its contact surface 65 to respective products 15 to be pressed so that, for example, products 15 of different sizes can be pressed equally and with the same results in the pressing device 11 in that the contact element 21 or its contact surface 65 is brought into a dimensioning adapted to the respective product 15. This flexibility of the contact element 21 in particular makes it possible to flexibly press or shape products 15 of different sizes in the pressing device 11 without, for example, having to provide different pressing devices for products of different types or different sizes.

As FIGS. 9A to 9D show, the contact element 21 has respective toggle lever joints 68 that are connected to the height part 63 or to the attachment part 59 to enable a uniform movement of these parts during an adaptation of the effective width of the contact surface 65. Respective pairs of toggle lever joints 68, which are spaced apart from one another along the first direction of extent E1, are in this respect provided for both the height part 63 and the upward part 59. These pairs are connected by means of a synchronization element 67 that is configured as a guide to achieve a synchronized movement. Furthermore, the attachment part 59 is disposed on the height part 63 in an overlap section 108 so that their movements can also take place in a synchronized manner in the direction of the second direction of extent E2.

Furthermore, the height part 63 and the attachment part 59 have respective springs 70 by means of which the height part 63 and the attachment part 59 are preloaded in the direction of the maximum effective width B1. An adaptation of the effective width B can consequently take place by an exertion of a pressure, in particular by means of a contact element 22 movable in a vertical direction (cf. FIG. 11). In this respect, it can in particular be achieved by the preload generated by means of the springs 70 that the gap created between the contact element 22 and the contact element 21 can be reliably sealed during the pressing so that a possible passage of product parts or liquid through this gap can be counteracted.

As FIGS. 10A and 10B show, the transverse sliding part 61 and correspondingly, together with it, the attachment part 59 are also preloaded in the first direction of extent E1 in the direction of the maximum effective length A1 of the contact surface 65 by means of two springs 70. In this respect, a reduction of this maximum effective length A1 can, in turn, be generated by a development of pressure, in particular by the contact element 23 movable perpendicular to the longitudinal axis L of the pressing chamber 17, wherein the gap between the contact element 21 and the contact element 23 or between the contact element 21 and the counter-element 20 can, in turn, be reliably blocked during the pressing due to the preload of the contact element 21 in the direction of the maximum effective length A1.

FIG. 12 shows a perspective view of the distribution device 71. Said distribution device 71 has a conveyor belt 83 that revolves in the conveying direction F via two deflection rollers 107 and that forms a product support surface 73 for the products 15. In this respect, a slider 75 is provided that is movable perpendicular to the conveying direction F by means of a drive 76 and that cooperates with an abutment 77, which is fixed perpendicular to the conveying direction F, in order to position a product 15 perpendicular to the conveying direction F on the product support surface 73.

To distribute a product 15 onto a respective track S1 or S2 of the conveying device 69 (cf. FIGS. 1A to 1C), the conveyor belt 83 is supported by a support element 85 that is displaceable perpendicular to the conveying direction F by means of a guide 87 via two guide tubes 88.

As FIG. 13A shows, the support element 85 furthermore has a drive 109 for moving the conveyor belt 83 in the conveying direction F. The support element 85 furthermore comprises a load cell 79 that is configured to determine the weight of one or possibly more products 15 disposed on the product support surface 73.

Accordingly, by means of the distribution device, the weight of a supported product 15 can be determined and a distribution over the tracks S1 and S2 of the subsequent conveying device 69 can be achieved. The extent of the system 99 shown in FIGS. 1A to 1C for pressing and transferring products 15 in the conveying direction F can thereby also be minimized in that these two processing steps, the weighing of the products 15 and the distribution of the products 15 over the tracks S1 and S2, can take place by means of a single component, the distribution device 71.

Provision can in particular be made that the control device 81 of the distribution device 71 controls it in dependence on the weight of a product 15 disposed on the product support surface 73 determined by means of the load cell 79. Provision can, for example, be made to distribute products of approximately the same total weight over the tracks S1 and S2 in the course of a processing process and to feed them to the slicing apparatus 89. Accordingly, the distribution device 71 can be controlled by the control device 81 to distribute a relatively heavy product 15, in particular a product 15 having a weight above the average weight of the products 15 processed up to then, onto one of the tracks S1 or S2 on which products 15 of a relatively lower total weight were conveyed up to then.

It is possible that the distribution device 71 moves the products 15 in an accelerated manner in the conveying direction F. It can thereby be achieved that the slicing process, which takes place slower in comparison with the pressing process, but takes place in parallel in two tracks S1 and S2, can be carried out continuously by means of the slicing apparatus 89 and that the products 15 can be distributed sufficiently quickly over the two tracks S1 and S2 at the feed side. It can in this respect in particular be achieved by means of the conveying device 69 to decouple the accelerated movement of the products 15 in the course of the transfer from the distribution device 71 to the conveying device 69 from the continuous feeding of the products 15 by means of the product feed 91 that is slower in comparison to the accelerated movement and to compensate these movements.

Furthermore, the distribution device 71 can, for example, be connected via the control device 81 to a scanning device 101 arranged at the transition from the distribution device 71 to the conveying device 69 so that said scanning device 101 can, while taking into account the accelerations or speeds of the product 15 in the conveying direction F reported by the distribution device 71, produce a spatially exactly resolved image of the product surface that can be taken into account in the further processing. For this purpose, the scanning device 101 is arranged at the transition between the conveyor belt 83 of the distribution device 71 and the conveyor belts 103 of the tracks S1 and S2 of the conveying device 69 so that the scanning process can be started when the product 15 reaches the transition and the total product 15 can be examined in the course of the transfer to the conveying device 69.

The cooperation of the individual components of the system 99 for pressing and transferring products 15 was in particular described in the above description of the Figures. Nevertheless, protection is also claimed independently of the system 99 for each of the described components, for the pressing device 11 described, for the contact element 21 described in detail having a contact surface 65 variable in two dimensions, and for the distribution device 71.

REFERENCE NUMERAL LIST 11 pressing device
15 product
17 pressing chamber
18 first counter-element, longitudinal wall
19 second counter-element, support surface
20 third counter-element, width wall
21 first contact element, longitudinal punch
22 second contact element, vertical punch
23 third contact element, width punch
24 first servomotor
25 second servomotor
26 third servomotor
27 spindle drive
29 synchronization element of the spindle drives
30 belt pulley
31 spindle nut
32 spindle
33 round guide
37 evaluation and control device of the pressing device
39 pneumatic cylinder of the longitudinal punch
41 lateral inlet
43 pneumatic cylinder for blocking/releasing the lateral inlet
45 introduction section
47 insertion device
48 slide element
49 longitudinal outlet
51 pneumatic cylinder for blocking/releasing the longitudinal outlet
53 holding structure
54 feed belt
55 intermediate frame
57 base part
59 attachment part
61 transverse sliding part
63 height part
65 contact surface
67 synchronization element
68 toggle lever joint
69 conveying device
70 spring
71 distribution device
73 product support surface
75 slider
76 drive
77 abutment
79 load cell
81 control device
83 conveyor belt of the distribution device
85 support element
87 guide of the support element
88 guide tube
89 slicing apparatus
91 product feed
93 cutting region
95 portion conveying device
97 measurement device
99 system for pressing and transferring meat products
101 scanning device
103 conveyor belt
105 pressure plate
107 deflection roller
108 overlap section
109 drive
111 first sealing section of the attachment part
113 second sealing section of the attachment part
115 sealing section of the transverse sliding part
117 sealing section of the height part
A effective length
A1 maximum effective length
B effective width
B1 maximum effective width
E1 first direction of extent
E2 second direction of extent
F conveying direction
L longitudinal axis
S1 first track
S2 second track

The invention claimed is:

1. A pressing device for pressing meat products, comprising:
a pressing chamber that extends along a longitudinal axis and into which a product to be pressed can be inserted,
wherein the pressing chamber comprises at least one counter-element and at least one contact element,
wherein the at least one contact element is movable in a direction of the at least one counter-element,
wherein the at least one contact element and the at least one counter-element cooperate such that the product inserted into the pressing chamber can be compressed between the at least one counter-element and the at least one contact element; and
at least one servomotor that is configured to move the at least one contact element,
wherein the pressing chamber has a support surface which is substantially oriented in a horizontal plane and on which the product is disposed when inserted into the pressing chamber, wherein the at least one servomotor is arranged beneath the support surface.

2. The pressing device of claim 1,
wherein the at least one contact element is connected to at least one linear drive,
wherein the at least one servomotor is configured to drive the at least one linear drive.

3. The pressing device of claim 1, wherein the at least one contact element is connected to a plurality of linear drives that are driven the at least one servomotor.

4. The pressing device of claim 3,
wherein the plurality of linear drives is connected to one another via at least one synchronization element;
wherein the at least one servomotor is configured to drive the at least one synchronization element; and
wherein the at least one synchronization element is configured to uniformly transmit a drive power received by the at least one servomotor to the plurality of linear drives.

5. The pressing device of claim 3, wherein exactly one synchronization element is provided to connect the plurality of linear drives or wherein exactly two synchronization elements are provided to connect the plurality of linear drives.

6. The pressing device of claim 1, wherein the at least one servomotor is connected to an evaluation and control device that is configured to evaluate signals of the at least one servomotor and to control the at least one servomotor in dependence on the evaluated signals.

7. The pressing device of claim 1,
wherein the at least one contact element is further connected to at least one of a pneumatic cylinder or an additional servomotor;
wherein the pneumatic cylinder or the additional servomotor is configured to position the at least one contact element in the direction of the at least one counter-element before the pressing.

8. The pressing device of claim 1, wherein the at least one contact element is movable in at least one of:
a first direction that is defined by the longitudinal axis of the pressing chamber;
a second direction that is substantially vertical; and
a third direction that is perpendicular to the first direction defined by the longitudinal axis of the pressing chamber and perpendicular to the vertical.

9. The pressing device of claim 1, wherein the pressing device has three movable contact elements that cooperate with respective counter-elements.

10. The pressing device of claim 9, wherein each of the three movable contact elements is movable by a respective servomotor.

11. The pressing device of claim 1, wherein the pressing device comprises at least one of a pneumatic cylinder and a servomotor for ejection of the product from the pressing chamber after the pressing.

12. The pressing device of claim 1,
wherein the at least one contact element comprises a base part; an attachment part, a transverse sliding part, and a height part that are connected to one another at respective connection points and that form a contact surface for the product at one side of the at least one contact element during the pressing,
wherein the contact surface has an effective length along a first direction of extent and an effective width along a second direction of extent perpendicular to the first direction of extent, and
wherein the effective length and the effective width of the contact surface are variable.

13. The pressing device of claim 12, wherein the respective connection points of each of: the base part, the attachment part, the transverse sliding part, and the height part are configured such that a pressure acting on the contact surface during a pressing seals the respective connection points.

14. The pressing device of claim 12,
wherein elastically deformable sealing elements are provided at each of the respective connection points and are deformed, while sealing the respective connection points, by a pressure acting on the contact surface during the pressing.

15. The pressing device of claim 12, wherein the transverse sliding part is displaceable relative to the base part along the first direction of extent.

16. The pressing device of claim 12, wherein the transverse sliding part is preloaded along the first direction of extent in the direction of a maximum effective length.

17. The pressing device of claim 12,
wherein the attachment part is displaceable together with the transverse sliding part relative to the base part along the first direction of extent, and
wherein the attachment part is adjustable relative to the transverse sliding part and to the base part along the second direction of extent.

18. The pressing device of claim 12, wherein the height part is adjustable relative to the base part and to the transverse sliding part along the second direction of extent.

19. The pressing device of claim 12, wherein the attachment part and the height part are adjustable along the second direction of extent and are preloaded in the direction of a maximum effective width, wherein at least one synchronization element is provided that is configured to synchronize an adjustment of the attachment part and of the height part along the second direction of extent.

20. The pressing device of claim 1,
wherein the pressing chamber further comprises a lateral inlet extending in the direction of the longitudinal axis of the pressing chamber, and
wherein at least one of the at least one contact element or the at least one counter-element is configured to selectively release or block the lateral inlet.

21. The pressing device of claim 1,
wherein the pressing chamber further comprises a lateral outlet extending in the direction of the longitudinal axis of the pressing chamber, and
wherein at least one of the at least one contact element or the at least one counter-element is configured to selectively release or block the lateral outlet.

22. A pressing device for pressing meat products, comprising:
a pressing chamber that extends along a longitudinal axis and into which a product to be pressed can be inserted,
wherein the pressing chamber comprises at least one counter-element and at least one contact element,
wherein the at least one contact element is movable in a direction of the at least one counter-element,
wherein the at least one contact element and the at least one counter-element cooperate such that the product inserted into the pressing chamber can be compressed between the at least one counter-element and the at least one contact element,
wherein the pressing chamber has a lateral inlet which extends in the direction of the longitudinal axis of the pressing chamber and through which the product to be pressed can be inserted into the pressing chamber, with at least one of the at least one counter-element and the at least one contact element being configured to selectively release or block the lateral inlet; and at least one servomotor that is configured to move the at least one contact element.

23. The pressing device of claim 22, wherein at least one of the at least one counter-element and the at least one contact element is movable in a substantially vertical direction to selectively release or block the lateral inlet.

24. The pressing device of claim 22, wherein the pressing device further comprises:

an introduction section onto which the product to be pressed can be placed; and an insertion device that is configured to insert the product to be pressed through the lateral inlet into the pressing chamber.

25. A pressing device for pressing meat products, comprising:

a pressing chamber that extends along a longitudinal axis and into which a product to be pressed can be inserted, wherein the pressing chamber comprises at least one counter-element and at least one contact element, wherein the at least one contact element is movable in a direction of the at least one counter-element, wherein the at least one contact element and the at least one counter-element cooperate such that the product inserted into the pressing chamber can be compressed between the at least one counter-element and the at least one contact element, wherein the pressing chamber has a longitudinal outlet through which the pressed product can be guided out of the pressing chamber along the direction defined by the longitudinal axis of the pressing chamber, wherein at least one of the at least one counter-element or the at least one contact element being configured to selectively release or block the longitudinal outlet, and wherein the longitudinal outlet is blocked during the pressing; and at least one servomotor that is configured to move the at least one contact element.

26. The pressing device of claim 25, wherein at least one of the at least one counter-element or the at least one contact element is movable in a substantially vertical direction to selectively release or block the longitudinal outlet.

27. A pressing device for pressing meat products, comprising:

a holding structure;

a pressing chamber supported within the holding structure and that extends along a longitudinal axis and into which a product to be pressed can be inserted, wherein the pressing chamber comprises:

at least one counter-element and at least one contact element, wherein the at least one contact element is movable in a direction of the at least one counter-element, wherein the at least one contact element and the at least one counter-element cooperate such that the product inserted into the pressing chamber can be compressed between the at least one counter-element and the at least one contact element, a lateral inlet through which the product to be pressed is inserted into the pressing chamber, and a longitudinal outlet through which the pressed product is guided out of the pressing chamber along a direction defined by a longitudinal axis of the pressing chamber; and an intermediate frame for receiving and transmitting pressing forces to the holding structure arranged between at least one of: the holding structure and the lateral inlet or between the holding structure and the longitudinal outlet; and at least one servomotor that is configured to move the at least one contact element.

28. The pressing device of claim 27, wherein the holding structure is extended in at least one direction beyond a dimension of the pressing chamber; and wherein the at least one contact element is supported at this extent via a servo drive that comprises the at least one servomotor.

* * * * *